(12) United States Patent
Lin

(10) Patent No.: US 10,416,726 B2
(45) Date of Patent: Sep. 17, 2019

(54) HOUSING ASSEMBLY AND ELECTRONIC DEVICE

(71) Applicant: GUANGDONG OPPO MOBILE TELECOMMUNICATIONS CORP., LTD., Dongguan, Guangdong (CN)

(72) Inventor: Yugui Lin, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/869,432

(22) Filed: Jan. 12, 2018

(65) Prior Publication Data

US 2018/0210513 A1 Jul. 26, 2018

(30) Foreign Application Priority Data

Jan. 26, 2017 (CN) ..................... 2017 2 0098826 U

(51) Int. Cl.
*G06F 1/16* (2006.01)
*H04M 1/02* (2006.01)
*H04B 1/3888* (2015.01)

(52) U.S. Cl.
CPC .......... *G06F 1/1681* (2013.01); *G06F 1/1616* (2013.01); *G06F 1/1641* (2013.01); *G06F 1/1652* (2013.01); *G06F 1/1656* (2013.01); *H04B 1/3888* (2013.01); *H04M 1/022* (2013.01); *E05Y 2900/606* (2013.01); *G06F 1/1626* (2013.01)

(58) Field of Classification Search
CPC .... G06F 1/1618; G06F 1/1652; G06F 1/1681; H04M 1/0216
See application file for complete search history.

(56) References Cited

U.S. PATENT DOCUMENTS

| 2012/0307472 A1* | 12/2012 | Bohn | G06F 1/1616 |
| | | | 361/807 |
| 2014/0174226 A1 | 6/2014 | Hsu et al. | |
| 2015/0077917 A1* | 3/2015 | Song | G06F 1/1652 |
| | | | 361/679.27 |

(Continued)

FOREIGN PATENT DOCUMENTS

| CN | 2613567 Y | 4/2004 |
| CN | 101198238 A | 6/2008 |

(Continued)

OTHER PUBLICATIONS

Extended European Search Report issued in corresponding European Application No. 18152077.6-1221, dated May 30, 2018 (9 pages).

(Continued)

*Primary Examiner* — Anthony Q Edwards
(74) *Attorney, Agent, or Firm* — Ladas & Parry LLP

(57) ABSTRACT

A housing assembly is provided. The housing assembly includes a first housing, a second housing and a connecting module. The connecting module is coupled between the first housing and the second housing. The first housing is rotatable with respect to the second housing by the connecting module. The connecting module includes a damping mechanism configured for providing a damping force to the first housing and the second housing during rotating the first housing with respect to the second housing. An electronic device is also provided.

20 Claims, 50 Drawing Sheets

(56) References Cited

U.S. PATENT DOCUMENTS

| | | | |
|---|---|---|---|
| 2015/0131222 A1 | 5/2015 | Kauhaniemi et al. | |
| 2015/0233162 A1 | 8/2015 | Lee et al. | |
| 2016/0116944 A1 | 4/2016 | Lee et al. | |
| 2016/0179236 A1* | 6/2016 | Shin | G06F 1/1616 345/173 |
| 2016/0195901 A1 | 7/2016 | Kauhaniemi et al. | |
| 2016/0342180 A1 | 11/2016 | Xin et al. | |
| 2018/0059740 A1* | 3/2018 | Kato | F16C 11/045 |
| 2018/0110139 A1* | 4/2018 | Seo | G06F 1/16 |
| 2018/0164852 A1* | 6/2018 | Lim | H04M 1/0214 |
| 2018/0198896 A1* | 7/2018 | Kang | H04M 1/02 |
| 2018/0329460 A1* | 11/2018 | Song | G06F 1/16 |

FOREIGN PATENT DOCUMENTS

| | | |
|---|---|---|
| CN | 103206453 A | 7/2013 |
| CN | 105407194 A | 3/2016 |
| CN | 105516410 A | 4/2016 |
| CN | 105549682 A | 5/2016 |
| CN | 106328007 A | 1/2017 |
| CN | 106559531 A | 4/2017 |
| CN | 106603773 A | 4/2017 |
| CN | 106941540 A | 7/2017 |
| CN | 107071096 A | 8/2017 |
| CN | 206559412 U | 10/2017 |
| CN | 206585598 U | 10/2017 |
| EP | 3109847 A1 | 12/2016 |
| JP | 200365320 A | 3/2003 |

OTHER PUBLICATIONS

Extended European Search Report issued in corresponding European Application No. 18152248.3-1216, dated Jun. 25, 2018 (8 pages).

International Search Report issued in corresponding International application No. 2018073104, dated Mar. 28, 2018 (10 pages).

International Search Report issued in corresponding International application No. 2018073103, dated Apr. 16, 2018 (10 pages).

* cited by examiner

HOUSING ASSEMBLY AND ELECTRONIC DEVICE

CROSS-REFERENCE TO RELATED APPLICATION

This application claims priority to a Chinese application No. 201720098826.5 filed on Jan. 26, 2017, titled "HOUSING ASSEMBLY, DISPLAY DEVICE AND MOBILE TERMINAL". The entirety of the above-mentioned applications is hereby incorporated by reference herein.

TECHNICAL FIELD

The present disclosure relates to the field of consumer electronics in general. More particularly, and without limitation, the disclosed embodiments relate to a housing assembly an electronic device.

BACKGROUND

Electronic devices with large screen play an excellent role in improving user experience and visual effect, and possess obvious advantages particularly in business communication, playing games, watching movies and the like.

Currently, a foldable electronic device may have a large display panel. The large display panel can satisfy demand of a user for larger screen. The large display panel can be folded so that a size of the foldable electronic device is reduced. Thus, it is convenient for a user to carry the foldable electronic device with small size. Generally, the foldable electronic device includes a first body and a second body. The first body is rotated relative to the second body so that the folded electronic device is folded.

SUMMARY

In accordance with an aspect, in one embodiment of the present disclosure, a housing assembly is provided. The housing assembly may include a first housing, a second housing and a connecting module. The connecting module is coupled between the first housing and the second housing. The first housing is rotatable with respect to the second housing by the connecting module. The connecting module includes a damping mechanism configured for providing a damping force to the first housing and the second housing during rotating the first housing with respect to the second housing.

In accordance with another aspect, in one embodiment of the present disclosure, an electronic device is provided. The electronic device may include a first housing, a second housing, a connecting module and a flexible display panel. The connecting module is coupled between the first housing and the second housing. The first housing is rotatable with respect to the second housing by the connecting module. The connecting module includes a damping mechanism configured for providing a damping force to the first housing and the second housing during rotating the first housing with respect to the second housing. The flexible display panel is positioned on the first housing and the second housing.

In accordance with another aspect, in one embodiment of the present disclosure, an electronic device is provided. The electronic device may include a first housing, a second housing, a damping mechanism, a flexible display panel and an electronic component group. The second housing is rotatable with respect to the second housing. A damping mechanism is coupled between the first housing and the second housing. The damping mechanism is configured for providing a damping force to the first housing and the second housing during rotating the first housing with respect to the second housing. The flexible display panel is positioned on the first housing and the second housing. The electronic component group is positioned in the first housing and the second housing and electrically connected to the flexible display panel.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

As used herein, a "communication terminal" (or simply a "terminal") includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. A communication terminal that is configured to communicate over a wireless interface may be referred to as a "wireless communication terminal," a "wireless terminal" and/or a "mobile terminal." Examples of mobile terminals include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Figure 1:
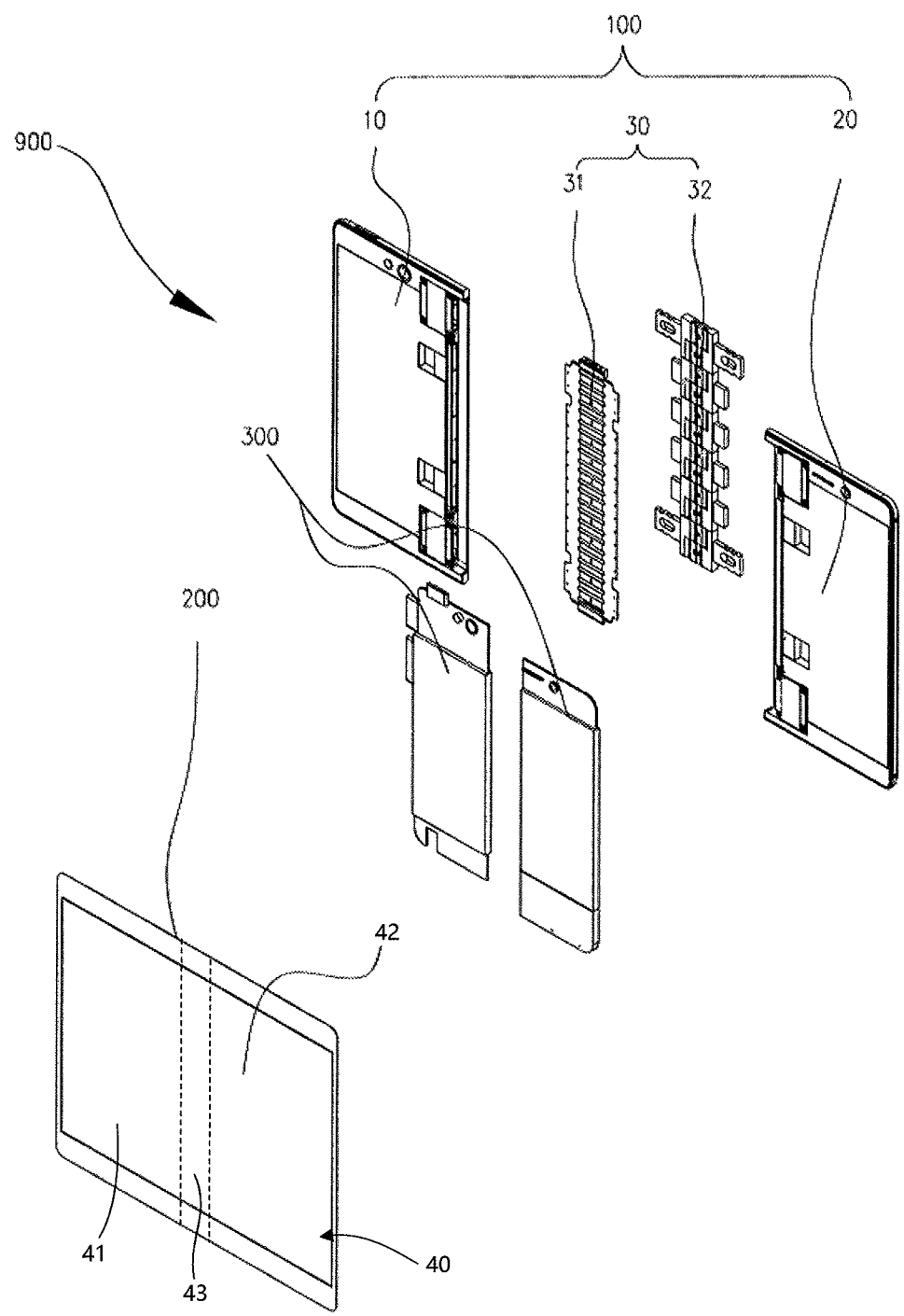
FIG. 1 illustrates an exploded view of an electronic device, in accordance with an embodiment of the present disclosure.

FIG. 1 illustrates an exploded view of an electronic device, in accordance with an embodiment of the present disclosure. In the embodiments of the present disclosure, the electronic devices can be a mobile terminal 900, the mobile terminal is described as an example in the present embodiment. In other embodiments, the electronic device can be, for example, smart mobile phones, tablets (PDA), laptops, etc. The mobile terminal 900 may include a housing assembly 100. The housing assembly 100 may include a first housing 10, a second housing 20 and a connecting module 30. The connecting module 30 may be located between the first housing 10 and the second housing 20. The connecting module 30 can be configured for coupling the first housing 10 to the second housing 20. In the housing assembly 100, the second housing 20 can be rotated with respect to the first housing 10 via the connecting module 30. The housing assembly 100 can be in a folded configuration, an angular configuration or an unfolded mold. In the folded configuration, the second housing 20 can be rotated with respect to the first housing 10, and then be turned over and stacked onto the first housing 10. In the unfolded configuration, the first housing 10 and the second housing 20 can be substantially arranged in a plane. The angular configuration is a status between the unfolded configuration and the folded configuration. In other words, in the angular configuration, the first housing 10 and the second housing 20 may form an angle between 0 and 180°. In some embodiments, in the angular configuration, the first housing 10 and the second housing 20 may form an angle more than 180°. The connecting module 30 may be flexible or bendable, or even foldable. When the connecting module 30 is bended, the housing assembly 100 can be in the folded configuration or in the angular configuration. When the connecting module 30 is straight, the housing assembly 100 can be in the unfolded configuration. The connecting module 30 can also be configured to prevent a detachment of the second housing 20 and the first housing 10 in the folded configuration or the angular configuration.

In one embodiment, the connecting module 30 may include a connecting member 31 and a coupling member 32. The connecting member 31 is bendable, and even foldable. The first housing 10 and the second housing 20 can be angular or stacked by bending the connecting member 31. In some embodiments, when the connecting member 31 is straight along a direction perpendicular to a longitudinal direction of the connecting member 31, the first housing 10 and the second housing 20 can be arranged in a plane. The coupling member 32 of the connecting module 30 may also be bendable, and even foldable. In the folded configuration, the coupling member 32 can be folded to support the folded connecting member 31. In the unfolded configuration, the coupling member 32 can also be unfolded to support the unfolded connecting member 31. Further, in one example, the coupling member 32 may be slidably coupled to the first housing 10 and the second housing 20. From the unfolded configuration to the folded configuration, the coupling member 32 can slide towards the first housing 10 and the second housing 20. For example, the coupling member 32 can slide into the first housing 10 and the second housing 20. Otherwise, from the unfolded configuration to the folded configuration, the coupling member 32 can slide away from the first housing 10 and the second housing 20. For example, the coupling member 32 can slide out of the first housing 10 and the second housing 20. In another example, the coupling member 32 may be slidably coupled to one of the first housing 10 and the second housing 20. From the unfolded configuration to the folded configuration, the coupling member 32 can slide towards one of the first housing 10 or the second housing 20. For example, the coupling member 32 can slide into one of the first housing 10 and the second housing 20. From the unfolded configuration to the folded configuration, the coupling member 32 can slide away from one of the first housing 10 or the second housing 20. For example, the coupling member 32 can slide out of the first housing 10 and the second housing 20.

The housing assembly 100 can be configured to install a display device 200 including a flexible display panel 40. The housing assembly 100 can also be configured to protect other components such as an electronic component group 300. In the present embodiment, the first housing 10 and the second housing 20 of the housing assembly 100 may be made of a rigid material. Thus, the housing assembly 100 can provide support and protection to the flexible display panel 40. As illustrated in FIG. 1, the flexible display panel 40 may include a first portion 41, a second portion 42 and a third portion 43. The third portion 43 can be located between the first portion 41 and the second portion 42. One side of the third portion 43 can be coupled to the first portion 41, the other side of the third portion 43 can be coupled to the second portion 42. The first housing 10 can be configured for supporting the first portion 41, and the second housing 20 can be configured for supporting the second portion 42. The connecting module 30 can be configured for supporting the third portion 43.

The connecting module 30 includes the connecting member 31 and the coupling member 32. The connecting member 31 can be located between the first housing 10 and the second housing 20. One side of the connecting member 31 is coupled to the first housing 10, the other side of the connecting member 31 is coupled to the second housing 20. The coupling member 32 may face the connecting member 31. The coupling member 32 can be located between the first housing 10 and the second housing 20. One side of the coupling member 32 is slidably coupled to the first housing 10, the other side of the coupling member 32 is slidably coupled to the second housing 20. The coupling member 32 can be configured to support the connecting member 31. In the folded configuration, the coupling member 32 can be in contact with the connecting member 31 to support the connecting member 31.

Figure 2:
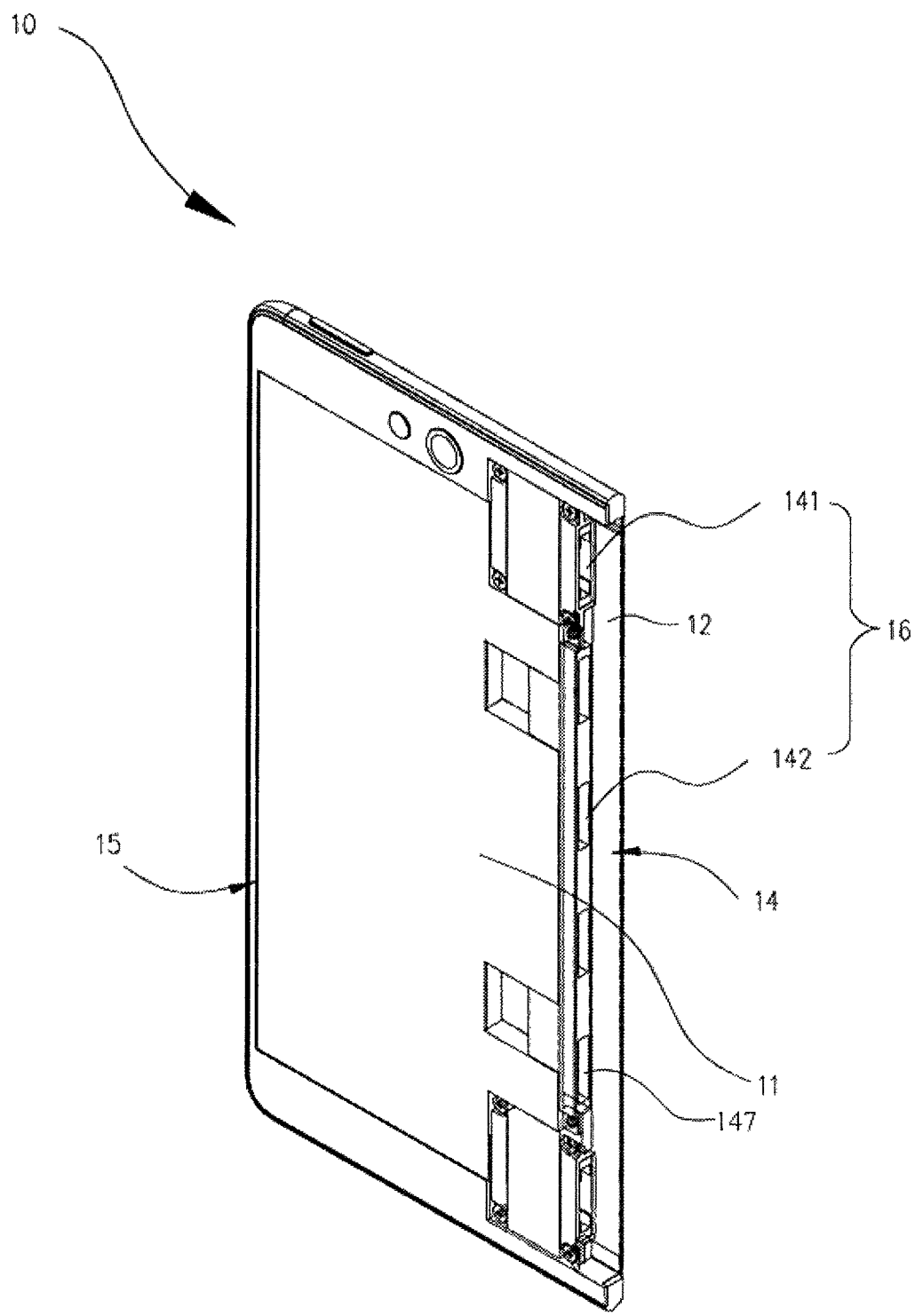
FIG. 2 illustrates an assembled view of a first housing of the electronic device shown in FIG. 1.
Figure 3:
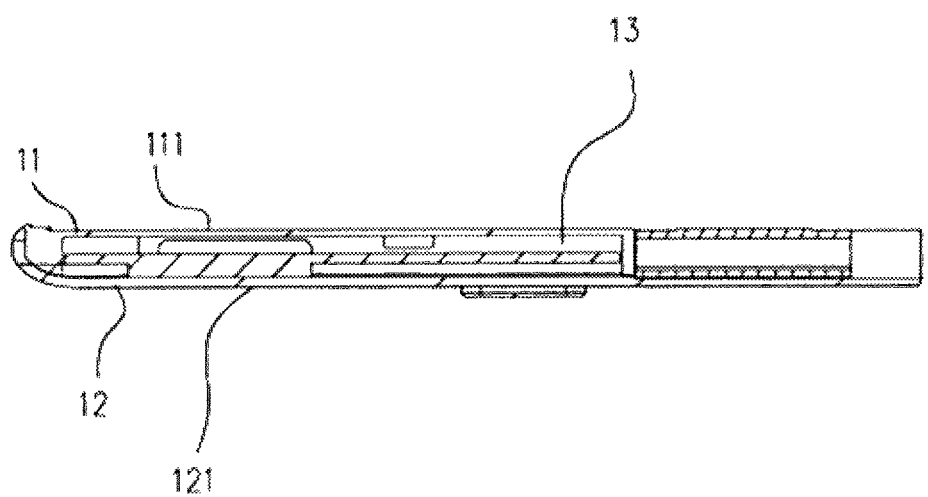
FIG. 3 illustrates a cross-sectional schematic view of the first housing of the electronic device shown in FIG. 2.

The first housing 10, as illustrated in FIG. 2-FIG. 3, may include a first front cover 11 and a first rear cover 12. The first rear cover 12 can be coupled with the first front cover 11 to form a first accommodating cavity 13. The first accommodating cavity 13 can be configured for accommodating the electronic component group 300 (as illustrated in FIG. 1). The first front cover 11 may have a first supporting surface 111. The first supporting surface 111 can be configured for supporting the first portion 41 of the flexible display panel 40. The first rear cover 12 can be coupled to the first front cover 11 and located on a side of the first front cover 11 opposite to the first supporting surface 111. The first rear cover 12 may have a first rear surface 121 far away from the first front cover 11. The first housing 10 may include a first interior portion 14 and a first exterior portion 15. The first interior portion 14 can be coupled to the connecting module 30, and the first exterior portion 15 can be far away from the connecting module 30. In the present embodiment, the first interior portion 14 is coupled to the connecting member 31 and the coupling member 32. The connecting member 31 is fixed to the first interior portion 14, and the coupling member 32 is slidably coupled to the first interior portion 14. The first exterior portion 15 is configured to be coupled to the first portion 41 of the flexible display panel 40. For example, an edge of the first portion 41 far away from the second portion 42 is coupled to the first exterior portion 15 of the first housing 10. The first portion 41 of the flexible display panel 40 can be positioned on the first supporting surface 111. Thus, the first housing 10 can support the first portion 41 of the flexible display panel 40 effectively.

The coupling member 32 is slidably coupled to the first interior portion 14. The first interior portion 14 may have a first groove 16. The coupling member 32 can be partially received in the first groove 16. Thus, the coupling member 32 can slide with respect to the first interior portion 14. The coupling member 32 can slide either into or out of the first groove 16. As a result, the coupling member 32 will not be compressed by the first housing 10 from the unfolded configuration to the folded configuration, thereby avoiding a deformation of the coupling member 32.

In another example, the coupling member 32 can have a groove for partially receiving the first interior portion 14. Thus, the first interior portion 14 can be partially received in the groove of the coupling member 32. Thus, the coupling member 32 can slide with respect to the first interior portion 14. The first interior portion 14 can slide either into or out of the groove of the coupling member 32.

In the present embodiment, the first groove 16 includes two first guiding grooves 141 and a number of first auxiliary guiding grooves 142. The first auxiliary guiding grooves 142 are arranged between the two first guiding grooves 141. The two first guiding grooves 141 and the first auxiliary guiding grooves 142 extend through the first interior portion 14, thereby forming a number of openings 147 at first interior portion 14. Each of the two first guiding grooves 141 extends from the first interior portion 14 toward the first exterior portion 15. Each of the first auxiliary guiding grooves 142 also extends from the first interior portion 14 toward the first exterior portion 15. An extending direction of each of the two first guiding grooves 141 is substantially parallel to an extending direction of each of the first auxiliary guiding grooves 142. The two first guiding grooves 141 are configured to guide the coupling member 32. The coupling member 32 can slide along the extending direction of the two first guiding grooves 141, thereby avoiding a movement along a direction perpendicular to the extending direction of the first guiding grooves 141 (i.e., a longitudinal direction of the first interior portion 14). The first auxiliary guiding grooves 142 are also configured to guide the coupling member 32. The coupling member 32 can slide along the extending direction of the first auxiliary guiding grooves 142, thereby avoiding a movement along a direction perpendicular to the extending direction of the first auxiliary guiding grooves 142 (i.e., a longitudinal direction of the first interior portion 14). Thus, the coupling member 32 can slide with respect to the first interior portion 14 of the first housing 10 smoothly.

Figure 4:
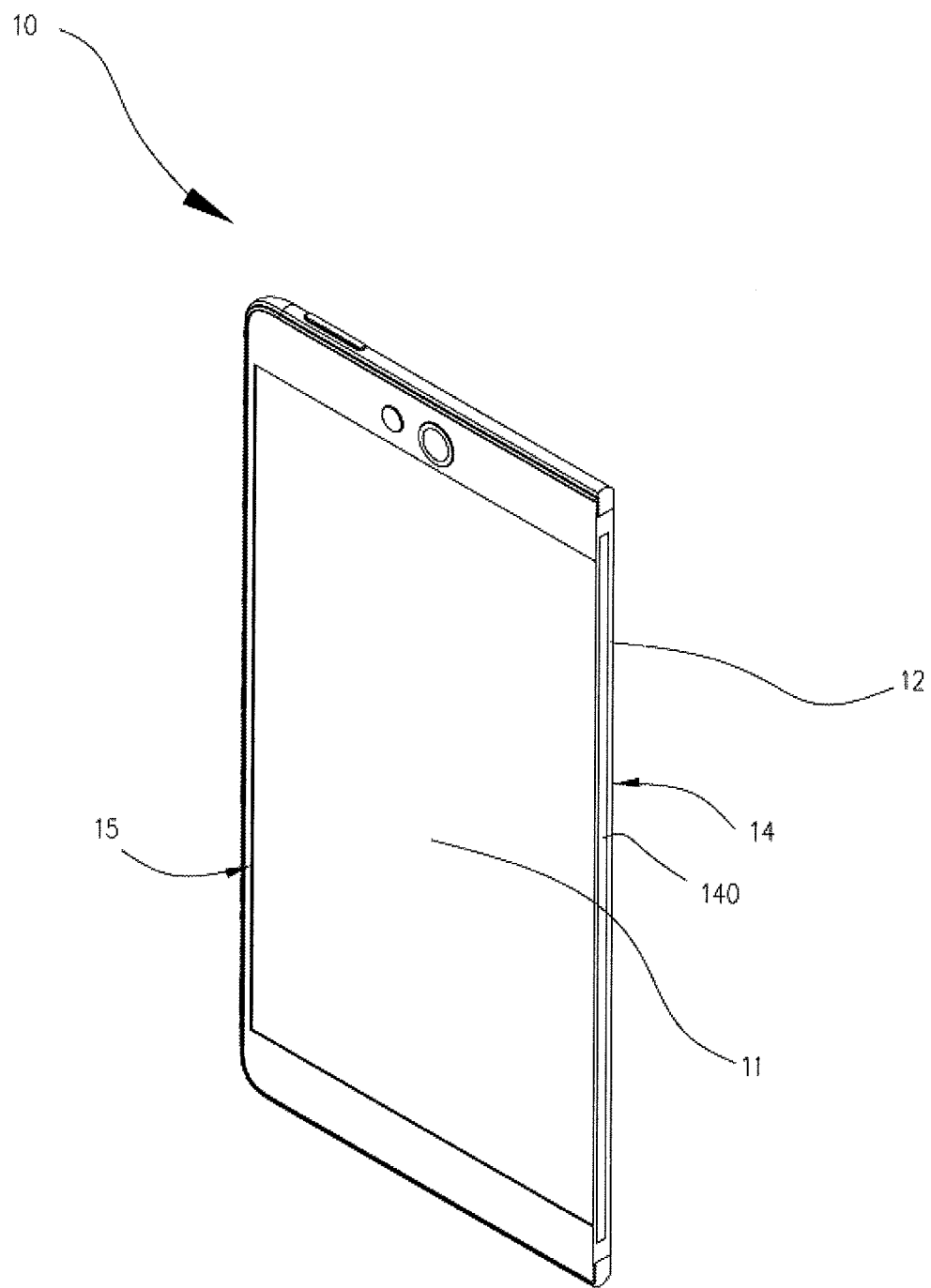
FIG. 4 illustrates an assembled view of a first housing, in accordance with another embodiment of the present disclosure.

In another embodiment, as illustrated in FIG. 4, the first groove 16 of the first housing 10 may only include a guiding groove 140. The guiding groove 140 can be configured to guide the coupling member 32. The coupling member 32 can be partially received in the guiding groove 140. The coupling member 32 can slide either into or out of the guiding groove 140 with respect to the first interior portion 14 smoothly.

Figure 5:
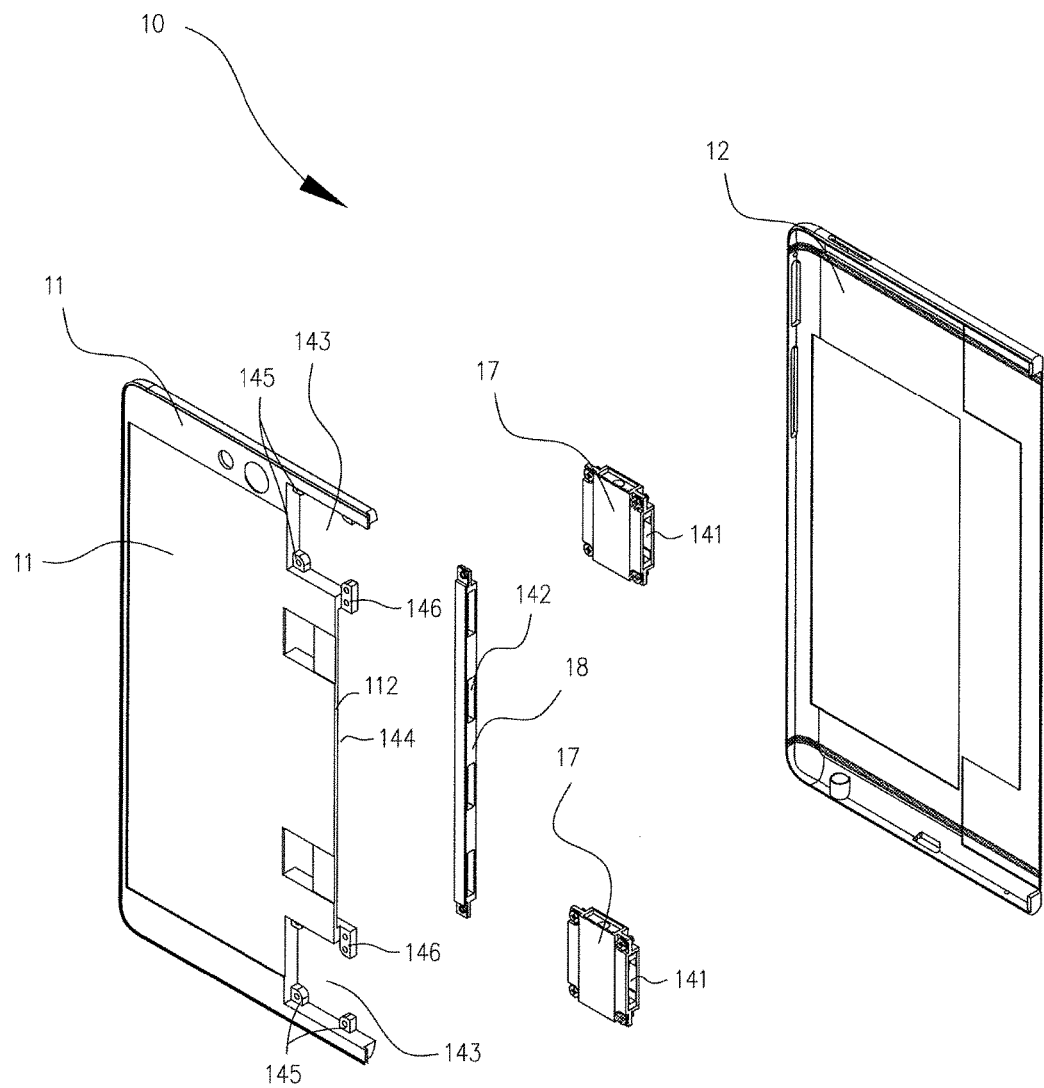
FIG. 5 illustrates an exploded view of the first housing of the electronic device shown in FIG. 2.

As illustrated in FIG. 5, in the present embodiment, the first interior portion 14 defines two first mounting grooves 143, thereby forming a first mounting portion 144 between the two first mounting grooves 143. Thus, the first front cover 11 has a first inner sidewall 112 on the first mounting portion 144. The two first mounting grooves 143 are located at two ends of the first inner sidewall 112. The two first mounting grooves 143 are arranged along a longitudinal direction of the first inner sidewall 112. Further, the first housing 10 includes a number of first bearings 145 (for example three bearings 145 are illustrated in FIG. 5) located in each of the two first mounting grooves 143. The first housing 10 further includes two second bearings 146 disposed on the first inner sidewall 112 face to face. The two second bearings 146 are separated along the longitudinal direction of the first inner sidewall 112.

Additionally, the first housing 10 may include two first supporters 17 and a first auxiliary supporter 18. The two first supporters 17 can be mounted in the two first mounting grooves 143 one by one. The first auxiliary supporter 18 can be mounted on the first mounting portion 144. In the present embodiment, each of the two first supporters 17 is installed into the corresponding first mounting groove 143 and coupled to the first bearings 145 by screws. The first rear cover 12 may be configured to support the first supporter 17 exposed from the first front cover 11. Thus, a structure strength of the first housing 10 can be enhanced. The first auxiliary supporter 18 is coupled to the first mounting portion 144. One end of the first auxiliary supporter 18 is coupled to the one of the two second bearings 146 by screw; the other end of the first auxiliary supporter 18 is coupled to the other of the two second bearings 146 by screw. Moreover, one of the two first supporters 17 is also coupled to one of the two second bearings 146 by screw; the other of the two first supporters 17 is also coupled to the other of the two second bearings 146 by screw. Thus, the first housing 10 can have a simple structure and the structure strength of the first housing 10 can be further enhanced.

Each of the two first supporters 17 can have one first guiding groove 141 formed therein. The first auxiliary guiding grooves 142 can be formed in the first auxiliary supporter 18. The coupling member 32 can pass through the two first supporters 17 and the first auxiliary supporter 18 to be partially received in the two first guiding grooves 141 and the first auxiliary guiding grooves 142 and can slide along the two first guiding grooves 141 and the first auxiliary guiding grooves 142. It is easy to assemble the two first supporters 17 and the first auxiliary supporter 18 with the coupling member 32. Otherwise, it is also easy to disassemble the two first supporters 17 and the first auxiliary supporter 18 from the first front cover 11 to be repaired.

Figure 6:
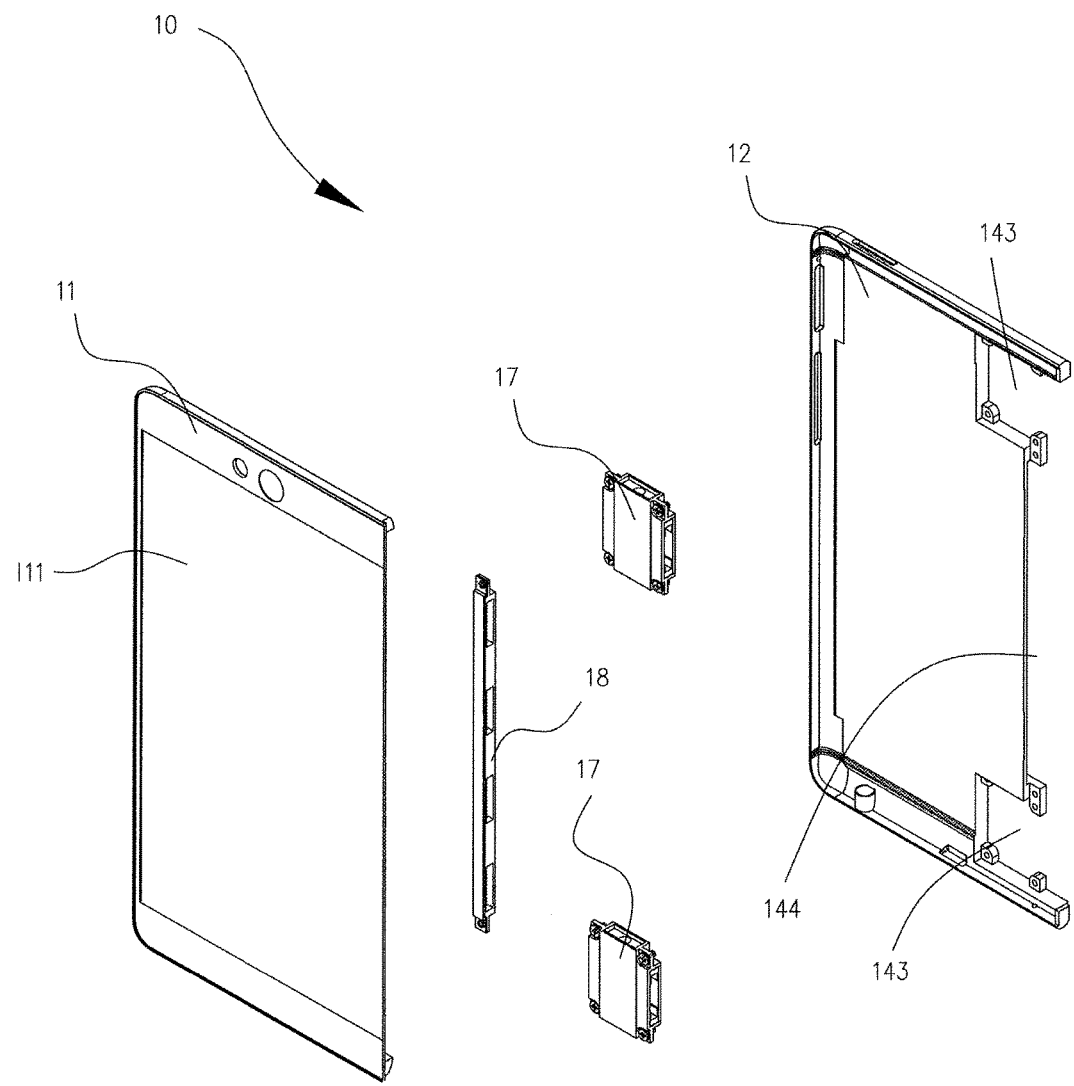
FIG. 6 illustrates an exploded view of a first housing, in accordance with another embodiment of the present disclosure.

It is noted that, in another embodiment, as illustrated in FIG. 6, the first mounting grooves 143 and the first mounting portion 144 may be disposed at the first rear cover 12. Similarly, the two first supporters 17 and the first auxiliary supporter 18 can be detachably assembled with the first rear cover 12.

Figure 7:
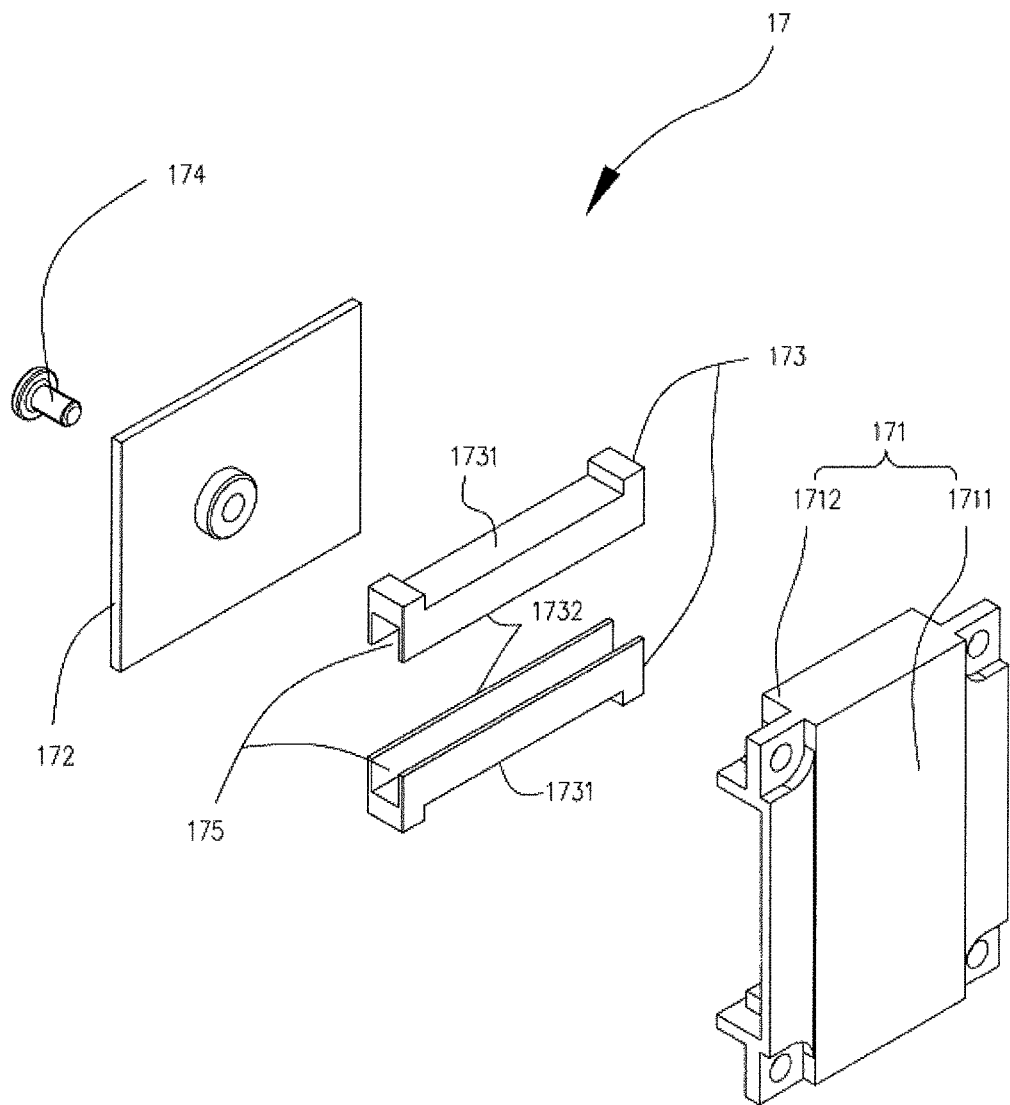
FIG. 7 illustrates an exploded view of a first supporter of the first housing shown in FIG. 5.

In the present embodiment, as illustrated in FIG. 7, each of the first supporters 17 includes a first base 171, a first cover plate 172 and two guiding bars 173. The first cover plate 172 covers the first base 171. The two guiding bars 173 are located between the first base 171 and the first cover plate 172. The first base 171 is coupled to the first cover plate 172 by screws. Thus, it is easy to assemble the first base 171 with the first cover plate 172. Otherwise, it is also easy to disassemble the two guiding bars 173 from the first base 171 and the first cover plate 172 to be cleaned. The coupling member 32 can smoothly slide in the two first supporters 17. The first base 171 have four corners. The four corners are configured to be coupled to the three first bearings 145 (as illustrated in FIG. 5) and one second bearing 146 (as illustrated in FIG. 5). The first base 171 includes a baseplate 1711 and two fixing portions 1712. The two fixing portions 1712 are located at two opposite sides of the first base 171. The two fixing portions 1712 are configured to be in contact with the first cover plate 172. The two guiding bars 173 can be coupled to the two fixing portions 1712 one by one by screws. A longitudinal direction of each of the two guiding bars 173 is substantially parallel to a sliding direction of the coupling member 32 with respect to the first housing 10. In one exemplary embodiment, each of the guiding bars 173 includes a first side 1731 and a second side 1732. The first side 1731 and the second side 1732 are located at two opposite sides of the guiding bar 173. The second side 1732 defines a groove 175. A longitudinal direction of the groove 175 is substantially parallel to the longitudinal direction of the guiding bar 173. The two guiding bars 173 can have an identical structure. When the two guiding bars 173 are assembled with the first base 171 and the first cover plate 172, the groove 175 of one of the two guiding bars 173 faces the groove 175 of the other of the two guiding bars 173. Thus, the first guiding groove 141 (as illustrated in FIG. 2 and FIG. 5) is formed between the two guiding bars 173. The coupling member 32 can be guided to slide in the two first supporters 17 by the grooves 175 of the guiding bars 173. As a result, a friction force between the coupling member 32 and the first supporter 17 can be reduced.

The guiding bars 173 can be made of thermoplastic crystalline polymers. Thus, the guiding bars 173 may have properties of wear resistance, self-lubrication and heat resistance. The guiding bars 173 can guide the coupling member 32 to slide smoothly, absorb a friction heat generated by sliding the coupling member 32 relative to the first housing 10, and increase a service life of the first supporter 17.

Figure 8:
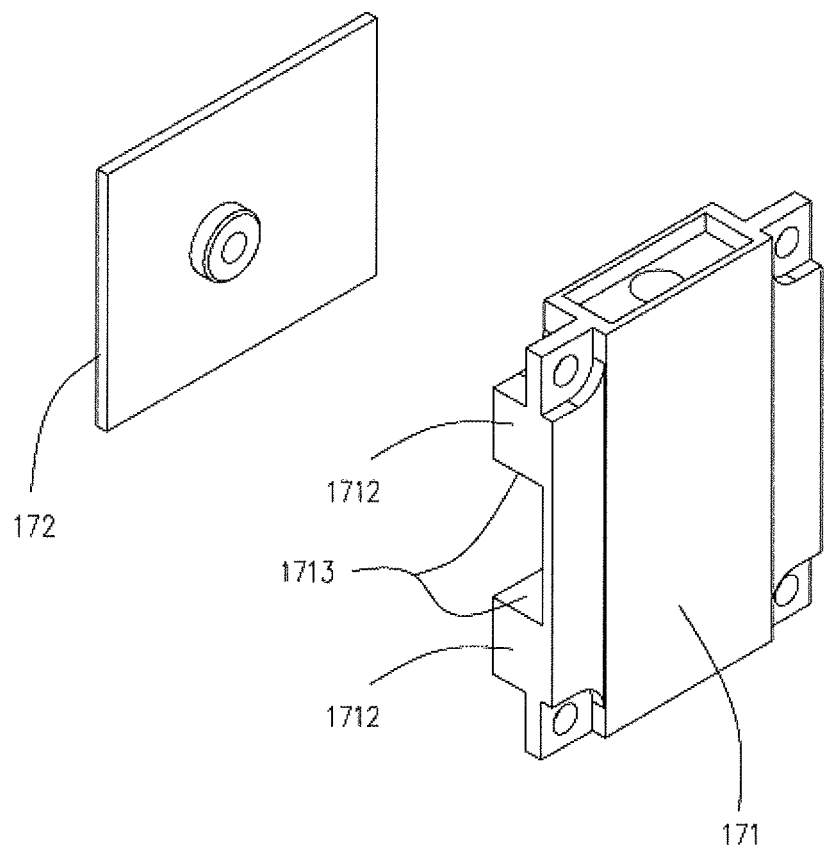
FIG. 8 illustrates an exploded view of a first supporter, in accordance with another embodiment of the present disclosure.

In one embodiment, each of the two first supporters 17 can be made of thermoplastic crystalline polymers. The coupling member 32 can be guided by the first guiding groove 141 formed between the first base 171 and the first cover plate 172. A friction force of the first supporter 17 and the coupling member 32 can be reduced. As illustrated in FIG. 8, each of the two fixing portions 1712 of the first base 171 can have a guiding surface 1713. The guiding surface 1713 of one of the two fixing portions 1712 faces the guiding surface 1713 of the other of the two fixing portions 1712. Thus, the first guiding groove 141 (as illustrated in FIG. 2 and FIG. 5) is formed between the two guiding surfaces 1713. The coupling member 32 may be interposed into the first guiding groove 141 and in contact with the two guiding surfaces 1713. Thus, a friction force between the coupling member 32 and the two guiding surfaces 1713 is very low. Then, the coupling member 32 can slide in the first supporter 17 smoothly.

Figure 9:
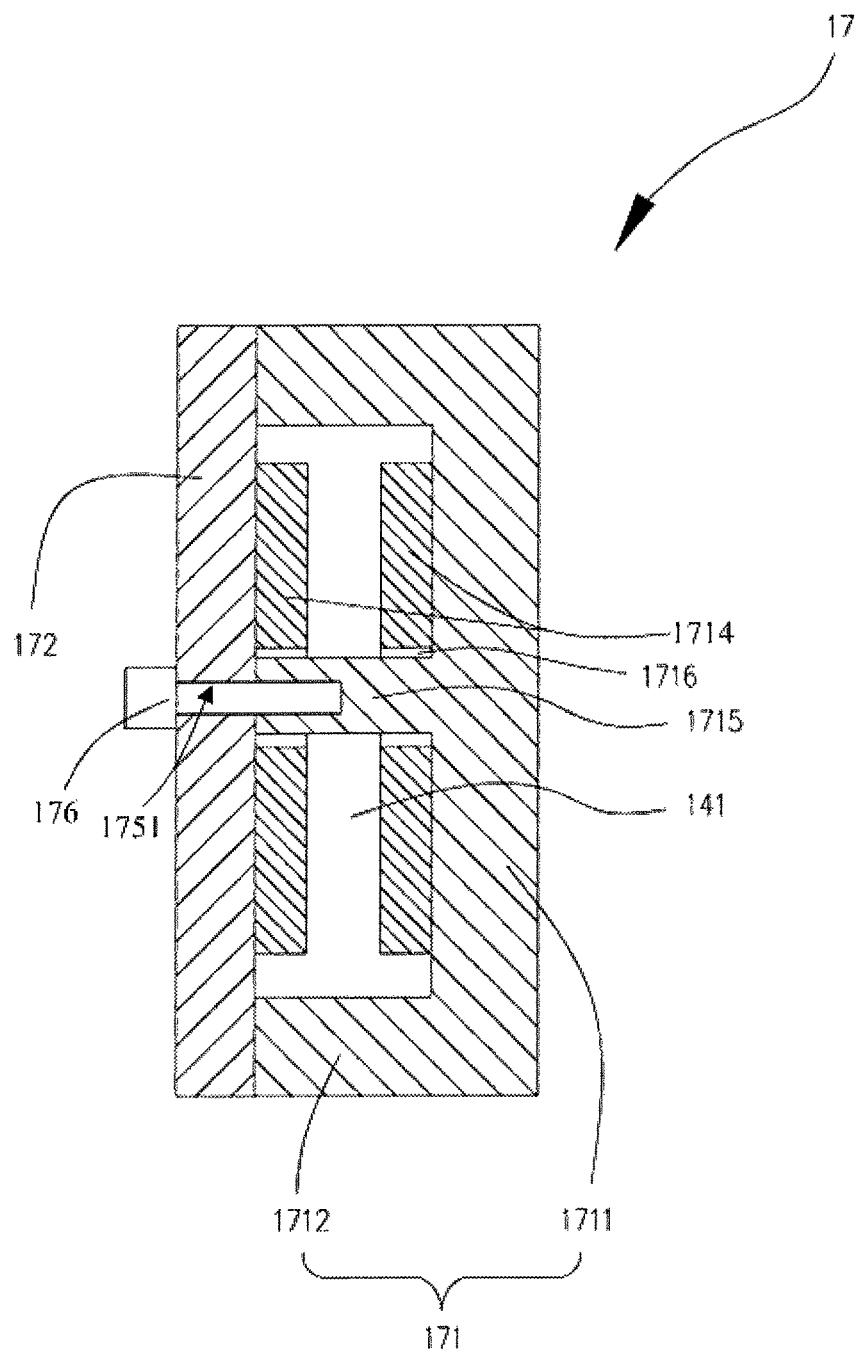
FIG. 9 illustrates a cross-sectional schematic view of a first supporter, in accordance with another embodiment of the present disclosure.

In one embodiment, as illustrated in FIG. 9, two guiding plates 1714 are disposed between the first base 171 and the first cover plate 172 separately. One of the two guiding plates 1714 is in contact with the first base 171, the other of the two guiding plates 1714 is in contact with the first cover plate 172. The first base 171 includes a mounting rod 1715 protruding towards the first cover plate 172. Each of the guiding plate 1714 defines a through-hole 1716 therein. The mounting rod 1715 can pass through the through-hole 1716 of each of the two guiding plates 1714. Correspondingly, the first cover plate 171 defines a screw hole 1751. A screw 176 can be inserted into the screw hole 1751 and be screwed into an end of the mounting rod 1715. Thus, the first guiding groove 141 (as illustrated in FIG. 2 and FIG. 5) is formed between the two guiding plates 1714. The coupling member 32 may be interposed into the first guiding groove 141 and in contact with the two guiding plates 1714. Then, the coupling member 32 can slide in the first supporter 17 smoothly.

Figure 10:
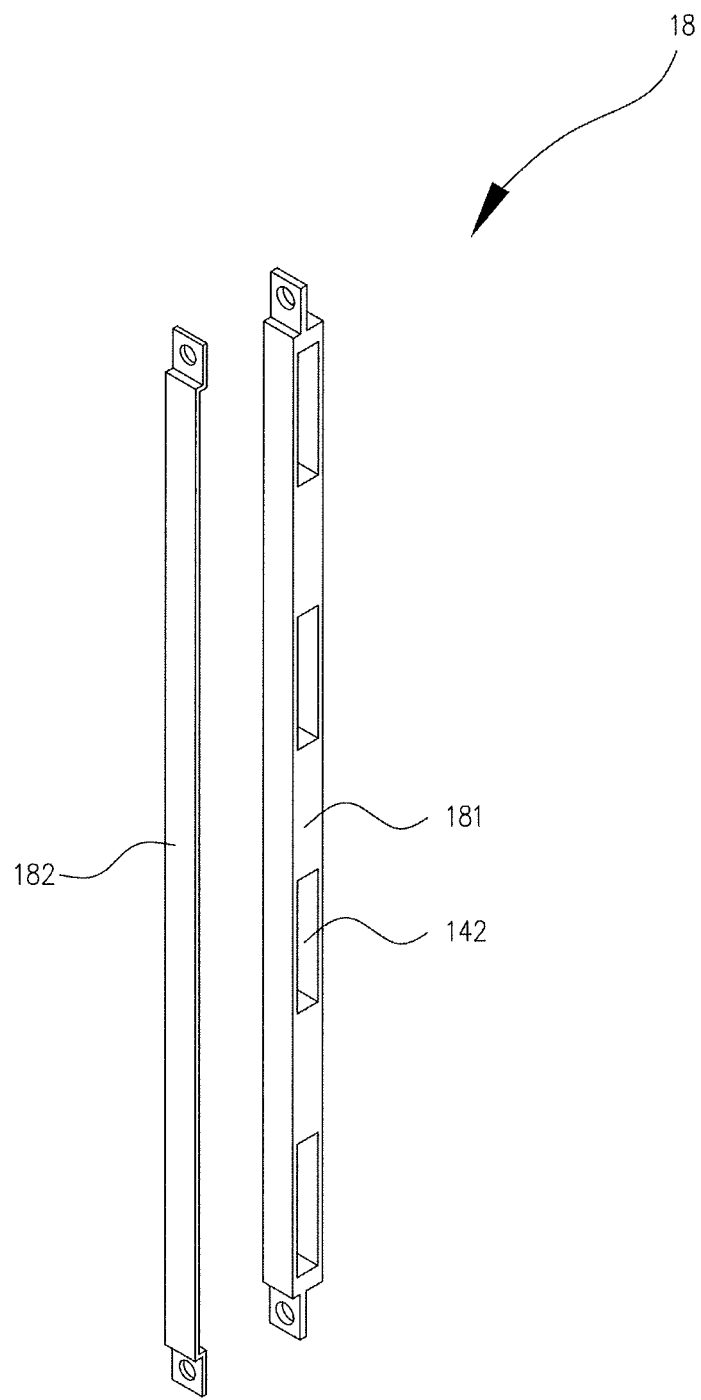
FIG. 10 illustrates an exploded view of a first auxiliary supporter of the first housing shown in FIG. 5.

In the present embodiment, as illustrated in FIG. 10, the first auxiliary supporter 18 includes a second base 181 and second cover plate 182. The second cover plate 182 is configured to be mounted on the second base 181. One end of the second cover plate 182 is coupled to one end of the second base 181 by means of screw; the other end of the second cover plate 182 is coupled to the other end of the second base 181 by means of screw. Two ends of the first auxiliary supporter 18 are coupled to the two second bearings 146 of the first inner sidewall 112 (as illustrated in FIG. 5) by means of screw. In other words, one end of the second base 181 together with one end of the second cover plate 182 are coupled to one of the two second bearings 146 by means of screw; the other end of the second base 181 together with the other end of the second cover plate 182 are coupled to the other of the two second bearings 146 by means of screw. A longitudinal direction of the second base 181 may be substantially parallel to the longitudinal direction of the first inner sidewall 112. A longitudinal direction of the second cover plate 182 may be substantially parallel to the longitudinal direction of the first inner sidewall 112. The second base 181 is closer to the first rear cover 12 than the second cover plate 182. In other words, the second base 181 is located between the second cover plate 182 and the first rear cover 12. The first auxiliary guiding grooves 142 (as illustrated in FIG. 5) are formed in the second base 181. The first auxiliary guiding grooves 142 are arranged along the longitudinal direction of the second base 181. The second base 181 can be made of thermoplastic crystalline polymers. Thus, the second base 181 may have properties of wear resistance, self-lubrication and heat resistance. The second base 181 can guide the coupling member 32 to slide smoothly, absorb a friction heat generated by sliding the coupling member 32 relative to the first housing 10, and increase a service life of the first auxiliary supporter 18. The second cover plate 182 can be rigid. The second cover plate 182 can support the second base 181 to avoid the second base 181 from being broken. As a result, the second base 181 can be fixed to the first mounting portion 144 firmly.

Figure 11:
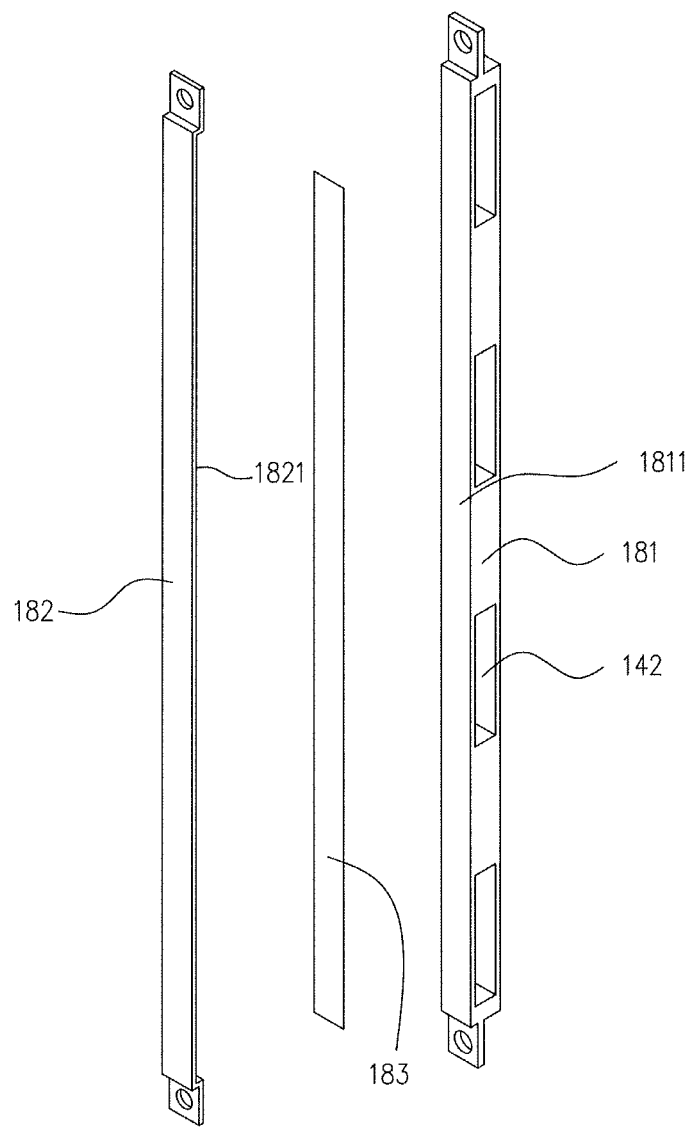
FIG. 11 illustrates an exploded view of a first auxiliary supporter, in accordance with another embodiment of the present disclosure.

In another embodiment, as illustrated in FIG. 11, the second base 181 may have a first mounting surface 1811 facing the second cover plate 182. The second cover plate 182 may have a second mounting surface 1821 facing the second base 181. An adhesive layer 183 can be disposed between the first mounting surface 1811 and the second mounting surface 1821. The second cover plate 182 can be adhered to the second base 181 by the adhesive layer 183. In still another embodiment, the second base 181 can be integrated with the second cover plate 182.

The first housing 10 can be rotated with respect to the second housing 20 by the coupling member 32. In a rotating process, the coupling member 32 can slide with respect to the first interior portion 14 of the first housing 10. A sliding distance of the coupling member 32 relative to the first interior portion 14 can be determined by a rotating angle of the first housing 10 relative to the second housing 20. In general, the larger the rotating angle is, the longer the sliding distance of the coupling member 32 is.

Figure 12:
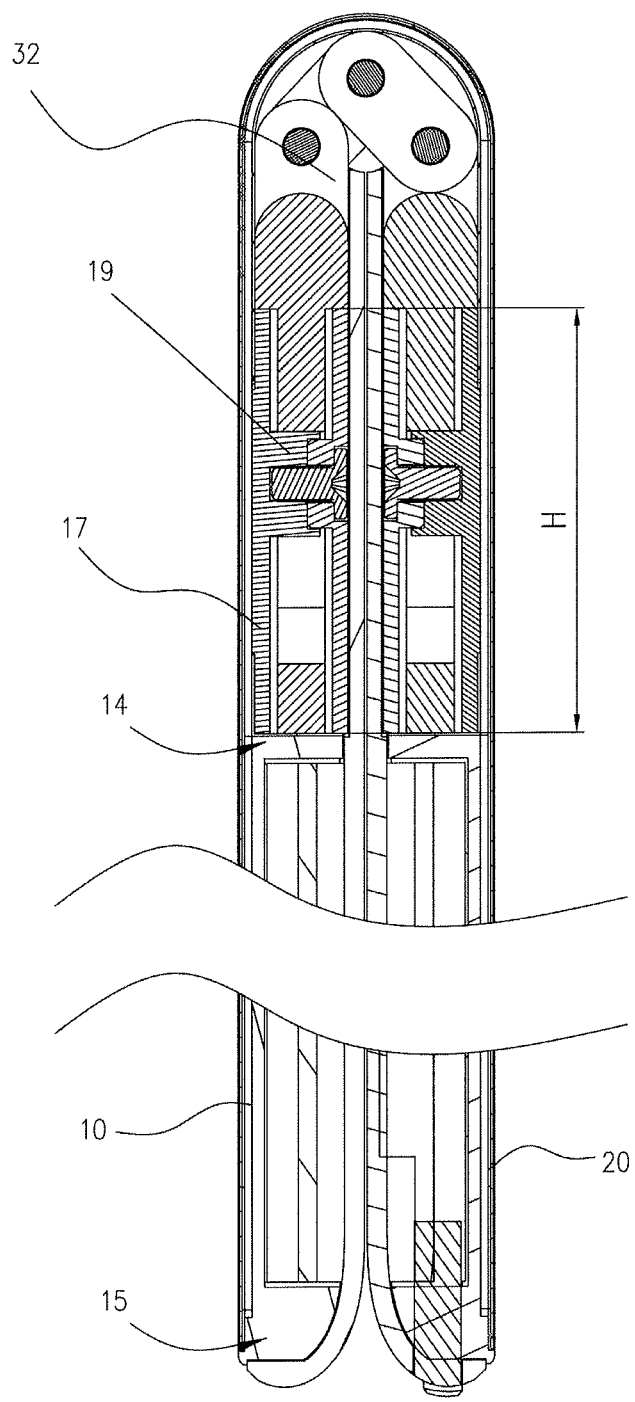
FIG. 12 illustrates a cross-sectional schematic view of the electronic device shown in FIG. 1, which is in a folded configuration.
Figure 13:
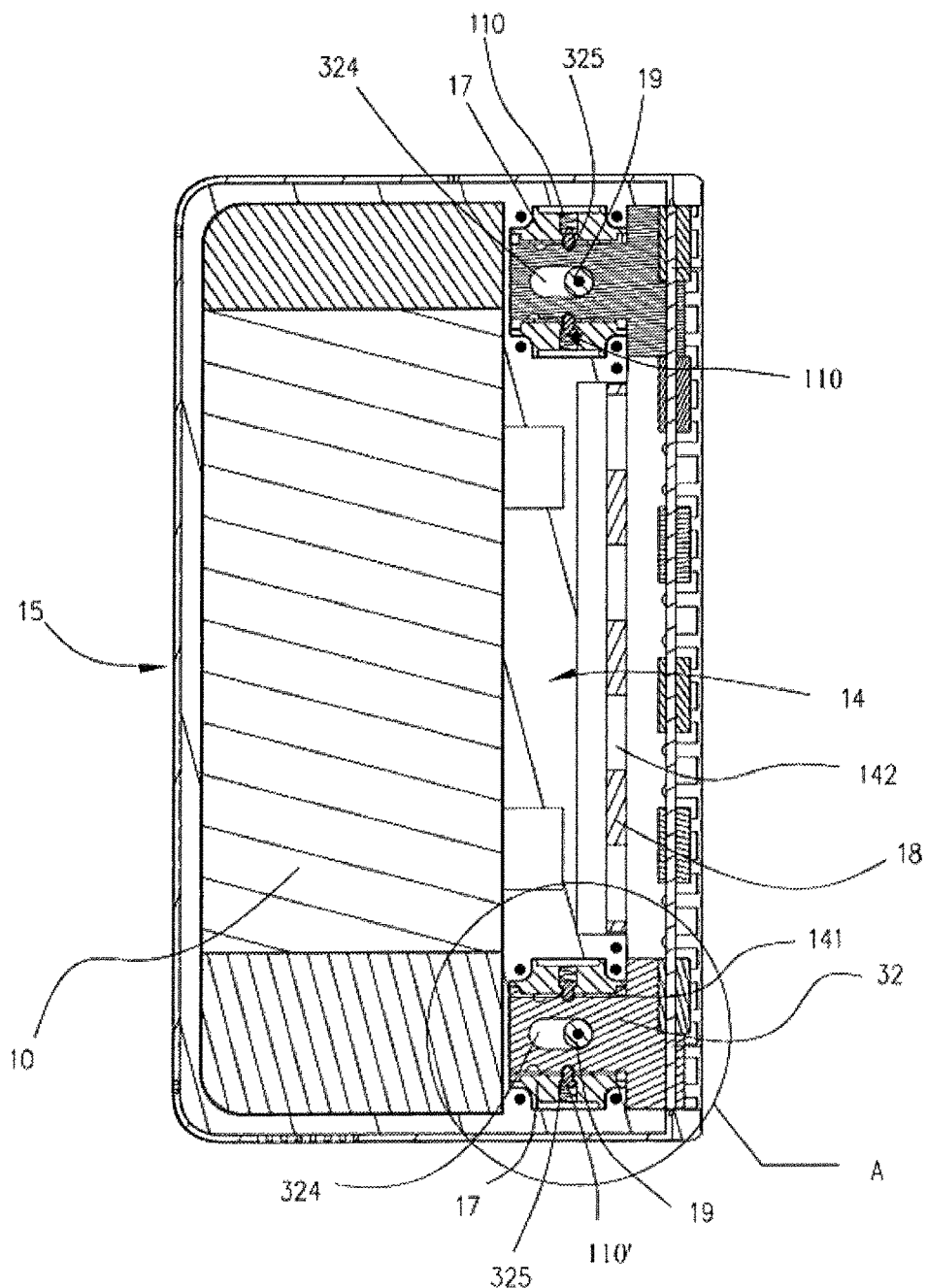
FIG. 13 illustrates another cross-sectional schematic view of the electronic device shown in FIG. 1, which is in a folded configuration.
Figure 14:
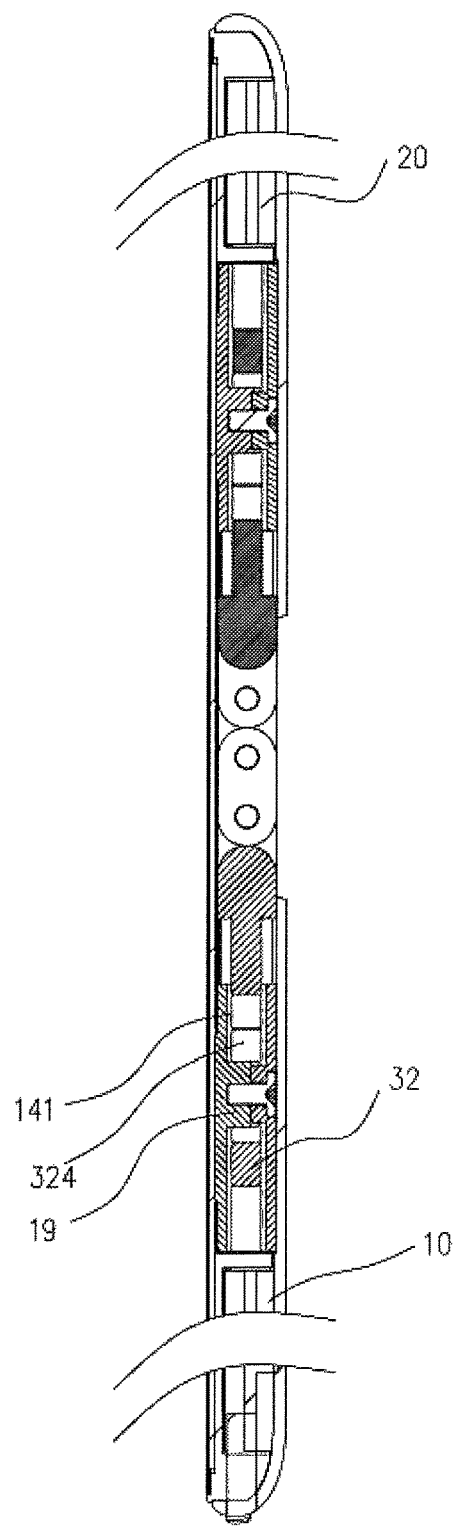
FIG. 14 illustrates a cross-sectional schematic view of the electronic device shown in FIG. 1, which is in an unfolded configuration.
Figure 15:
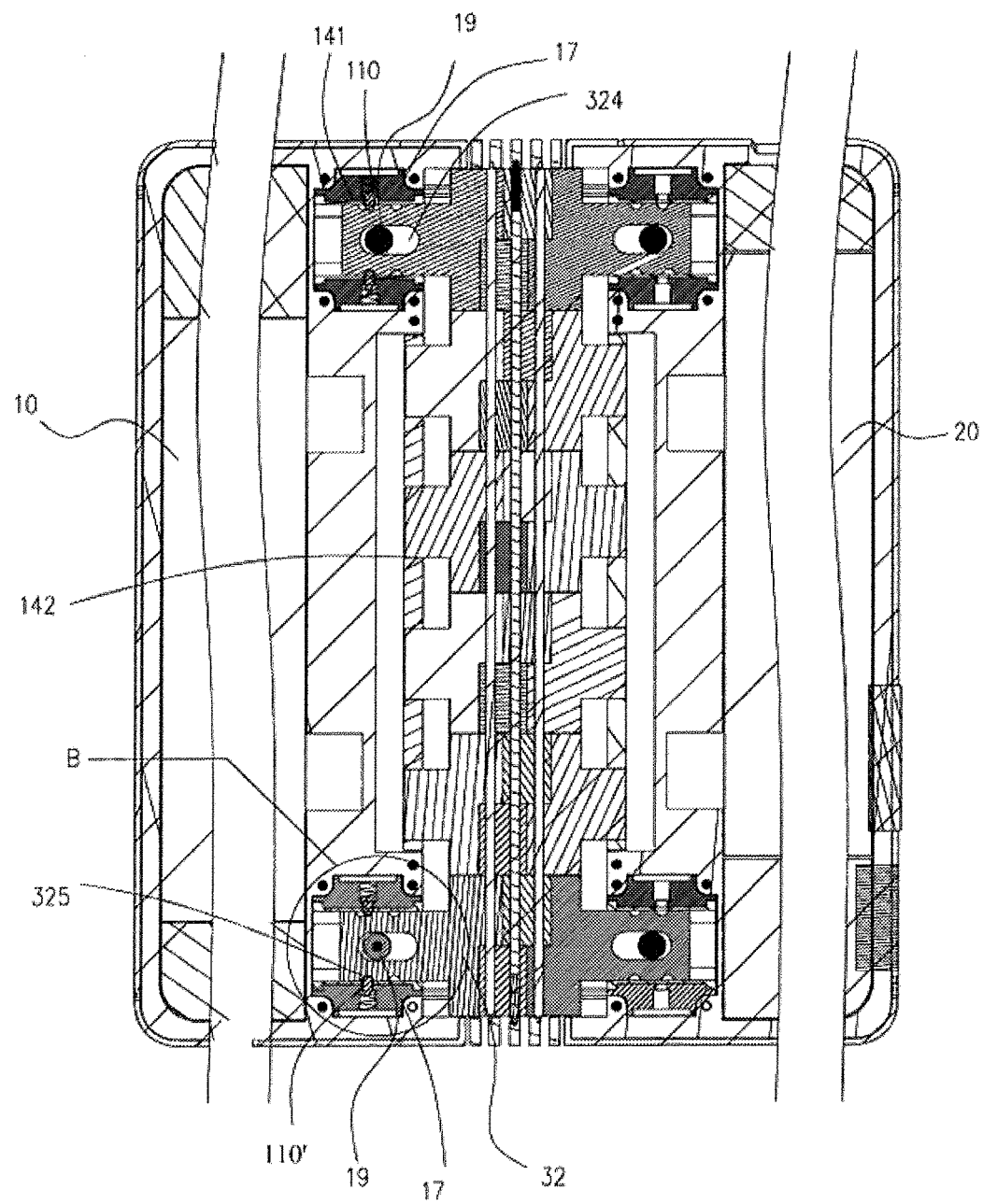
FIG. 15 illustrates another cross-sectional schematic view of the electronic device shown in FIG. 1, which is in an unfolded configuration.

As illustrated in FIG. 12 and FIG. 13, the mobile terminal 900 is in the folded configuration. By a rotation of the first housing 10 with respect to the second housing 20, the first housing 10 can be stacked onto the second housing 20 so as to fold the mobile terminal 900. During rotating the first housing 10 with respect to the second housing 20, the coupling member 32 may slide from the first interior portion 14 to the first exterior portion 15. That is, the coupling member 32 may slide into the first housing 10. The coupling member 32 may stop sliding from the first interior portion 14 to the first exterior portion 15 until the first housing 10 is stacked onto the second housing 20. The first guiding grooves 141 may have a predetermined length along a direction from the first interior portion 14 to the first exterior portion 15 (i.e., the extending direction of the first guiding grooves 141). The predetermined length is represented by H. The predetermined length is more than the sliding distance of the coupling member 32 relative to the first interior portion 14. Thus, the coupling member 32 sliding into the first guiding grooves 141 will not be in contact with the first front cover 11. The coupling member 32 sliding into the first guiding grooves 141 will not damage the first front cover 11. As illustrated in FIG. 14 and FIG. 15, the mobile terminal 900 is in the unfolded configuration. From the folded configuration to the unfolded configuration, the first housing 10 may be rotated with respect to the second housing 20. And then, the first housing 10 and the second housing 20 are substantially in a plane. During a process from the folded configuration to the unfolded configuration, the coupling member 32 may slide from the first exterior portion 15 to the first interior portion 14. That is, the coupling member 32 may slide away from the first exterior portion 15. Furthermore, the first housing 10 can be continually rotated with respect to the second housing 20 of the mobile terminal 900 in the unfolded configuration. Thus, the mobile terminal 900 can be from the unfolded configuration to the angular configuration. The coupling member 32 may continually slide from the first exterior portion 15 to the first interior portion 14. A distance of the first interior portion 14 (i.e., the openings 147) and a side of the coupling member 32 in the angular configuration is nearer than a distance of the first interior portion 14 (i.e., the openings 147) and the side of the coupling member 32 in the unfolded configuration.

Figure 16:
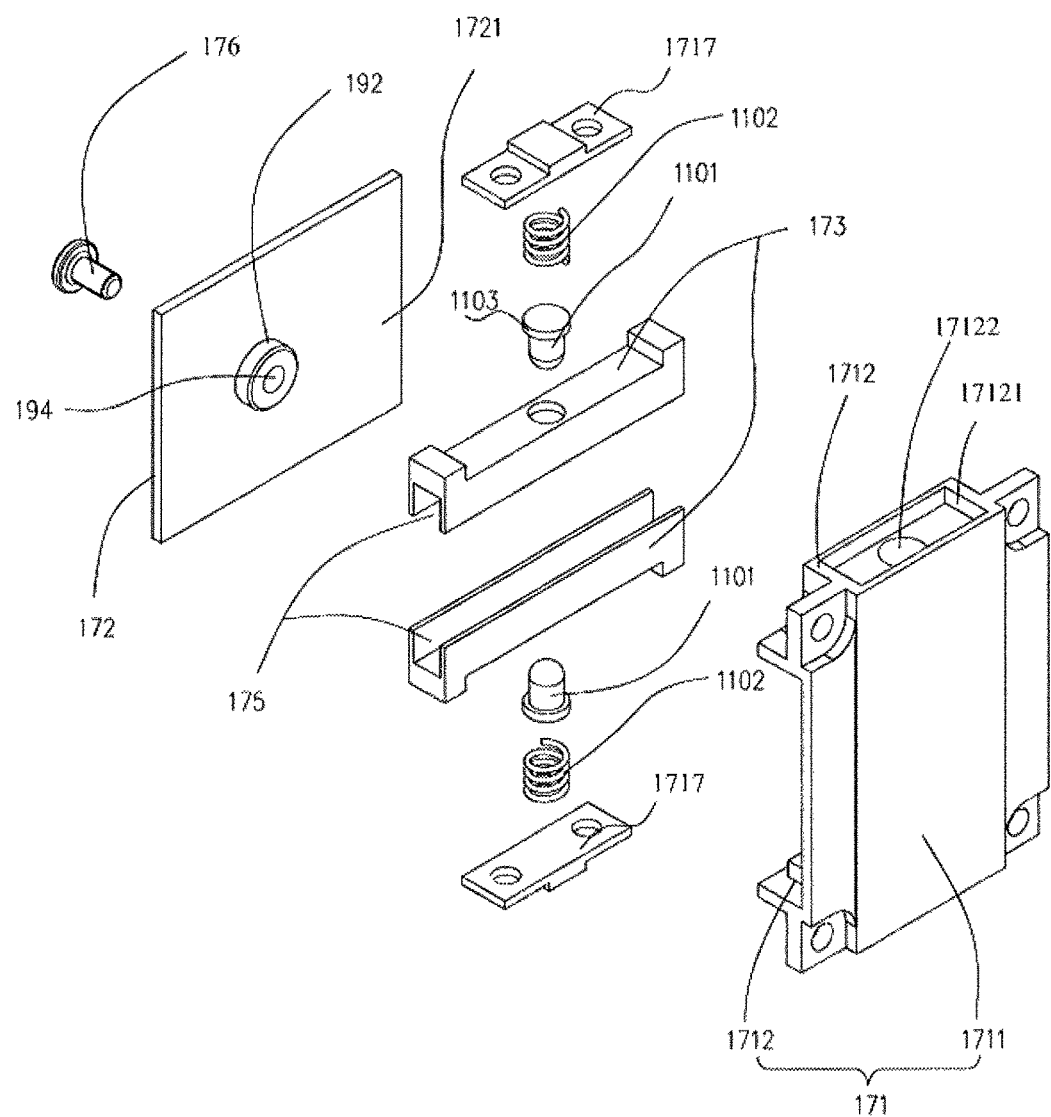
FIG. 16 illustrates another exploded view of a first supporter of the first housing shown in FIG. 5.
Figure 17:
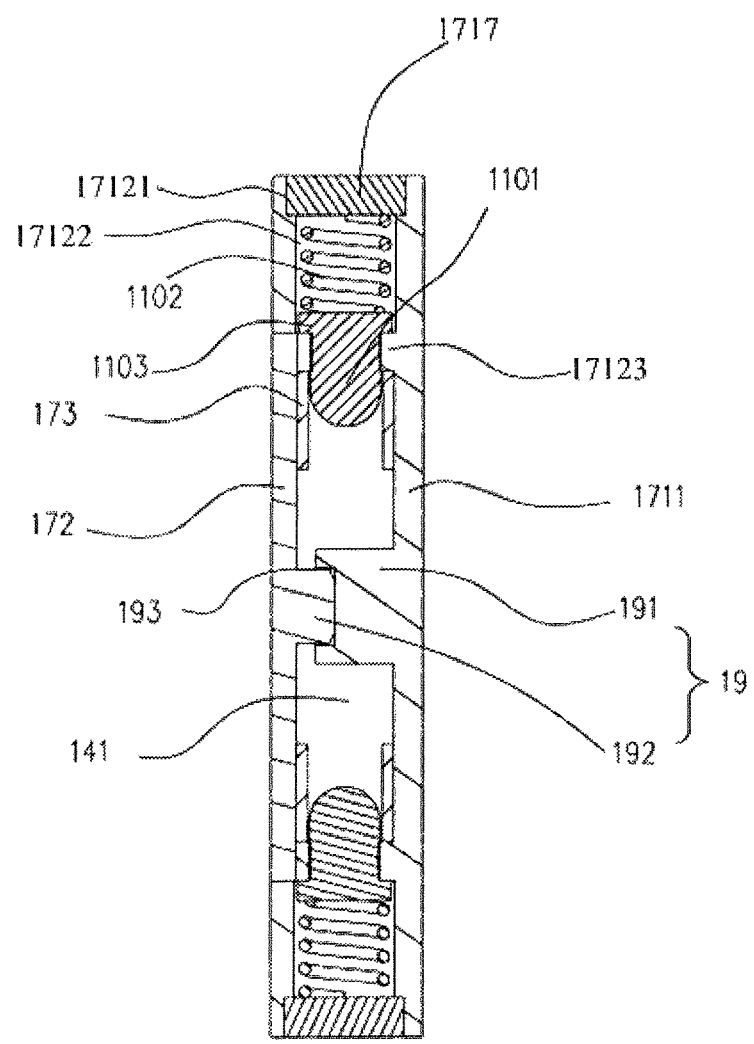
FIG. 17 illustrates a cross-sectional schematic view of a first supporter of the first housing shown in FIG. 5.

In the present embodiment, as illustrated in FIG. 16 and FIG. 17, each of the two the first supporters 17 includes the first blocking element 19. The first blocking element 19 is configured to block the coupling member 32 to be detached from the first guiding grooves 141 of the first interior portion 14 of the first housing 10. In one embodiment, the first housing 10 may include two first blocking elements 19. The two first blocking elements 19 can be configured to block two ends of a side of the coupling member 32 to be detached from the first housing 10. A blocking element may be not necessary for the first auxiliary supporter 18. Thus, the first auxiliary supporter 18 can have a simple structure. In one embodiment, each of the two first blocking elements 19 may include a blocking rod 191 and a blocking protrusion 192. The blocking rod 191 is protruded from the base plate 1711 towards the first cover plate 172. The blocking protrusion 192 is protruded from the first cover plate 172 towards the base plate 1711. A surface of the blocking rod 191 far away from the base plate 1711 defines a connecting groove 193. One end of the blocking protrusion 192 far away from the first cover plate 172 is configured to be inserted into the connecting groove 193. In other words, the end of the blocking protrusion 192 far away from the first cover plate 172 can be located in the connecting groove 193. Thus, the first blocking element 19 in the present embodiment may be firm. The blocking rod 191 can penetrate through the coupling member 32 in the first guiding grooves 141. Thus, the blocking rod 191 can block the coupling member 32 to slide out of the first guiding grooves 141. The first cover plate 172 may have an inner surface 1721. The inner surface 1721 faces the first base 171. The blocking protrusion 192 is substantially located at a center of the inner surface 1721. The blocking protrusion 192 has a screw hole 194. The first cover plate 172 also has a screw hole corresponding to the screw hole 194. A screw 176 can be screwed into the corresponding screw hole in the first cover plate 172 and the screw hole 194. Thus, the blocking protrusion 192 is firmly positioned on the inner surface 1721 of the first cover plate 172. Further, the one end of the blocking protrusion 192 far away from the first cover plate 172 is in contact with the blocking rod 191 and is located in the connecting groove 193. A structural stability of the first blocking element 19 can be improved. The first blocking element 19 will not be broken during a process of blocking the coupling member 32. Thus, the first supporter 17 can have a firm structure.

Figure 18:
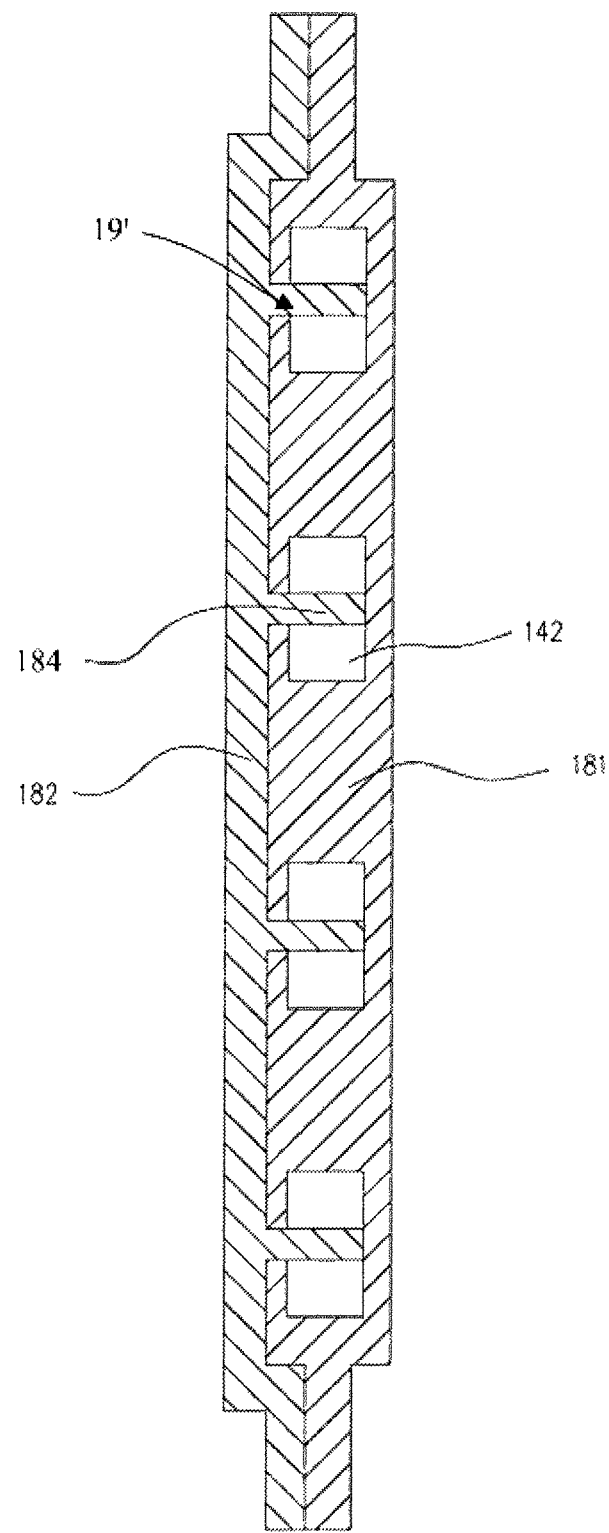
FIG. 18 illustrates a cross-sectional schematic view of a first auxiliary supporter, in accordance with another embodiment of the present disclosure.

In another embodiment, as illustrated in FIG. 18, the first auxiliary supporter 18 may include the first blocking element 19'. The first blocking element 19' can be positioned in the first auxiliary guiding grooves 142. The first blocking element 19' is disposed on the second cover plate 182. For example, the first blocking element 19' can include a number of protruding rods 184. Each of the first blocking element 19' penetrates the second base 181 and passes through the corresponding first auxiliary guiding groove 142. In addition, the first blocking element 19' can be coupled to the coupling member 32 in the first auxiliary guiding grooves 142. Thus, the first blocking element 19' can prevent the coupling member 32 from sliding out of the first auxiliary guiding groove 142.

Figure 19:
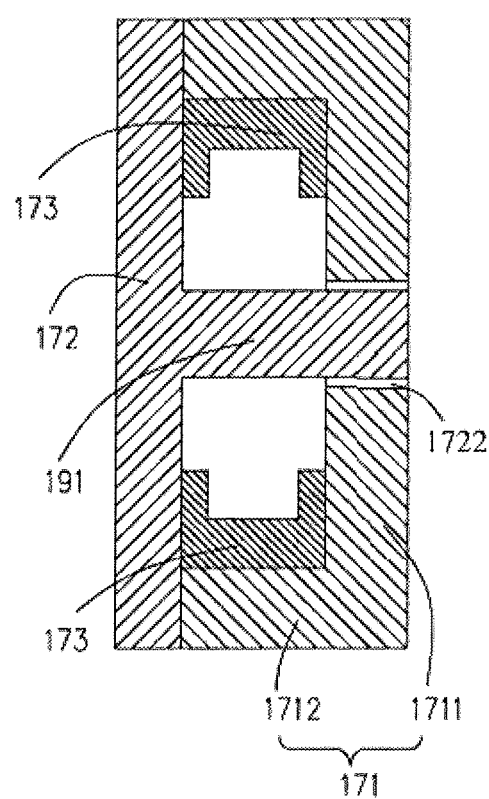
FIG. 19 illustrates a cross-sectional schematic view of a first supporter, in accordance with another embodiment of the present disclosure.

In another exemplary embodiment, as illustrated in FIG. 19, the blocking rod 191 may be disposed on the first cover plate 172 towards to the first base 171. The first base 171 defines a connecting hole 1722. The one end of the blocking rod 191 far away from the first cover plate 172 can pass through the connecting hole 1722. Thus, the blocking rod 191 is located between the first cover plate 172 and the first base 171 and in the first guiding groove 141.

Figure 20:
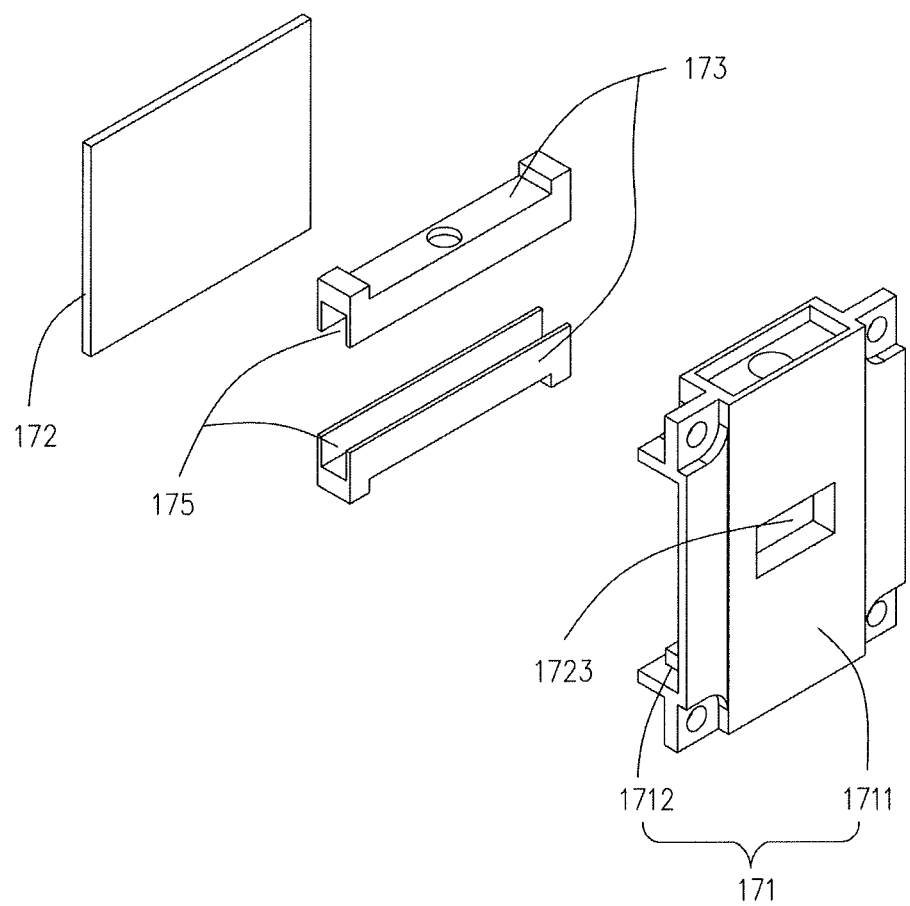
FIG. 20 illustrates an exploded view of a first supporter, in accordance with another embodiment of the present disclosure.
Figure 31:
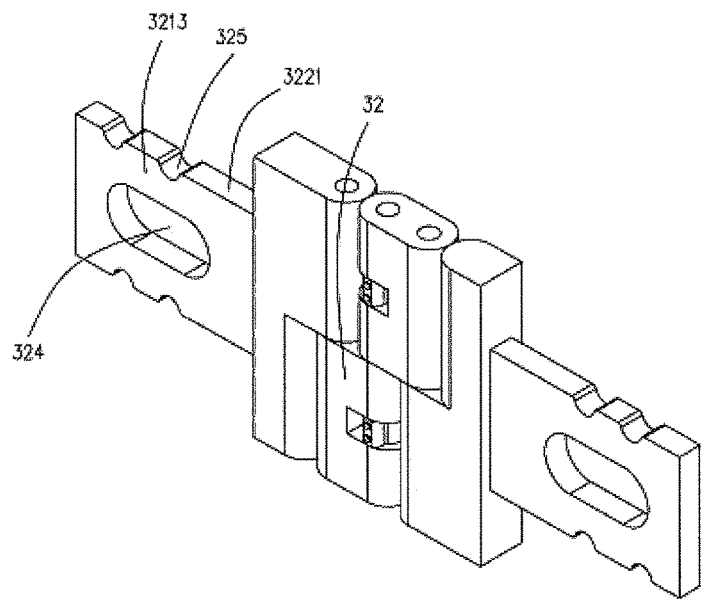
FIG. 31 illustrates a partial schematic view of the coupling member shown in FIG. 30.

In still another exemplary embodiment, the first blocking element 19 can be disposed on the coupling member 32. Correspondingly, as illustrated in FIG. 20, the first housing 10 may define a blocking groove 1723. For example, the base plate 1711 of the first base 171 of the first supporter 17 can define a blocking groove 1723. The blocking groove 1723 can be configured for coupling to the first blocking element 19 disposed on the coupling member 32. A longitudinal direction of the blocking groove 1723 is substantially parallel to the longitudinal direction of the first guiding grooves 141 (i.e., the extending direction of the first guiding grooves 141). The first blocking element 19 disposed on the coupling member 32 can have a locating rod 324' (as illustrated in FIG. 31). The locating rod 324' can be slidably located in the blocking groove 1723. Thus, the blocking groove 1723 can prevent the locating rod 324' from sliding out of the blocking groove 1723. Then, the coupling member 32 can be prevented from sliding out of the first guiding grooves 141 and can not be detached from the first housing 10.

In order to prevent the coupling member 32 from sliding out of the first guiding grooves 141 and the first auxiliary guiding grooves 142, the first housing 10 may further include a first blocking element 19. The first blocking element 19 is configured to block the coupling member 32 sliding towards to the first interior portion 14. Thus, the coupling member 32 will not be detached from the first interior portion 14 of the first housing 10.

The first housing 10 may further include at least one first locating element 110. A location of the coupling member 32 relative to the first housing 10 can be fixed by the first locating element. That is, the first locating element 100 is configured for locating a location of the first connection part 3211 along the sliding direction of first connection part 3211. An angle between the first housing 10 and the second housing 20 of the mobile terminal 900 in the angular configuration is depended on the location of the coupling member 32 relative to the first housing 10. It is noted that, the angle between the first housing 10 and the second housing 20 of the mobile terminal 900 can be in a range from 0 to 240°. For example, the angle can be 15°, 26°, 30°, 38°, 109°, 120°, or 201°.

As illustrated in FIG. 13 and FIG. 15 again, in the present embodiment, the first locating element 110 is disposed on the first supporter 17. The first locating element 110 is configured to locate the coupling member 32 in the first guiding groove 141. Thus, the coupling member 32 can be located at a predetermined location relative to the first housing 10. In the present embodiment, two first locating elements 110 can be disposed on the first supporter 17. That is, the first locating element 110 may be not necessary for the first auxiliary supporter 18. Thus, the first housing 10 can have a simple structure.

As illustrated in FIG. 16 and FIG. 17 again, the fixing portion 1712 of the first base 171 may define a space 17121. The space 17121 is located at a side of the fixing portion 1712 far away from the guiding bar 173. Further, the fixing portion 1712 of the first base 171 may define a through-hole 17122 communicated with the space 17121. An axis of the through-hole 17122 is substantially perpendicular to the extending direction of first guiding grooves 141. The fixing portion 1712 may have a first rib 17123 disposed in the through-hole 17122. The first rib 17123 is located at the end of the through-hole 17122 far away from the space 17121. The first base 171 may include a shielding plate 1717. The shielding plate 1717 can be disposed in the space 17121 and coupled to the fixing portion 1712 by means of screw so as to shield the through-hole 17122.

Figure 21:
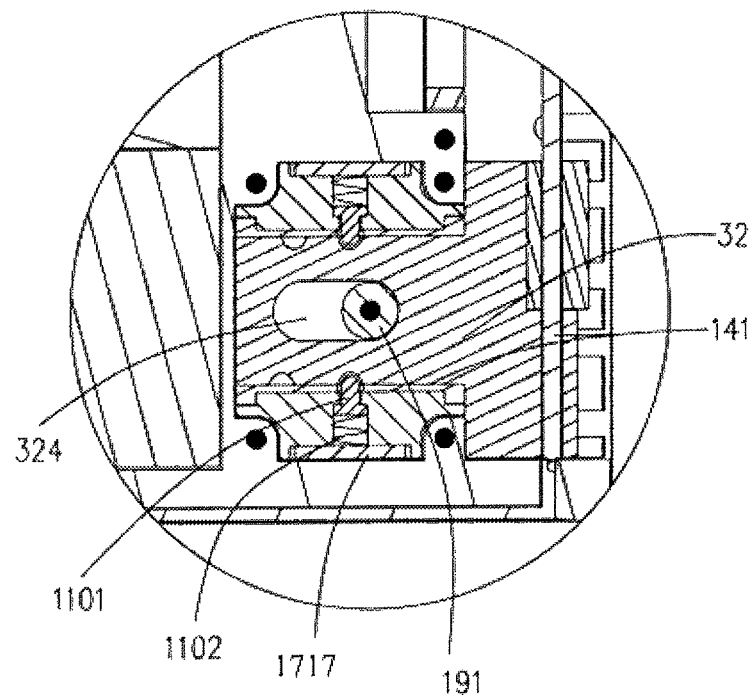
FIG. 21 illustrates an enlarged view of part A in FIG. 13.
Figure 22:
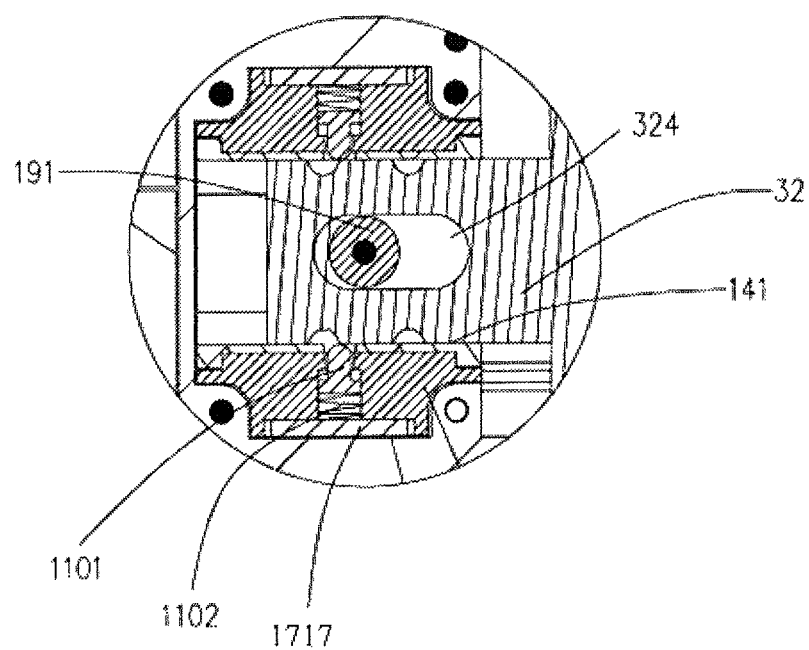
FIG. 22 illustrates an enlarged view of part B in FIG. 15.

Each of the first locating element 110 may include a locating pin 1101 and a compressible elastic unit 1102. The locating pin 1101 is configured to be inserted in the through-hole 17122 and slide along the axis of the through-hole 17122. The compressible elastic unit 1102 can be compressed between the fixing portion 1712 and the shielding plate 1717. The compressible elastic unit 1102 can be a spring. The compressible elastic unit 1102 is disposed in the through-hole 17122 and is configured for providing a force to the locating pin 1101 to away from the shielding plate 1717 (i.e., towards the first sliding plate 3211). The locating pin 1101 is inserted in the compressible elastic unit 1102. Further, the locating pin 1101 can penetrate through the guiding bar 173. The locating pin 1101 can slide along the axis of the through-hole 17122 away from the shielding plate 1717 or towards the shielding plate 1717. The locating pin 1101 may have a second rib 1103. The second rib 1103 is located at the end coupled to the compressible elastic unit 1102. The second rib 1103 is located in the through-hole 17122 and in contact with the first rib 17123. Thus, the locating pin 1101 is prevented from sliding out of the through-hole 17122. As illustrated in FIG. 21, the compressible elastic unit 1102 provides a force to the locating pin 1101 so that the locating pin 1101 can slide away from the shielding plate 1717. The locating pin 1101 can be in contact with the coupling member 32. For example, the locating pin 1101 can be located in a recess 325 (as illustrated in FIG. 31) of the coupling member 32. Thus, the coupling member 32 in the first guiding grooves 141 can stop sliding. As illustrated in FIG. 22, during sliding the coupling member 32, the end of the locating pin 1101 is in contact with the sliding surface 3221 (as illustrated in FIG. 31) of the coupling member 32, the compressible elastic unit 1102 can be still compressed and provide a force perpendicular to the extending direction of the first guiding grooves 141 to the locating pin 1101. The locating pin 1101 can slide on the sliding surface 3221. Thus, the coupling member 32 in the first guiding groove 141 can slide.

Figure 23:
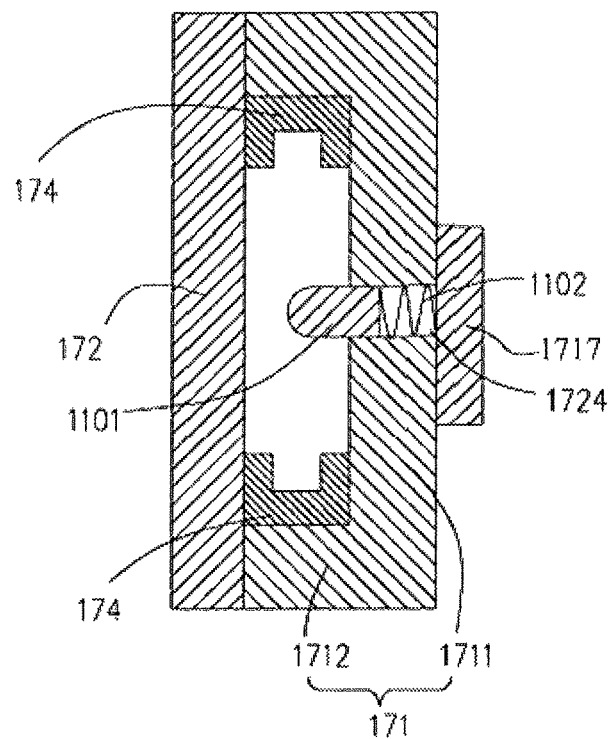
FIG. 23 illustrates a cross-sectional schematic view of a first supporter, in accordance with another embodiment of the present disclosure.

In another exemplary embodiment, as illustrated in FIG. 23, the base plate 1711 can define a through-hole 1724. The locating pin 1101 is slidably disposed in the through-hole 1724. The shielding plate 1717 is attached on a side of the base plate 1711 far away from the first cover plate 172 for shielding the through-hole 1724. The compressible elastic unit 1102 is located in the through-hole 1724 and between the locating pin 1101 and the shielding plate 1717. The compressible elastic unit 1102 is coupled to the locating pin 1101 and the shielding plate 1717. The compressible elastic unit 1102 is configured for providing a force to the locating pin 1101 to away from the shielding plate 1717. For example, the locating pin 1101 can be located in a recess 325 of the first connection part 3211 (as illustrated in FIG. 31) of the coupling member 32. Thus, the coupling member 32 can stop sliding along the first guiding grooves 141. In addition, the end of the locating pin 1101 can be in contact with the sliding surface 3221 of the first connection part 3211 (as illustrated in FIG. 31) of the coupling member 32 to slide on the sliding surface 3221. Thus, the coupling member 32 in the first guiding groove 141 can sliding along the first guiding grooves 141.

In the present embodiment, as illustrated in FIG. 16 and FIG. 17, a configuration of the end of the locating pin 1101 far away from the shielding plate 1717 is semisphere-shaped. The end of the locating pin 1101 far away from the shielding plate 1717 can and slide on the sliding surface 3221 of the first connection part 3211 in a condition of a force parallel to the sliding surface 3221. The first housing 10 can be rotated relative to the second housing 20. It is noted that, the force parallel to the sliding surface 3221 applied to a first sliding plate 3213 can be generated by the rotation of the first housing 10 with respect to the second housing 20. In addition, the compressible elastic unit 1102 provides the force towards the first connection part 3211 to the locating pin 1101. The end of the locating pin 1101 far away from the shielding plate 1717 can always be in contact with the first connection part 3211 in the first guiding groove 141 and slide into the corresponding first locating recess 325. Thus, the end of the locating pin 1101 far away from the shielding plate 1717 is coupled to the corresponding first locating recess 325 so that the first connection part 3211 is prevented from sliding on the sliding surface 3221. As mentioned above, the configuration of the end of the locating pin 1101 far away from the shielding plate 1717 is semi-sphere-shaped. When the force parallel to the sliding surface 3221 is still applied to the first sliding plate 3213 by rotating the first housing 10 with respect to the second housing 20, a decomposition force can be generated to be applied to the locating pin 1101. Thus, the locating pin 1101 can slide far away from the first connection part 3212 to out of the corresponding first locating recess 325 in a condition that the decomposition force is more than the force generated by the compressible elastic unit 1102. Thus, the end of the locating pin 1101 far away from the shielding plate 1717 can be coupled to another corresponding first locating recess 325. In other embodiments, the configuration of the end of the locating pin 1101 far away from the shielding plate 1717 can be cone-shaped, wedged-shaped, or other configurations with a sloped surface. Thus, the force parallel to the sliding surface 3221 applied to the sloped surface of the locating pin 1101 can generate a decomposition force parallel to an axis of the locating pin 1101. The locating pin 1101 can slide out of the corresponding first locating recess 325 in a condition of the decomposition force.

It is noted that, the first housing 10 can include a supporter (i.e., one of the first supporter 17 and the first auxiliary supporter 18, or other supporters with different structure) for coupling to the coupling member 32. It is also noted that, the coupling member 32 can include a sliding plate (i.e., one of the first sliding plate 3213 and the first auxiliary sliding plate 3214, or other sliding plate with different structure) for coupling to the first housing 10.

Figure 24:
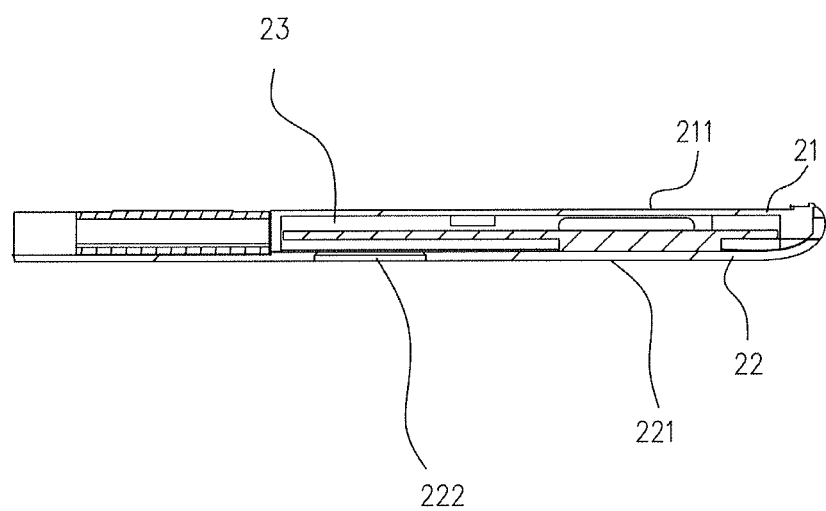
FIG. 24 illustrates a cross-sectional schematic view of a second housing of the electronic device shown in FIG. 1.
Figure 25:
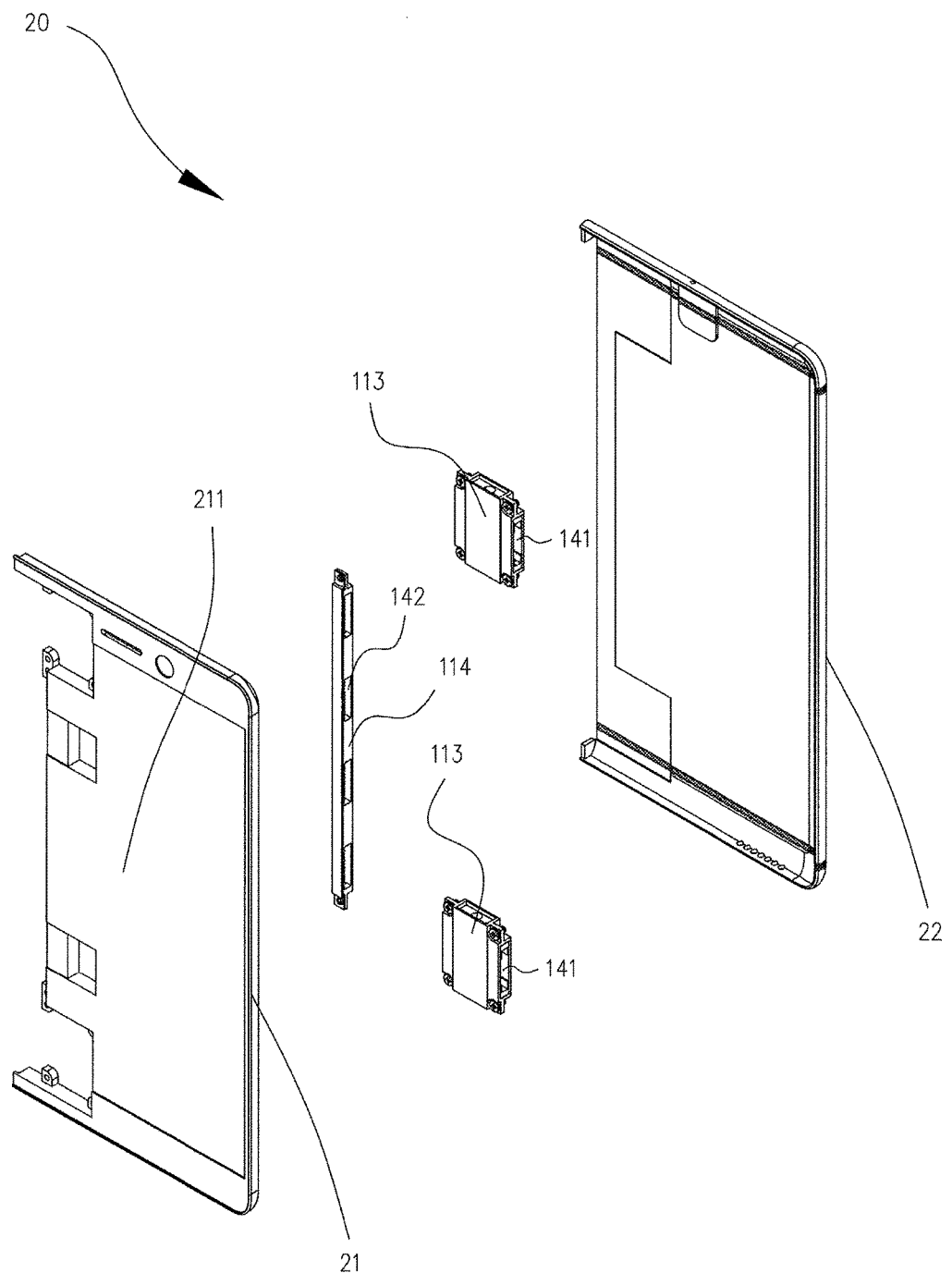
FIG. 25 illustrates an exploded view of a second housing of the electronic device shown in FIG. 1.
Figure 26:
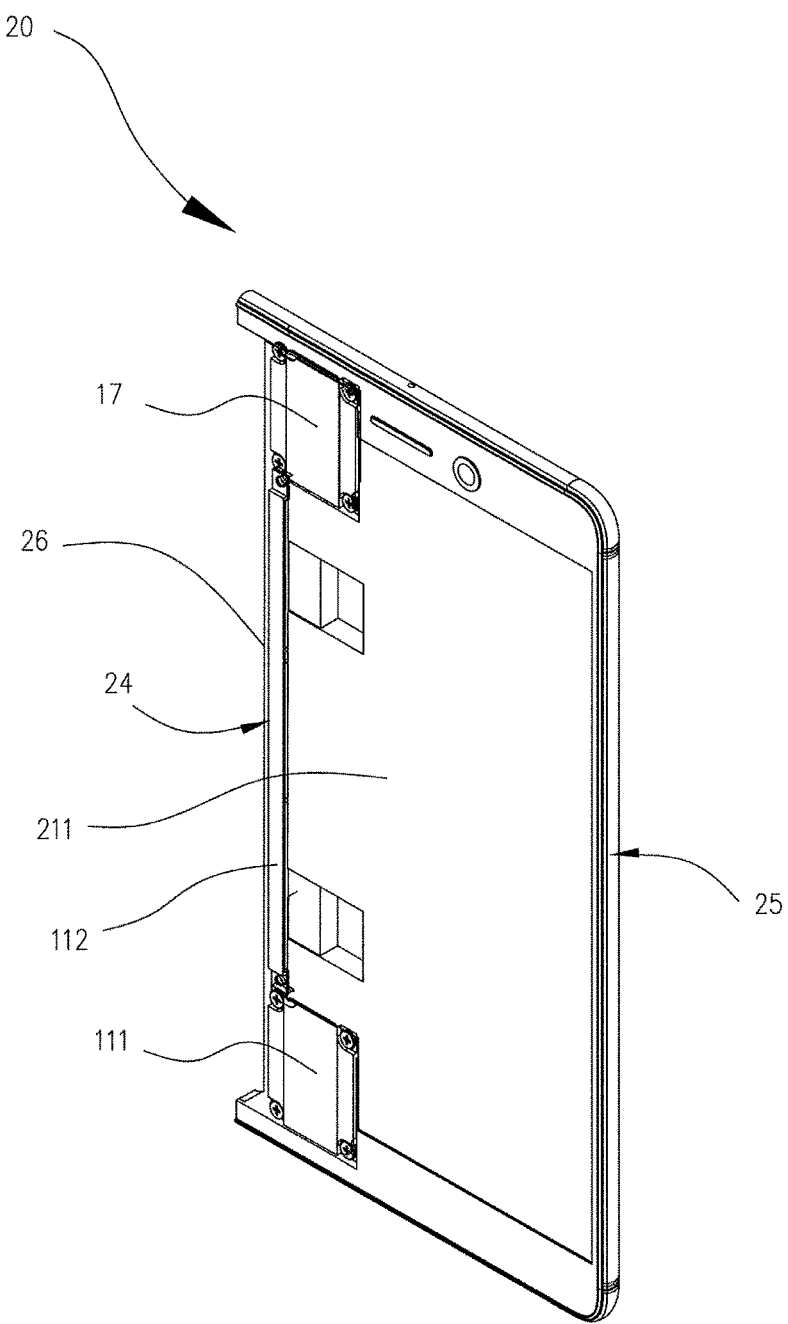
FIG. 26 illustrates an assembled view of a second housing of the electronic device shown in FIG. 1.

As illustrated in FIG. 24, FIG. 25 and FIG. 26, in the present embodiment, the second housing 20 includes a second front cover 21 and a second rear cover 22. The second rear cover 22 is coupled to the second front cover 21 to form a second accommodating cavity 23. The second accommodating cavity 23 is configured for accommodating the electronic component group 300 (as illustrated in FIG. 1). The second front cover 21 includes a second supporting surface 211. The second supporting surface 211 is configured for supporting the second portion 42 of the flexible display panel 40 (as illustrated in FIG. 1). The second rear cover 22 may be coupled to the second front cover 21 and located on a side of the second front cover 21 opposite to the second supporting surface 211. The second rear cover 22 has a second rear surface 221 far away from the second front cover 21. The first supporting surface 111 and the second supporting surface 221 are configured for supporting the flexible display panel 40.

As illustrated in FIG. 25 and FIG. 26, the second housing 20 includes a second interior portion 24 and a second exterior portion 25. The second interior portion 24 is coupled to the connecting module 30, and the second exterior portion 25 is far away from the connecting module 30. In the present embodiment, the second interior portion 24 is coupled to the connecting member 31 and the coupling member 32. The connecting member 31 is fixed to the second interior portion 24, and the coupling member 32 is slidably coupled to the second interior portion 24. The second exterior portion 25 is configured to be coupled to the second portion 42 of the flexible display panel 40. For example, an edge of the second portion 42 far away from the first portion 41 is coupled to the second exterior portion 25 of the second housing 20. The second portion 42 of the flexible display panel 40 is positioned on the second supporting surface 211. Thus, the second housing 20 can support the second portion 42 of the flexible display panel 40 effectively. The second housing 20 is similar to the first housing 10, according to the description of the first housing 10 (including the first supporter 17, the first auxiliary supporter 18, the first blocking element 19, the first locating member 110, etc.), the corresponding structure of the second housing 20 can be understood and not described here. The second housing 20 may include a second groove similar to the first groove 16 for partially receiving the coupling member 32. That is, the second housing 20 is configured for receiving the second connection part 3212 of the coupling member 32. The coupling member 32 can be partially received in at least one of the first groove 16 and the second groove and is slidable with respect to the first housing 10 and the second housing 20.

Figure 27:
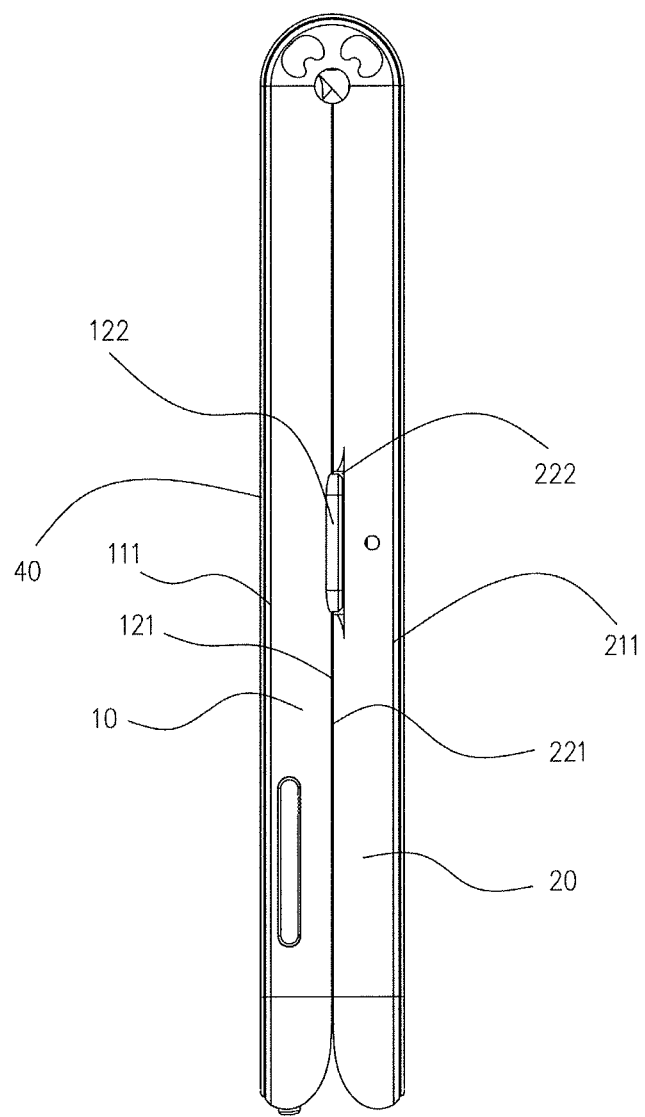
FIG. 27 illustrates a schematic view of the electronic device shown in FIG. 1, which is in a folded configuration.
Figure 28:
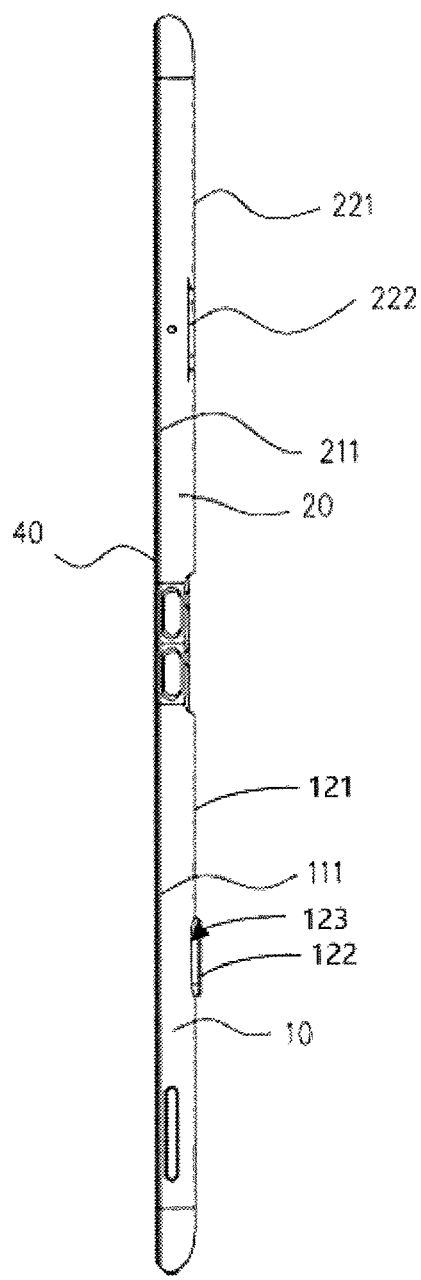
FIG. 28 illustrates a schematic view of the electronic device shown in FIG. 1, which in an unfolded configuration.

As illustrated in FIG. 27, when the mobile terminal 900 is in the folded configuration, the first rear surface 121 of the first rear cover 12 can be attached to the second rear surface 221 of the second rear cover 22. The first supporting surface 111 and the second supporting surface 211 are located on two opposite sides of the mobile terminal 900. As illustrated in FIG. 28, when the mobile terminal 900 is in the unfolded configuration, the first rear surface 121 of the first rear cover 12 can be aligned to the second rear surface 221 of the second rear cover 22. The first supporting surface 111 and the second supporting surface 211 are located on the same side of the mobile terminal 900. That is, the first rear surface 121 of the first rear cover 12 and the second rear surface 221 of the second rear cover 22 are coplanar. The first supporting surface 111 and the second supporting surface 221 are configured for supporting the flexible display panel 40.

As illustrated in FIG. 27 and FIG. 28, in one embodiment, the first housing 10 may include a protruding portion 122. The protruding portion 122 is positioned on the first rear surface 121. The protruding portion 122 can be formed by a part of the other component such as an end of a camera, an end of a flash light or an end of a press button. That is, the protruding portion 122 is protruded from the first rear surface 121. Thus, a distance between the first supporting surface 111 and the first rear surface 121 can be reduced. A thickness of the first housing 10 can be reduced, thereby achieving a thin design. Correspondingly, the second rear surface 221 of the second housing 20 may define an indentation 222. In the folded configuration of the mobile terminal 900, the protruding portion 122 can be inserted into the indentation 222 so that the first rear surface 121 is attached to the second rear surface 221. A depth of indentation 222 can be either more than or equal to a height of the protruding portion 122 protruding from the first rear surface 121. Thus, in the folded configuration of the mobile terminal 900, the protruding portion 122 can be received in the indentation 222, and the protruding portion 122 will not be in contact with the second housing 20. Therefore, a service life of the housing assembly 100 can be increased, and the housing assembly 100 in the folded configuration can have a good appearance.

Additionally, as illustrated in FIG. 28, in another embodiment, the first housing 10 can define an aperture 123 through the first rear surface 121. Thus, the other component in the first housing 10 can pass through the aperture 123. For example, an end of the camera, an end of the flash light or an end of the press button can pass through the aperture 123 to be located outside of the first rear cover 12 of the first housing 10. Thus, the protruding portion 122 is formed by the end of the camera, the end of the flash light or the end of the press button outside the first rear cover 12. In the folded configuration of the mobile terminal 900, the aperture 123 may substantially face the indentation 222 so that the protruding portion 122 can be received in the indentation 222. And then, the first rear surface 121 can be attached to the second rear surface 221.

In the present embodiment, the mobile terminal 900 can be in the folded configuration, the angular configuration, or the unfolded configuration. From the unfolded configuration to the folded configuration or the angular configuration, the first housing 10 and the second housing 20 are close to each other by bending the connecting member 31 of the connecting module 30. From the folded configuration to the unfolded configuration or the angular configuration, the first housing 10 and the second housing 20 are far away from each other.

Figure 29:
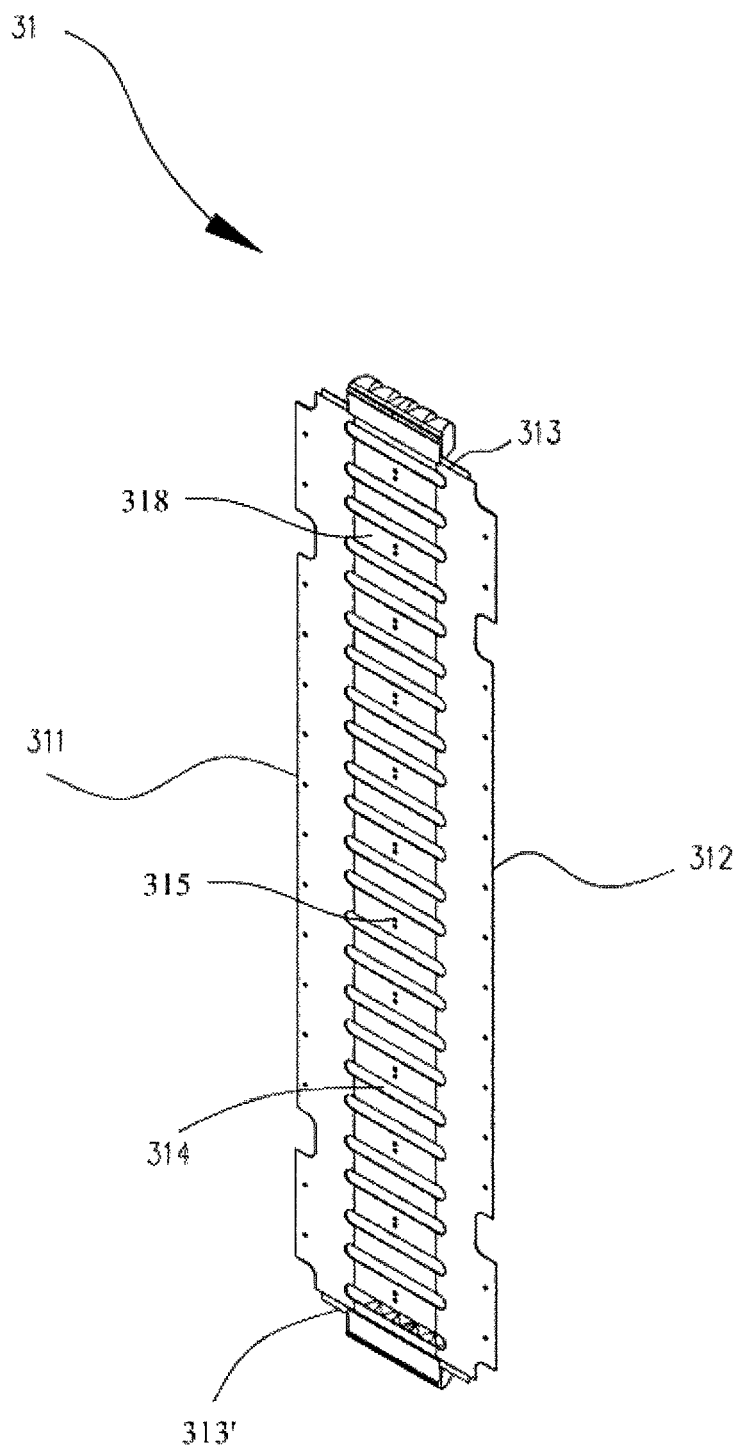
FIG. 29 illustrates a schematic view of a connecting member of a connecting module of the electronic device shown in FIG. 1.

The connecting member 31 is configured to couple the first housing 10 to the second housing 20. As illustrated in FIG. 29, the connecting member 31 may include a first connecting portion 311, a second connecting portion 312 and a body portion 318 between the first connecting portion 311 and the second connecting portion 312. The first connecting portion 311 and the second connecting portion 312 are located at two opposite sides of a longitudinal central line of the body portion 318. The first connecting portion 311 is configured to be coupled to the first housing 10, and the second connecting portion 312 is configured to be coupled to the second housing 20. The connecting member 31 is bendable, and even foldable. The first housing 10 and the second housing 20 can be angular or stacked by bending the connecting member 31. The first connecting portion 311, the second connecting portion 312 and the body portion 318 can be integrally formed. In some embodiments, the first connecting portion 311, the second connecting portion 312 and the body portion 318 can be individually formed and coupled.

The body portion 318 may include a first connecting side 313 and a second connecting side 313'. The first connecting portion 311 and the second connecting portion 312 are located two opposite sides of the connecting member 31. The first connecting side 313 and the second connecting side 313' are opposite and located between the first connecting portion 311 and the second connecting portion 312. A length of the first connecting portion 311 is equal to a length of the second connecting portion 312. The length of the first connecting portion 311 is more than a length of each of the first connecting side 313 and the second connecting side 313'. The first connecting portion 311 is configured to be coupled to the first interior portion 14 of the first housing 10 (as illustrated in FIG. 2). The second connecting portion 312 is configured to be coupled to the second interior portion 24 of second housing 20 (as illustrated in FIG. 28). In one embodiment, the first connecting portion 311 is welded to the first interior portion 14, i.e., the first connecting portion 311 is welded to the second cover plate 182 and the first cover plate 172 (as illustrated in FIG. 27). The second connecting portion 312 is welded to the second interior portion 24. The body portion 318 defines a number of through holes 314 therein. The through holes 314 are arranged along a longitudinal direction of the body portion 318. The through holes 314 are equally spaced. Each of the through holes 314 is strip-shaped, a longitudinal direction of each of the through holes 314 is perpendicular to a longitudinal direction of the body portion 318. That is, the longitudinal direction of each of the through holes 314 is substantially parallel to the first connecting side 313 and the second connecting side 313'. The through holes 314 can reduce an elastic stress of the connecting member 31 during bending the body portion 318. Thus, a force applied to the flexible display panel 40 by the connecting member 31 can be reduced. It is noted that, a configuration of each of the through holes 314 can be circle.

The first connecting portion 311 and the second connecting portion 312 may be close to each other by bending the body portion 318. The first housing 10 can move with the first connecting portion 311, and the second housing 20 can move with the second connecting portion 312. Thus, the first housing 10 can be rotated relative to the second housing 20 to be close to each other, and then the mobile terminal 900 is folded by bending the body portion 318. Otherwise, the first housing 10 can be rotated relative to the second housing 20 to be far away from each other, and then the mobile terminal 900 is unfolded. The coupling member 32 can be also folded or unfolded during bending or unbending the body portion 318 correspondingly. The first connecting side 313 and the second connecting side 313' are overlapped with two opposite sides of the flexible display panel 40. Thus, the connecting member 31 can support the flexible display panel 40 and the housing assembly 100 can have a good appearance. The connecting member 31 can be made of an elastic steel sheet. Thus, the connecting member 31 can support the flexible display panel 40 effectively.

It is noted that, the first connecting portion 311 of the connecting member 31 can be coupled to the first housing 10 by means of screw. The second connecting portion 312 of the connecting member 31 can be coupled to the first housing 10 by means of screw.

Further, the body portion 318 may define a number of welding holes 315 therein. The welding holes 315 can be arranged along a longitudinal direction of the body portion 318. Each of the welding holes 315 has a geometric center, the geometric centers of the welding holes 315 are arranged along the longitudinal central line of the body portion 318. The welding holes 315 are configured for welding the coupling member 32 to the body portion 318. Thus, the coupling member 32 welded to the body portion 318 can be prevented from a movement along a direction perpendicular to the longitudinal direction of the body portion 318 (i.e., perpendicular to a sliding direction of the coupling member 32) with respect to the connecting member 31.

Figure 30:
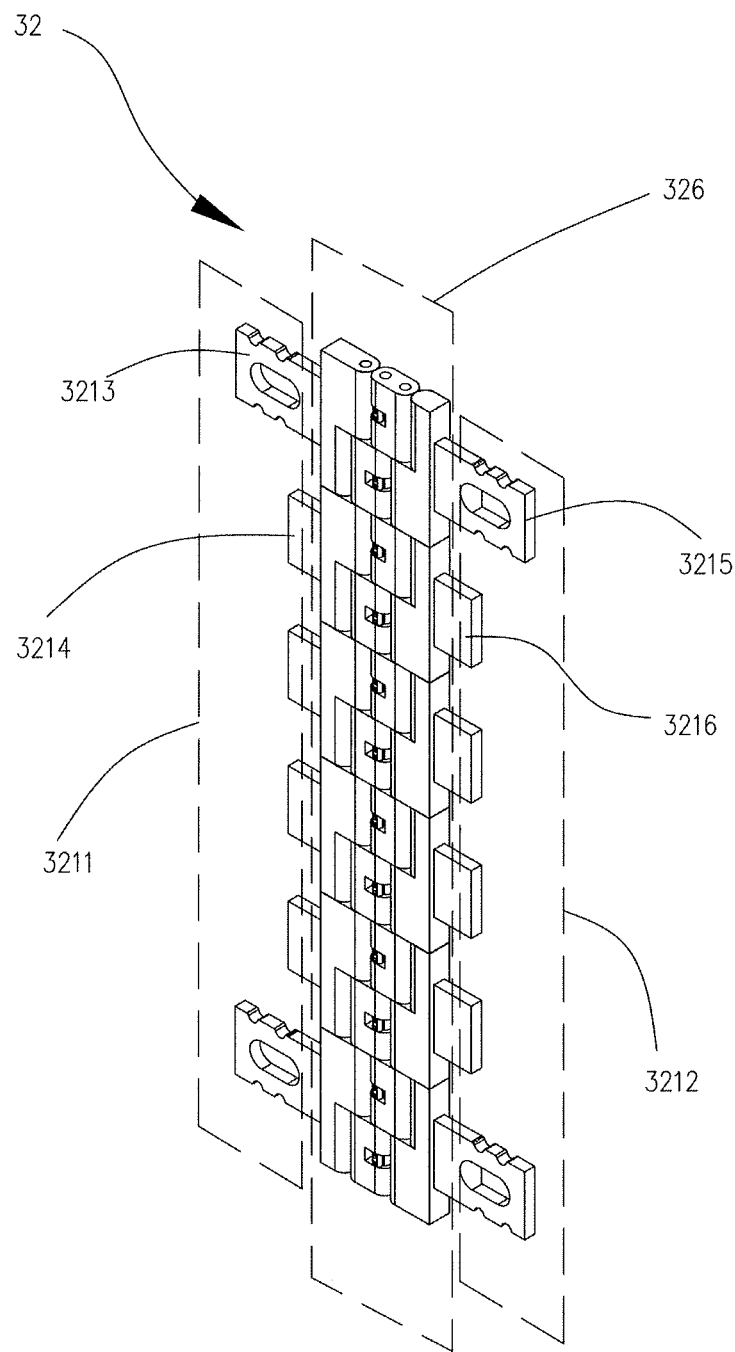
FIG. 30 illustrates a schematic view of a coupling member of a connecting module of the electronic device shown in FIG. 1.

As illustrated in FIG. 30 and FIG. 31, in an exemplary embodiment, the coupling member 32 may include a first connection part 3211 (a part in a region defined by a dotted line) and a second connection part 3212 (a part in a region defined by a dotted line). The first connection part 3211 is slidably coupled to the first housing 10, and the second connection part 3212 is slidably coupled to the second housing 20. In an exemplary embodiment, the first connection part 3211 may include two first sliding plates 3213 and a number of first auxiliary sliding plates 3214 located between the two first sliding plates 3213. The two first sliding plates 3213 are located in the two first guiding grooves 141 respectively and can slide in the corresponding first guiding groove 141 (as illustrated in FIG. 2) with respect to the first housing 10. Each of the first auxiliary sliding plates 3214 is located in the corresponding first auxiliary guiding groove 142 and can slide in the corresponding first auxiliary guiding groove 142 with respect to the first housing 10. A longitudinal direction of each of the two the first sliding plates 3213 is substantially parallel to the longitudinal direction of the guiding bar 173. Additionally, each of the two first sliding plates 3213 is substantially parallel to the first supporting surface 111. Each of the two first sliding plate 3213 includes two sliding surfaces 3221. The two sliding surfaces 3221 are located on two opposite sides of the first sliding plate 3213. The two sliding surfaces 3221 are parallel to each other, and parallel to the longitudinal direction of the first sliding plate 3213. The two side surfaces 3221 are in contact with the surfaces of the guiding bar 173 in the two grooves 175. Thus, the first sliding plate 3211 can slide in the first guiding groove 141 formed by the grooves 175 of the two guiding bars 173. A sliding direction of the first connection part 3211 with respect to the first housing 10 is perpendicular to the hinge shaft 329. Each of the first auxiliary sliding plate 3214 is also substantially parallel to the first supporting surface 111. A longitudinal direction of each of the first auxiliary sliding plate 3214 is substantially parallel to the longitudinal direction of the first sliding plate 3213. The first auxiliary sliding plates 3214 are spaced and arranged between the two first sliding plate 3213. The first auxiliary sliding plate 3214 can slide in the first auxiliary guiding groove 142. A lateral surface of the first auxiliary sliding plate 3214 is in contact with the first auxiliary guiding grooves 142. Thus, the first auxiliary sliding plate 3214 can slide with respect to the first housing 10 smoothly. A sliding direction of the second connection part 3212 with respect to the second housing 20 is substantially perpendicular to the hinge shaft 329.

In an exemplary embodiment, the second connection part 3212 may include two second sliding plates 3215 and a number of second auxiliary sliding plates 3216. The second auxiliary sliding plates 3216 are located between the two second sliding plates 3215. The two second sliding plates 3215 are slidably coupled to the second housing 20 (i.e., the second supporter of the second housing 20, the second supporter is similar to the first supporter 17 and not described here). The two second sliding plates 3215 can slide in two first guiding grooves 141 defined in the second supporter of the second housing 20. The second auxiliary sliding plates 3216 are slidably coupled to the second housing 20 (i.e., the second auxiliary supporter of the second housing 20, the second auxiliary supporter is similar to the first auxiliary supporter 18 and not described here). The second auxiliary sliding plates 3216 can slide in a number of first auxiliary guiding grooves 142 defined in the second auxiliary supporter of the second housing 20. Each of the second sliding plates 3215 is similar to the first sliding plate 3213, and each of the second auxiliary sliding plates 3216 is similar to the first auxiliary sliding plate 3214.

As described above, the first housing 10 may include the first blocking element 19 (as illustrated in FIG. 13 and FIG. 15) so as to prevent a detachment of the first connection part 3211 of the coupling member 32 and the first housing 10 and a detachment of the second connection part 3212 of the coupling member 32 and the second housing 20. Correspondingly, the first connection part 3211 may define a first blocking groove 324. The first blocking element 19 of the first housing 10 is disposed in the first blocking groove 324 and can slide along a longitudinal direction of the first blocking groove 324. Thus, the first connection part 3211 of the coupling member 32 will not be detached from the first housing 10, and the second connection part 3212 of the coupling member 32 will not be detached from the second housing 20. Similarly, the second connection part 3212 may define a second blocking groove coupled to the second blocking element of the second housing 20. The second blocking element can be disposed at the second supporter, the second sliding plate of the second connection part 3212 can define a second blocking groove. The second blocking element is slidably disposed in the second blocking groove, a longitudinal direction of the second blocking groove is parallel to a sliding direction of the second sliding plate of the second connection part 3212. The second blocking groove is similar to the first blocking groove 324, and the second blocking member is similar to the first blocking element 19. A longitudinal direction of the second blocking groove is parallel to a sliding direction of the second sliding plate 3212.

Figure 32:
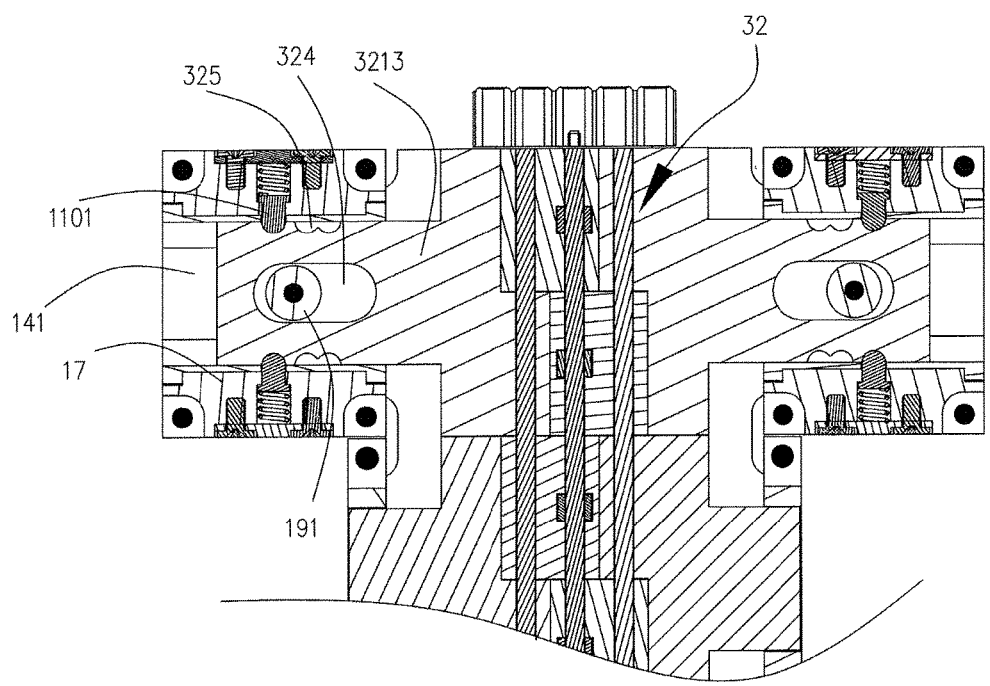
FIG. 32 illustrates a cross-sectional schematic view of a first supporter assembled with the coupling member shown in FIG. 30.
Figure 33:
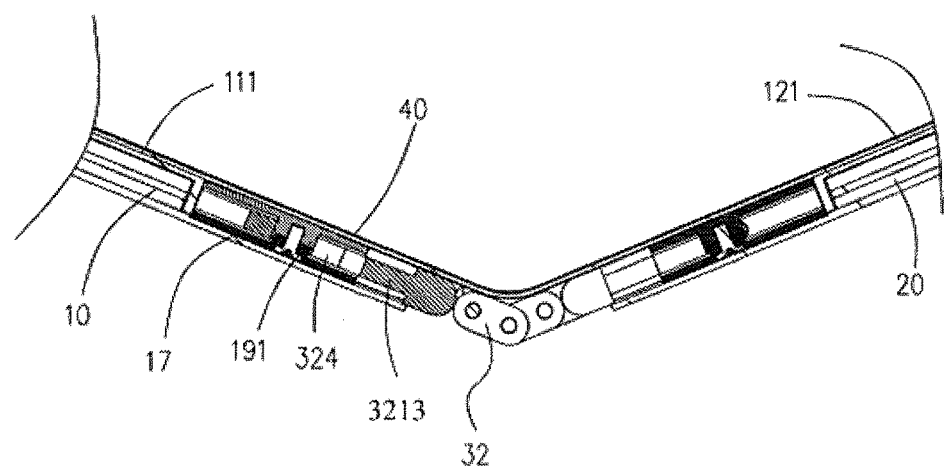
FIG. 33 illustrates another cross-sectional schematic view of a first supporter assembled with the coupling member shown in FIG. 30.

In the present embodiment, as illustrated in FIG. 32, the first blocking groove 324 is defined in the first sliding plate 3213. A profile of the first blocking groove 324 is runway-shaped. In other words, the first blocking groove 324 is substantially striped-shaped. Each of two ends of the first blocking groove 324 has a profile of semicircle-shaped. The longitudinal direction of the first blocking groove 324 is substantially parallel to the longitudinal direction of the first sliding plate 3213 (i.e., a sliding direction of the first sliding plate 3213 of the first connection part 3211). The first blocking element 19 can penetrate through the first blocking groove 324 and slide in the first blocking groove 324 along the longitudinal direction of the first blocking groove 324. A diameter of the blocking rod 191 of the first blocking element 19 is substantially equal to a width of the first blocking groove 324. Thus, the blocking rod 191 can only slide in the first blocking groove 324 along the longitudinal direction of the first blocking groove 324. That is, the blocking rod 191 can not slide in the first blocking groove 324 along a direction perpendicular to the longitudinal direction of the first blocking groove 324. As illustrated in FIG. 22 and FIG. 32, the blocking rod 191 is located at the end of the first blocking groove 324 towards the first exterior portion 15. The first sliding plate 3213 can not slide towards the first exterior portion 15 due to the blocking rod 191. Thus, the first sliding plate 3213 is prevented from sliding out of the first guiding groove 141. The coupling member 32 will not be detached from the first housing 10 and the second housing 20. As illustrated in FIG. 33, the mobile terminal 900 is in the angular configuration. The rotating angle of the first housing 10 with respect to the second housing 20 is maximum. For example, the rotating angle can be more than 180°. In the angular configuration, the mobile terminal 900 can be used as a laptop.

Figure 34:
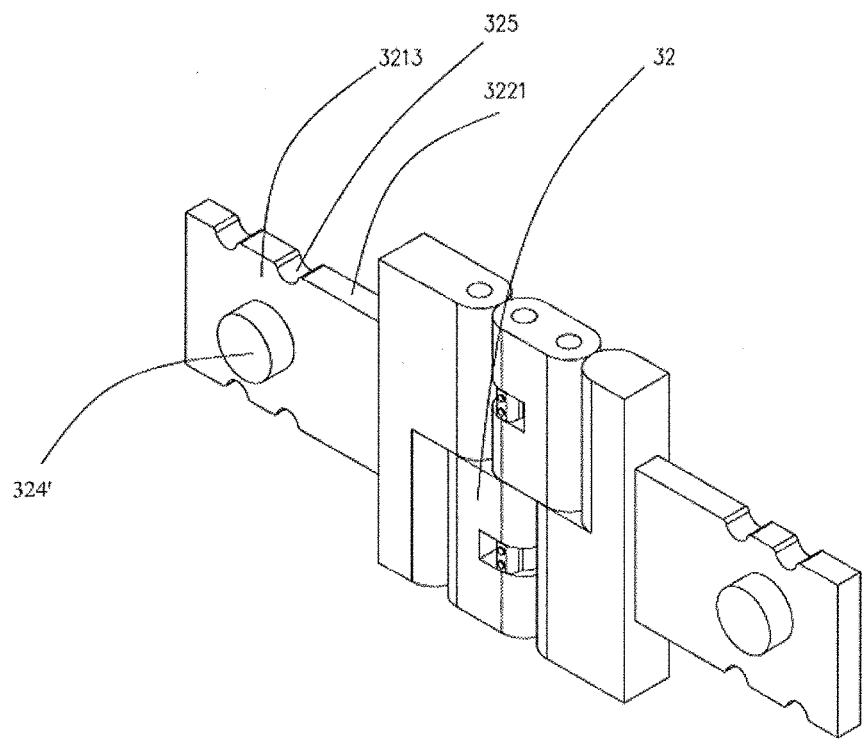
FIG. 34 illustrates a partial schematic view of the coupling member, in accordance with another embodiment of the present disclosure.

In an exemplary embodiment, as illustrated in FIG. 34, a first connection part 3211 may include a first sliding plate 3213. The first sliding plate 3213 can have a first blocking rod 324' disposed thereon. Correspondingly, the first housing 10 may define a blocking groove 1723 (as illustrated in FIG. 20). The blocking groove 1723 can be formed in the base plate 1711 of the first base 171. The first locating rod 324' can be slidably located in the blocking groove 1723.

As also described above, the first housing 10 may include the first locating element 110 (as illustrated in FIG. 13 and FIG. 15) so as to locate the first connection part 3211 and the second connection part 3212 in a predetermined position. Thus, the mobile terminal 900 can be in the angular configuration with a predetermined angel. Correspondingly, the first connection part 3211 may define a number of first locating recesses 325. A sliding distance of the first connection part 3211 of the coupling member 32 relative to the first housing 10 can be determined by a position of each of the first locating recesses 325. The sliding distance can be depended on an angle between the first housing 10 and the second housing 20 of the mobile terminal 900 in the angular configuration. During sliding the coupling member 32, the first locating element 110 can be located into one of the first locating recesses 325. Similarly, the second connection part 3212 may define a number of second locating recesses, the second housing 20 may include a second locating element coupled to one of the second locating recesses. The second locating member can be disposed at the second supporter. The second sliding plate defines a number of second locating recesses. The second locating member is configured to couple to one of the number of second locating recesses so that the coupling member 32 can stop sliding with respect to the second housing 20. The second locating recesses are similar to the first locating recesses 325, and the second locating element is similar to the first locating element 110.

The second locating element is configured for locating a location of the second connection part 3212 along the sliding direction of second connection part 3212.

In the present embodiment, as illustrated in FIG. 31 again, the first locating recesses 325 are defined at the two sliding surfaces 3221. The first locating recesses 325 are spaced and arranged along the longitudinal direction of the first sliding plate 3213 (i.e., the sliding direction of the first sliding plate 3213). As illustrated in FIG. 32, the first housing 10 can be rotated with respect to the second housing 20. The first connection part 3211 of the coupling member 32 can slide with respect to the first housing 10. The first sliding plate 3213 can slide in the first guiding groove 141 in a condition of a force parallel to the longitudinal direction of the first sliding plate 3213. The first connection part 3211 of the coupling member 32 can slide until the locating pin 1101 enters into the locating recess 325. The compressible elastic unit 1102 can provide a force perpendicular to the longitudinal direction of the first sliding plate 3213 to the locating pin 1101. Thus, the locating pin 1101 can be received in the locating recess 325. And then, the first sliding plate 3213 stop sliding in the first guiding groove 141. The angle of the first housing 10 and the second housing 20 can be maintained. The mobile terminal 900 can be in the angular configuration.

Figure 35:
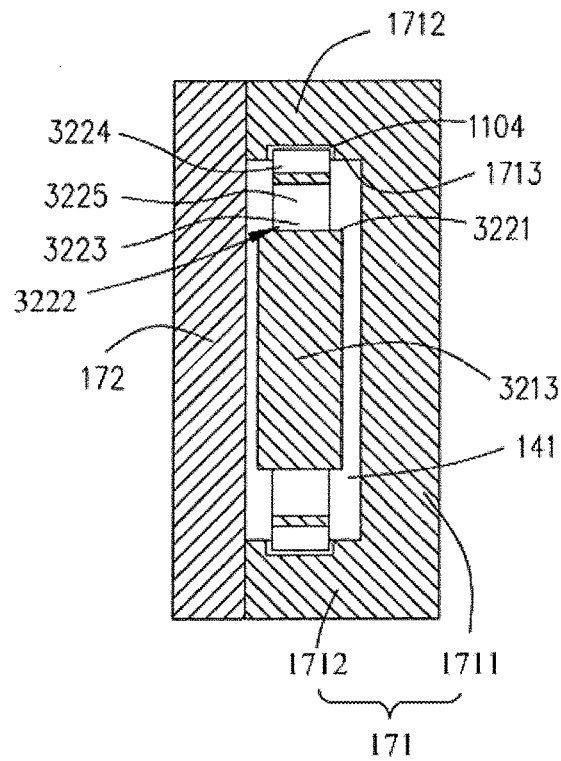
FIG. 35 illustrates a cross-sectional schematic view of the first supporter assembled with a first sliding plate, in accordance with another embodiment of the present disclosure.
Figure 36:
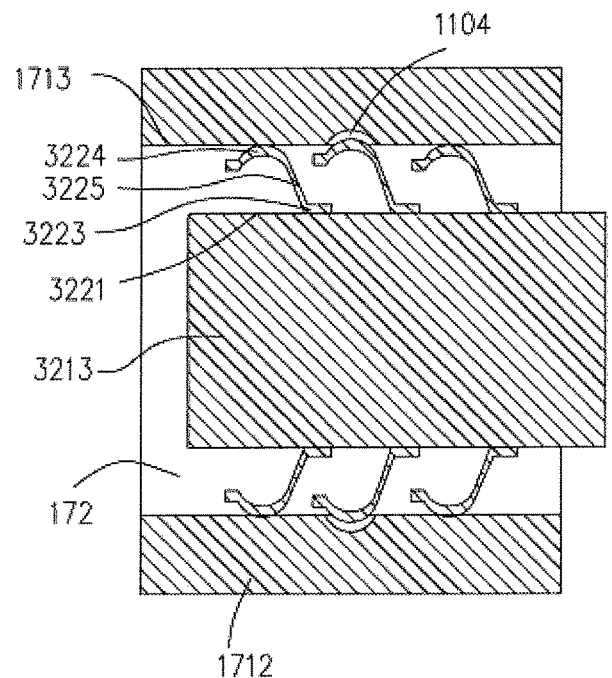
FIG. 36 illustrates another cross-sectional schematic view of the first supporter assembled with a first sliding plate shown in FIG. 35.

In an exemplary embodiment, as illustrated in FIG. 35 and FIG. 36, the first locating element 110" is disposed between the first supporter 17 of the first housing 10 and the first sliding plate 3213. The fixing portion 1712 has the guiding surface 1713 (also as illustrated in FIG. 8). The guiding surface 1713 is substantially perpendicular to the base plate 1711. The guiding surface 1713 of the fixing portion 1712 can define a recess 1104. The recess 1104 is configured for receiving the first locating element 110". The first sliding plate 3213 of the first connection part 3211 may have a number of splinters 3222. The splinters 3222 are disposed on the two sliding surfaces 3221. The splinters 3222 on one of the sliding surfaces 3221 are arranged separately along the longitudinal direction of the first sliding plate 3213. Each of the splinters 3222 includes a fixing end 3223, a contact end 3224 and an elastic arm 3225. The fixing end 3223 is coupled to the sliding surface 3221 of the first slide plate 3213. The contact end 3224 is far away from the sliding surface 3221 of the first sliding plate 3213. The elastic arm 3225 is coupled between the fixing end 3223 and the contact end 3224. The elastic arm 3225 can provide a force to the contact end 3224 away from the sliding surface 3221 of the first sliding plate 3213. When the contact end 3224 is received in one of the recesses 1104, the elastic arm 3325 can provide a force perpendicular to the longitudinal direction of the first sliding plate 3213 to the contact end 3224 (i.e., the sliding direction of the first sliding plate 3213). The first sliding plate 3213 may stop sliding in the first guiding groove 141. And then, the angle of the first housing 10 and the second housing 20 can be maintained. The mobile terminal 900 can be in the angular configuration. It is noted that, a force parallel to the sliding surface 3221 of the first slide plate 3213 can be applied to the first sliding plate 3213. Thus, the elastic arm 3225 can be compressed and the contact end 3224 can slide out of the recess 1104 into the next recess 1104. And then, another angle of the first housing 10 and the second housing 20 can be maintained.

Figure 37:
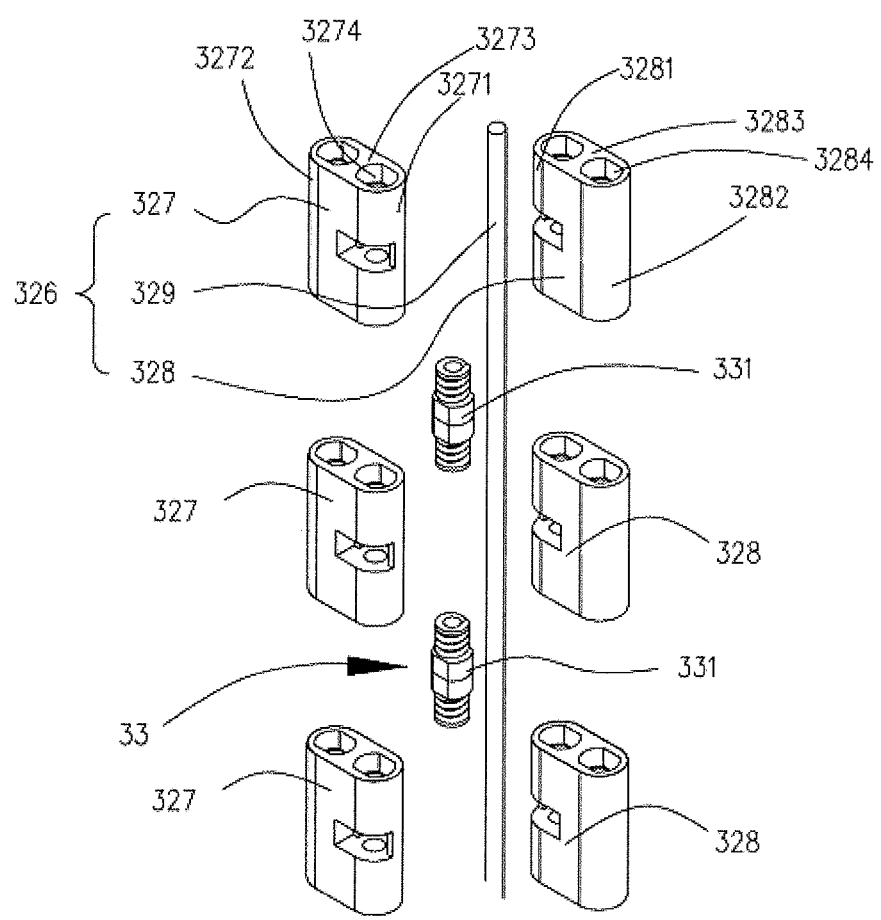
FIG. 37 illustrates a partial exploded view of the coupling member shown in FIG. 30.

As illustrated in FIG. 30 and FIG. 37, the coupling member 32 includes a linkage part 326 (a part located in a region defined by a dotted line in FIG. 30). The linkage part 326 includes at least one first hinge element 327, at least one second hinge element 328 and a hinge shaft 329 for pivotally coupling the first hinge element 327 and the second hinge element 328. The first hinge element 327 can be rotated with respect to the second hinge element 328 by the hinge shaft 329. The first connection part 3211 and the second connection part 3212 can be either close to or far away from each other by a rotation of one of the first hinge element 327 of the linkage part 326 and the second hinge element 328 of the linkage part 326 around the hinge shaft 329. The first connection part 3211 is configured to be slidably coupled the first housing 10, the second connection part 3212 is configured to be slidably coupled the second housing 20. An arrangement direction of the two first sliding plate 3213 of each of the first connection part 3211 is substantially parallel to the hinge shaft 329. The first connection part 3211 and the second connection part 3212 of the coupling member 32 are symmetrical with respect to the hinge shaft 329. A distance of the hinge shaft 329 and the first housing 10 is substantially equal to a distance of the hinge shaft 329 and the second housing 20. The hinge shaft 329 is substantially overlapped with a geometric central line of the connecting member 31. The linkage part 326 can be folded and unfolded by rotating one of the first hinge element 327 and the second hinge element 328 around the hinge shaft 329. The linkage part 326 can be configured to support the connecting member 31. In one exemplary embodiment, the linkage part 326 may include a number of first hinge elements 327 and a number of second hinge elements 328. The first hinge elements 327 are arranged along the longitudinal direction of the hinge shaft 329. The second hinge elements 328 are arranged along the longitudinal direction of the hinge shaft 329. The first hinge elements 327 and the second hinge elements 328 are alternatively arranged along the longitudinal direction of the hinge shaft 329.

In one exemplary embodiment, the linkage part 326 may include one first hinge element 327 and one second hinge element 328. The first hinge element 327 can define a groove, the second hinge element 328 can have a protrusion received into the groove. The first shaft 329 may pass the groove and penetrate the protrusion so that the hinge shaft 329 can pivotally couple the first hinge element 327 and the second hinge element 328.

As illustrated in FIG. 37, the first hinge element 327 may include a first interior side 3271, a first exterior side 3272 and two first sidewalls 3273. The first interior side 3271 and the first exterior side 3272 are located at two opposite sides of the first hinge element 327. The two first sidewalls 3273 are located on two opposite sides of the first hinge element 327. Each of the two first sidewalls 3273 is adjacent to the first interior side 3271 and the first exterior side 3272. One of the two first sidewalls 3273 defines a shaft hole near to the first interior side 3271. The hinge shaft 329 can pass through the shaft hole. Thus, the hinge shaft 329 can penetrate through first interior side 3271 of the first hinge element 327. The first hinge element 327 can be rotated around the hinge shaft 329. The first interior side 3271 is rotatably coupled to the hinge shaft 329. In addition, the first interior side 3271 can have a curved surface. A profile of a cross-section of the curved surface is semicircle-shaped. A central axis of the semicircle-shaped profile can be overlapped with the axis of the hinge shaft 329. Thus, during rotating the first hinge element 327 and the second hinge element 328, the first hinge element 327 and the second hinge element 328 will not be interfered with each other. The first exterior side 3272 can have a similar structure so as to avoid an interference caused by the first exterior side 3272 to the other component. The first exterior side 3272 can also be pivotally coupled with the first connection part 3211. The first hinge element 327 can be made of metal. An anodic oxidation treatment can be applied to a surface of the first hinge element 327. Thus, the first hinge element 327 can have a good appearance. In one exemplary embodiment, the first hinge element 327 can be curved. Thus, the first hinge element 327 can provide a support to the connecting member 31.

As illustrated in FIG. 37, the second hinge element 328 may include a second interior side 3281, a second exterior side 3282 and two second sidewalls 3283. The second interior side 3281 and the second exterior side 3282 are located at two opposite sides of the second hinge element 328. The two second sidewalls 3283 are located on two opposite sides of the second hinge element 328. Each of the two second sidewalls 3283 is adjacent to the second interior side 3281 and the second exterior side 3282. One of the two second sidewalls 3283 defines a shaft hole near to the second interior side 3281. The hinge shaft 329 can pass through the shaft hole. Thus, the hinge shaft 329 can penetrate through second interior side 3281 of the second hinge element 328. The second interior side 3281 is rotatably coupled to the hinge shaft 329. The second sidewall 3283 is substantially parallel to the first sidewall 3273. A gap is formed between the second sidewall 3283 and the first sidewall 3273. Thus, the second hinge element 328 can be rotated around the hinge shaft 329 with respect to the first hinge element 327 smoothly. In addition, the second interior side 3281 can have a curved surface. A profile of a cross-section of the curved surface is semicircle-shaped. A central axis of the semicircle-shaped profile can be overlapped with the axis of the hinge shaft 329. Thus, during rotating the first hinge element 327 and the second hinge element 328, the first hinge element 327 and the second hinge element 328 will not be interfered with each other. The second exterior side 3282 can have a similar structure so as to avoid an interference caused by the second exterior side 3282 to the other component. The second exterior side 3282 can also be pivotally coupled with the second connection part 3212. The second hinge element 328 can be made of metal. An anodic oxidation treatment can be applied to a surface of the second hinge element 328. Thus, the second hinge element 328 can have a good appearance.

Further, the coupling member 32 may include a damping mechanism 33. The damping mechanism 33 is configured to provide a damping force to the first hinge element 327 and the second hinge element 328 during rotating the first hinge element 327 with respect to the second hinge element 328. In a condition of the damping force, a position of the first hinge element 327 relative to the second hinge element 328 can be maintained. Thus, the angle of the first housing 10 and the second housing 20 can be maintained. That is, the mobile terminal 900 can be maintained in the folded configuration or the angular configuration.

Figure 38:
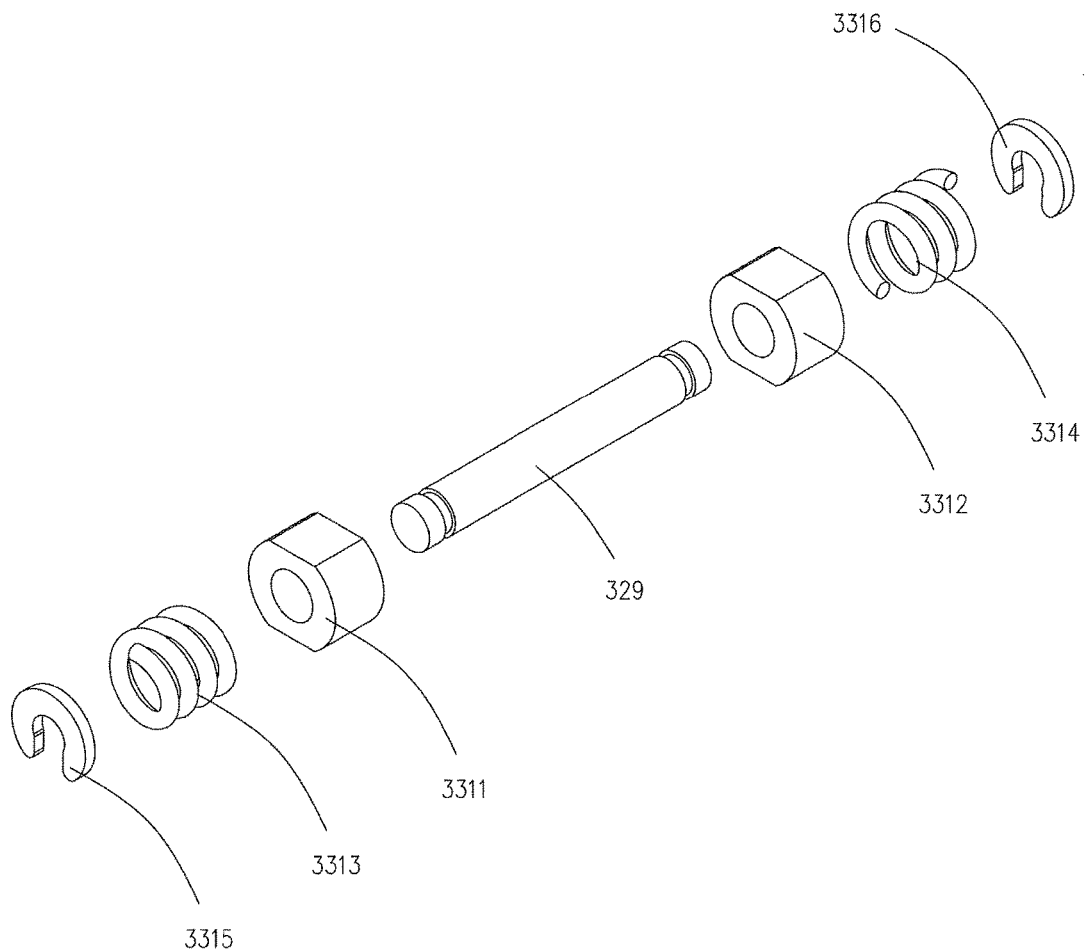
FIG. 38 illustrates an exploded view of a damping member of the coupling member shown in FIG. 37.
Figure 39:
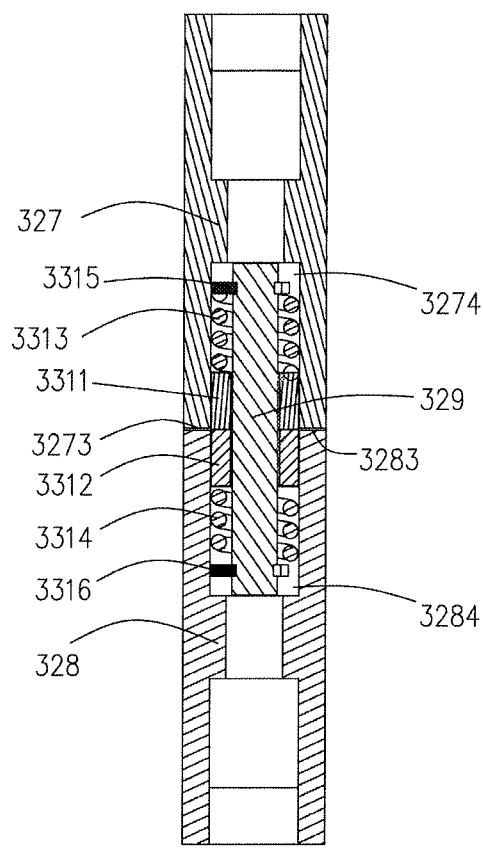
FIG. 39 illustrates a partial cross-sectional schematic view of a damping member of the coupling member shown in FIG. 37.

As illustrated in FIG. 37, FIG. 38 and FIG. 39, in the present embodiment, the damping mechanism 33 may include a damping member 331. The damping member 331 includes a first damping ring 3311 and a second damping ring 3312. The first damping ring 3311 is sleeved on the hinge shaft 329 and is coupled to the first hinge element 327. The first damping ring 3311 can be rotated with the first hinge element 327. The second damping ring 3312 is sleeved on the hinge shaft 329 and is coupled to the second hinge element 328. The second damping ring 3312 can be rotated with the second hinge element 328. The first damping ring 3311 has a rough surface, and the second damping ring 3312 also has a rough surface. The first damping ring 3311 is in contact with the second damping ring 3312 to generate a damping force. The first damping ring 3311 is made of wear resistant material. The second damping ring 3312 is also made of wear resistant material. In one exemplary embodiment, the damping mechanism 33 may include a number of damping members 331. Each of the damping members 331 is located between the first hinge element 327 and the second hinge element 328 adjacent to the first hinge element 327. Each of the first damping rings 3311 is in contact with the corresponding second damping ring 3312. A damping force can be generated due to a rotation of the first damping ring 3311 with respect to the second damping ring 3312. The first damping ring 3311 is fixed to the first sidewall 3273 of the first hinge element 327, and the second damping ring 3312 is fixed to the second sidewall 3283 of the second hinge element 328 adjacent to the first hinge element 327 along the hinge shaft 329. The damping force generated can be transmitted to the first hinge element 327 and the second hinge element 328. The first hinge element 327 and the second hinge element 328 can stop rotating in a condition of the damping force. When an external force is less than the damping force, the first hinge element 327 can be static relative to the second hinge element 328. At this time, the connecting member 31 can maintain a predetermined configuration. Thus, a position of the first housing 10 relative to the second housing 20 is not changed. When an external force is more than the damping force, the first hinge element 327 can be rotated relative to the second hinge element 328. At this time, the connecting member 31 can be bent and the configuration of the connecting member 31 is changed. Thus, the first housing 10 can also be rotated relative to the second housing 20. That is, a position of the first housing 10 relative to the second housing 20 can be changed.

In the present embodiment, as illustrated in FIG. 37, FIG. 38 and FIG. 39, the damping member 331 can further include the first elastic ring 3313, a second elastic ring 3314, a first clasp ring 3315 and a second clasp ring 3316. The first elastic ring 3313 is sleeved on the hinge shaft 329, and is located between the first sidewall 3273 of the first hinge element 327 and the first damping ring 3311. The second elastic ring 3314 is sleeved on the hinge shaft 329, and is located between the second sidewall 3283 of the second hinge element 328 and the second damping ring 3312. The first elastic ring 3313 can apply a force to the first damping ring 3311, and the second elastic ring 3314 can apply a force to the second damping ring 3312. Thus, the first damping ring 3311 can be in contact with the second damping ring 3312. The first clasp ring 3315 is also sleeved on the hinge shaft 329. The first elastic ring 3313 is compressed and located between the first damping ring 3311 and the first clasp ring 3315. The first clasp ring 3315 is configured to block the first elastic ring 3313. That is, the first clasp ring 3315 is configured to prevent the first elastic ring 3313 from moving along the hinge shaft 329. The second clasp ring 3316 is also sleeved on the hinge shaft 329. The second elastic ring 3314 is compressed and located between the second damping ring 3312 and the second clasp ring 3316. The second clasp ring 3316 is configured to block the second elastic ring 3314. That is, the second clasp ring 3316 is configured to prevent the second elastic ring 3314 from moving along the hinge shaft 329.

Figure 40:
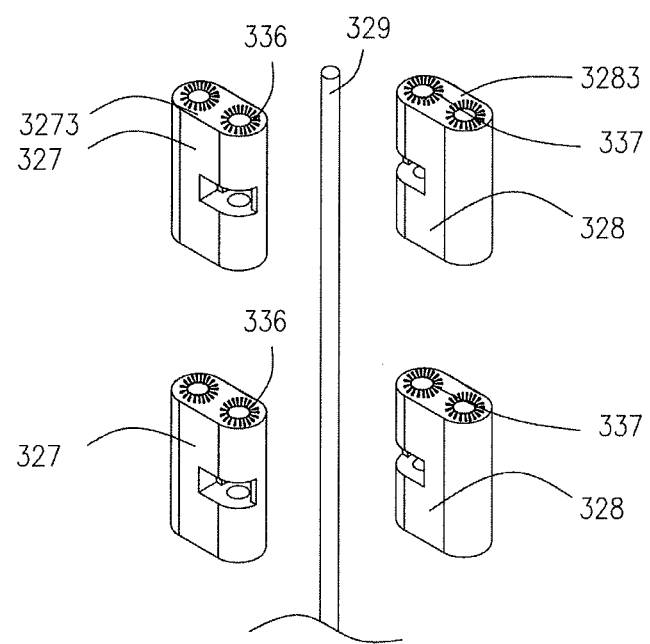
FIG. 40 illustrates an exploded view of a linkage part of the coupling member with a number of first ratchets and a number of second ratchets, in accordance with another embodiment of the present disclosure.

In one exemplary embodiment, as illustrated in FIG. 40, the damping mechanism 33 may include a number of first ratchets 336 disposed on the first sidewall 3273 and a number of second ratchets 337 disposed on the second sidewall 3283. The first ratchets 336 are arranged around the hinge shaft 329, the second ratchets 337 are arranged around the hinge shaft the 329. The first ratchets 336 of the first hinge element 327 can be in contact with the second ratchets 337 of the second hinge element 328 adjacent to the first hinge element 327 along the hinge shaft 329. Thus, a damping force is generated to the first hinge element 327 and the second hinge element 328 during rotating the first hinge element 327 with respect to the second hinge element 328.

In one exemplary embodiment, the hinge shaft 329 may include a number of short rods. Each of the short rods penetrates the first hinge element 327 and the second hinge element 328. The first clasp ring 3315 and the second clasp ring 3316 are sleeved on the short rod and located at two ends of the short rod. Thus, it is convenient for the first damping member 331 to be assembled with the first hinge element 327 and the second hinge element 328. The first sidewall 3273 defines a first depression 3274, and the second sidewall 3283 defines a second depression 3284. The first hinge element 327 has a first inner surface in the first depression 3274, and the second hinge element 328 has a second inner surface in the second depression 3284. The first damping ring 3311 is located in the first depression 3274 and the second damping ring 3312 is located in the second depression 3284. Thus, the first damping ring 3311 is prevented from being rotated relative to the first hinge element 327 in the first depression 3274, and the second damping ring 3312 is prevented from being rotated relative to the second hinge element 328 in the second depression 3284. The first elastic ring 3313 is also located in the first depression 3274, and the second elastic ring 3314 is also located in the second depression 3284. Thus, a gap between the first hinge element 327 and the second hinge element 328 adjacent to the first hinge element 327 along the hinge shaft 329 can be reduced. A performance of the linkage part 326 for supporting the connecting member 31 can be improved. The first clasp ring 3315 is located at an end of the first depression 3274 far away from the second hinge element 328, and the second clasp ring 3316 is located at an end of the second depression 3284 far away from the first hinge element 327. A gap can be formed between the first clasp ring 3315 and the first inner surface of the first hinge element 327, and a gap can be formed between the second clasp ring 3316 and the second inner surface of the second hinge element 328. Thus, the first elastic ring 3313 will not damage the first hinge element 327, and the second elastic ring 3314 will not damage the second hinge element 328. In one exemplary embodiment, the first elastic ring 3313 can also be a spring, and the second elastic ring 3314 can be a spring.

Figure 41:
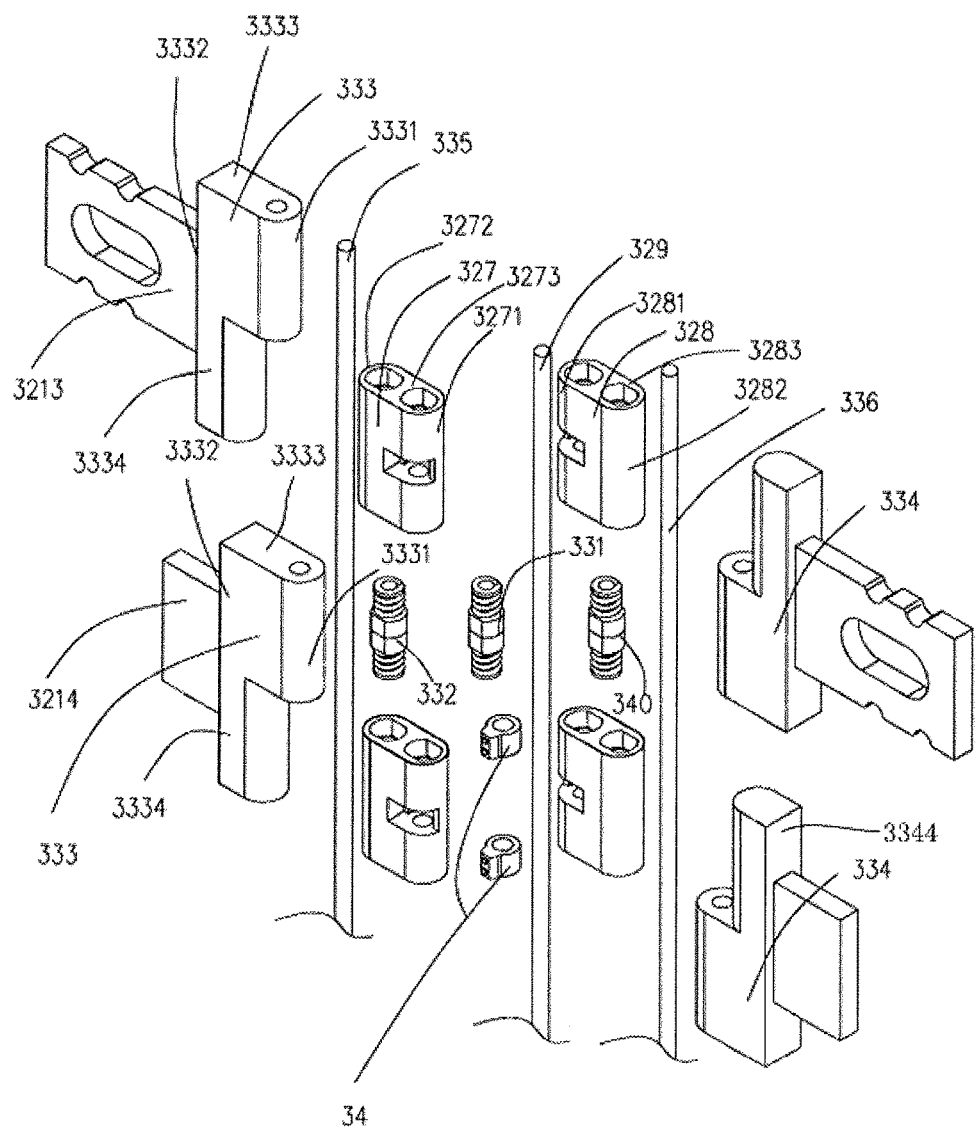
FIG. 41 illustrates an exploded view of the coupling member shown in FIG. 30.

As illustrated in FIG. 41, in the present embodiment, the linkage part 326 can further include a third hinge element 333, a fourth hinge element 334, a first auxiliary hinge shaft 335 and a second auxiliary hinge shaft 336. The third hinge element 333 can be made of metal. An anodic oxidation treatment can be applied to a surface of the third hinge element 333. Thus, the third hinge element 333 and the first hinge element 327 can have identical appearance. The fourth hinge element 334 can be made of metal. An anodic oxidation treatment can be applied to a surface of the fourth hinge element 334. Thus, the fourth hinge element 334 and the first hinge element 327 can have identical appearance. In one exemplary embodiment, the first hinge element 327 can be curved. The third hinge element 333 is pivotally coupled with the first exterior side 3271 of the first hinge element 327 by the first auxiliary hinge shaft 335. The fourth hinge element 334 is pivotally coupled with the second exterior side 3282 of the second hinge element 328 by the second auxiliary hinge shaft 336.

In one exemplary embodiment, the first auxiliary hinge shaft 335 is substantially parallel to the hinge shaft 329. The third hinge element 333 includes a third interior side 3331, a third exterior side 3332 and two third sidewalls 3333. The third interior side 3331 and the third exterior side 3332 are located at two opposite sides of the third hinge element 333. The two third sidewalls 3333 are located on two opposite sides of the third hinge element 333. Each of the two third sidewalls 3333 is adjacent to the third interior side 3331 and the third exterior side 3332. One of the two third sidewalls 3333 defines a shaft hole near to the third interior side 3331. The first auxiliary hinge shaft 335 can pass through the shaft hole. The third hinge element 333 can be rotated around the first auxiliary hinge shaft 335. That is, the third hinge element 333 is pivotally coupled with the first hinge element 327 by the first auxiliary hinge shaft 335. In addition, the first auxiliary hinge shaft 335 can pass through the shaft hole formed in the first exterior side 3272 of the first hinge element 327. Thus, the third coupling member 333 is pivotally coupled with the first hinge element 327 by the first auxiliary hinge shaft 335. The third coupling member 333 can be rotated relative to the first hinge element 327. In one exemplary embodiment, the linkage part 326 can further include a number of third hinge elements 333 and a number of first hinge elements 327. The third hinge elements 333 and the first hinge elements 327 are arranged alternatively along the first auxiliary hinge shaft 335.

Additionally, one of the two third sidewalls 3333 of the third hinge element 333 may have a first extending portion 3334. An extending direction of the first extending portion 3334 is substantially parallel to the first auxiliary hinge shaft 335. An extending length is substantially equal to a distance of the two first sidewalls 3273 of the two adjacent first hinge elements 327 along the first auxiliary hinge shaft 335. The first extending portion 3334 of one of the two adjacent third hinge elements 333 along the first auxiliary hinge shaft 335 is in contact with the third sidewall 3333 of the other of the two adjacent third hinge elements 333 along the first auxiliary hinge shaft 335. Thus, a contact area of the linkage part 326 and the connecting member 31 can be increased. The performance of the linkage part 326 for supporting the connecting member 31 can be improved.

The first connection part 3211 is coupled to the first hinge element 327 by the third hinge element 333. The first connection part 3211 (as illustrated in FIG. 30) of the coupling member 32 may include a number of third exterior sides 3332 of the third hinge elements 333. The two first sliding plate 3213 are coupled to the third exterior sides 3332 of the third hinge elements 333 at two ends of the first auxiliary hinge shaft 335 respectively. Each of the first sliding plates 3213 can be integrated with the corresponding third hinge element 333 at the end of the first auxiliary hinge shaft 335. The third exterior side 3213 has a side surface. For example, the side surface is a plane. The first sliding plate 3213 is substantially perpendicular to the side surface of the third exterior side 3213. The first auxiliary sliding plates 3214 are coupled to the third exterior sides 3332 of the third hinge elements 333 except the third hinge element 333 at the end of the first auxiliary hinge shaft 335. And then, the third hinge elements 333 can be slidably coupled to the first housing 10 by the first sliding plate 3213 and the first auxiliary sliding plates 3214. Thus, the first connection part 3211 of the coupling member 32 can be slidably coupled to the first housing 10.

In one exemplary embodiment, the third sidewall 3333 of the third hinge element 333 can be substantially parallel to the first sidewall 3273 of the first hinge element 327. A gap can be formed between the third sidewall 3333 of the third hinge element 333 and the first sidewall 3273 of the first hinge element 327 adjacent to the third hinge element 333 along the first auxiliary hinge shaft 335. Thus, the first hinge element 327 can be rotated relative to the third hinge element 333 smoothly. In addition, the third interior side 3331 can be have a curved surface. A profile of a cross-section of the curved surface is semicircle-shaped. A central axis of the semicircle-shaped profile can be overlapped with the axis of the first auxiliary hinge shaft 335. Thus, during rotating the third hinge element 333 and the first hinge element 327, the first hinge element 327 and the third hinge element 333 will not be interfered with each other. Moreover, the first extending portion 3334 may have a curved surface facing the first hinge element 327. A profile of a cross-section of the curved surface is also semicircle-shaped.

The damping mechanism 33 may further include a first auxiliary damping member 332. Each of the first auxiliary damping members 332 is located between the first hinge element 327 and the third hinge element 333 adjacent to the first hinge element 327 along the first auxiliary hinge shaft 335. The first auxiliary damping member 332 is configured to provide a damping force to the first hinge element 327 and the third hinge element 333 during rotating the first hinge element 327 with respect to the third hinge element 333. In a condition of the damping force, a position of the third hinge element 333 relative to the first hinge element 327 can be maintained. Thus, the angle of the first housing 10 and the second housing 20 can be maintained.

As illustrated in FIG. 39 and FIG. 41, the first auxiliary damping member 332 is similar to the damping member 331. A first elastic ring 3315 of the first auxiliary damping member 332 is sleeved on the first auxiliary hinge shaft 325 and located between the first hinge element 327 and a first damping ring 3311 of the first auxiliary damping member 332. A second elastic ring 3314 of the first auxiliary damping member 332 is sleeved on the first auxiliary hinge shaft 325 and located between the third hinge element 333 and the second damping ring 3312 of the first auxiliary damping member 332.

The fourth hinge element 334 is similar to the third hinge element 333. When the coupling member 32 is assembled, a second extending portion 3344 of the fourth hinge element 334 and the first extending portion 3334 of the third hinge element 333 are in opposite directions. The fourth hinge element 334 and the second hinge element 328 are alternatively arranged along the second auxiliary hinge shaft 336. The second connection part 3212 (as illustrated in FIG. 30) of the coupling member 32 may include a number of third exterior sides 3342 of the fourth hinge elements 334. Thus, the second connection part 3212 of the coupling member 32 can be slidably coupled to the second housing 20. In order to maintain a position of the fourth hinge element 334 relative to the second hinge element 328, the damping mechanism 33 may further include a second auxiliary damping member 340. Thus, the first housing 10 and the second housing 20 can be in the angular configuration with a predetermined angle. The second auxiliary damping member 340 is configured for providing a damping force to the fourth hinge element 334 and the second hinge element 328 to prevent the fourth hinge element 334 from rotating relative to the second hinge element 328. The fourth damping member 340 is similar to the first damping member 331. The first elastic ring 3313 of the second auxiliary damping member 340 is sleeved on the second auxiliary hinge shaft 326, and is located between the second hinge element 328 and a first damping ring 3311 of the second auxiliary damping member 340. A second elastic ring 3314 of the second auxiliary damping member 340 is sleeved on the second auxiliary hinge shaft 326, and is located between the fourth hinge element 334 and a second damping ring 3312 of the second auxiliary damping member 340.

Figure 42:
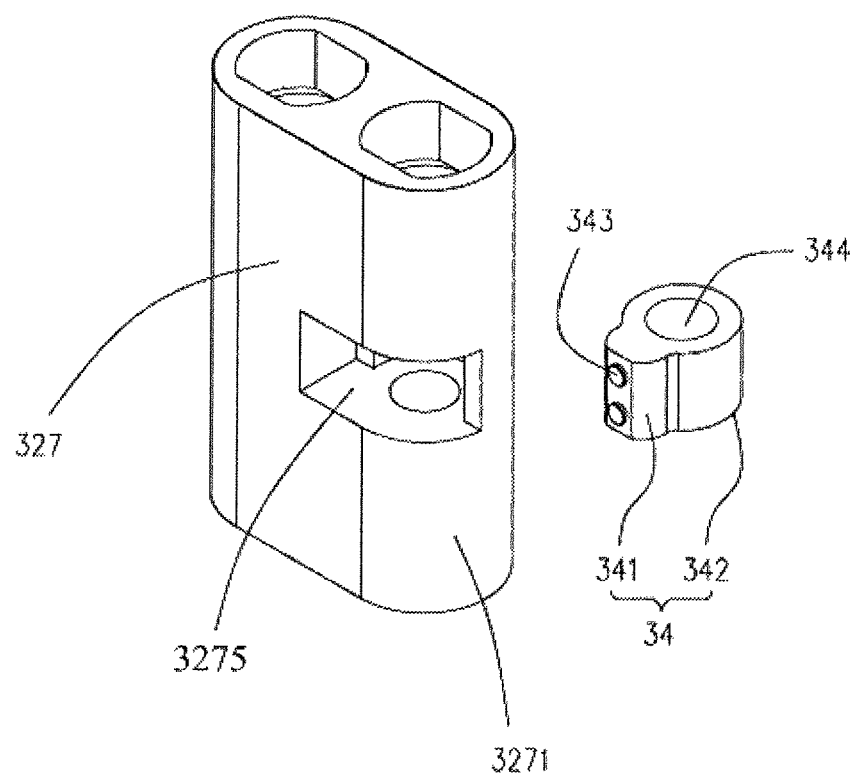
FIG. 42 illustrates an exploded view of a first hinge element and a positioning member shown in FIG. 37.
Figure 43:
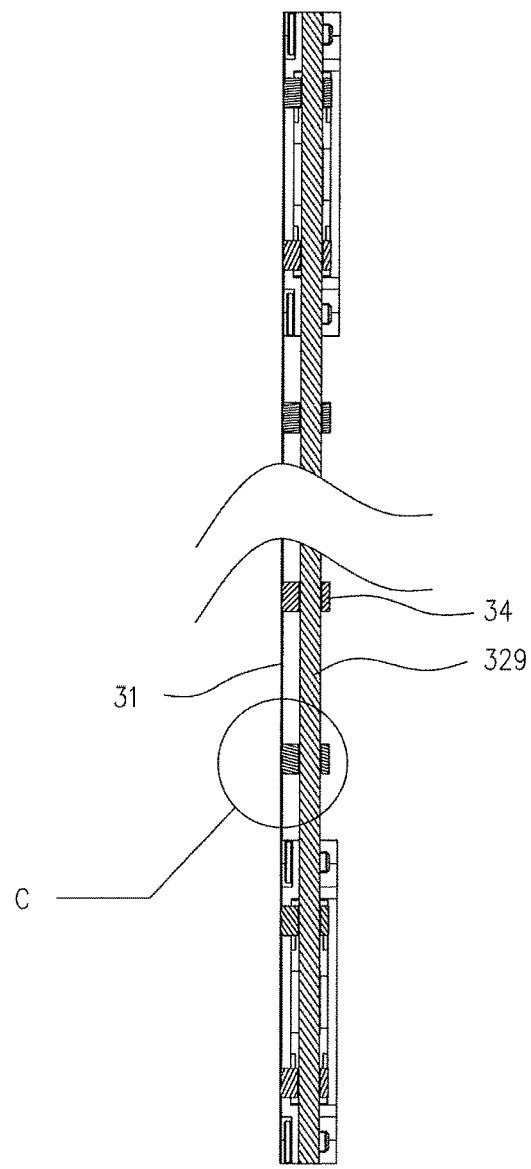
FIG. 43 illustrates a cross-sectional schematic view of a connecting member, a hinge shaft and a positioning member as shown in FIG. 30.
Figure 44:
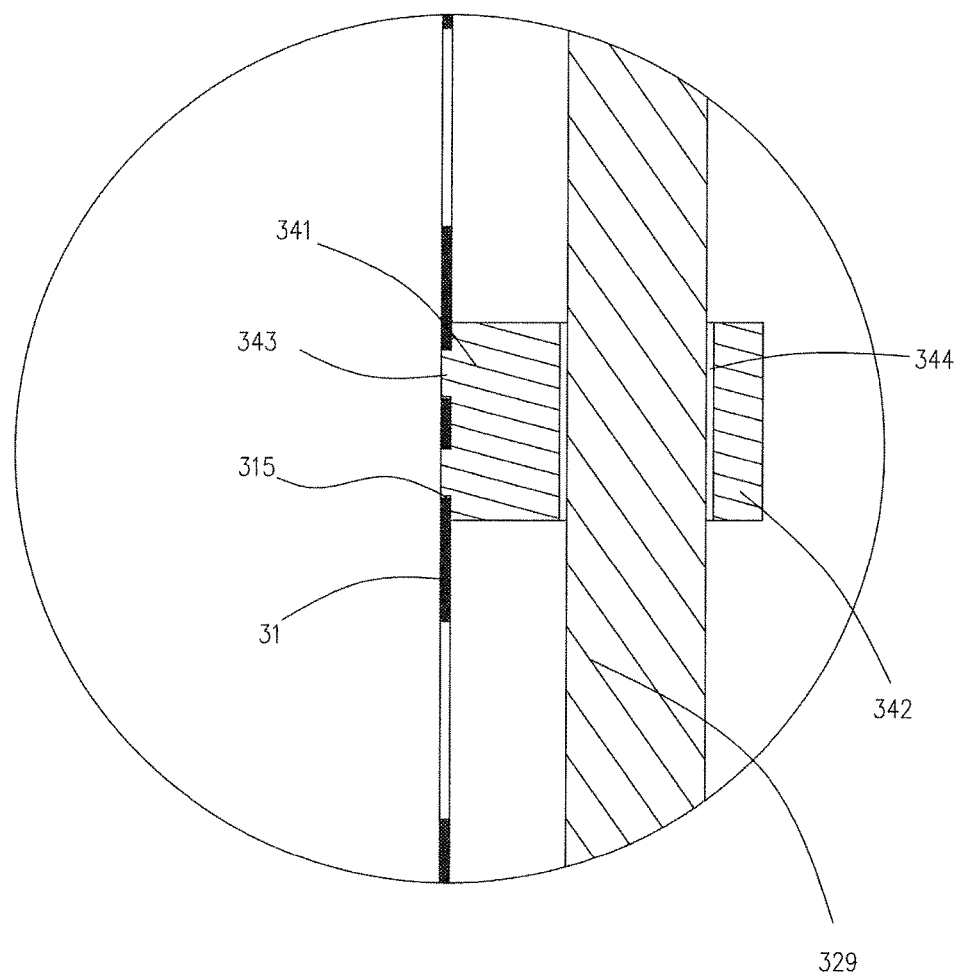
FIG. 44 illustrates an enlarged view of part C in FIG. 43.

As illustrated in FIG. 30 and FIG. 42, the first connection part 3211 of the coupling member 32 is slidably coupled to the first housing 10 (see FIG. 1) and the second connection part 3212 of the coupling member 32 is slidably coupled to the second housing 20 (see FIG. 1). The coupling member 32 is connect to the connecting member 31. Thus, the coupling member 32 is prevented from sliding along a direction perpendicular to the hinge shaft 329 with respect to the connecting member 31. That is, the coupling member 32 and the connecting member 31 should be slide either from the first interior portion 14 to the first exterior portion 15 together or from the first exterior portion 15 to the first interior portion 14 together. Thus, the coupling member 32 can support the connecting member 31 effectively. The connecting module 30 may further include a positioning member 34. In one exemplary embodiment, the positioning member 34 includes a first end 341 and a second end 342 opposite the first end 341. The first end 341 is coupled to the connecting member 31, and the second end 344 is coupled to the coupling member 32. The positioning member 34 is configured to prevent the coupling member 32 from moving to the first housing 10 or the second housing 20 with respect to the connecting member 31. In one embodiment, the first end 341 is coupled to the connecting member 31, and the second end 342 is configured to prevent the coupling member 32 from moving with respect to the connecting member 31. A distance of the positioning member 34 and the first housing 10 is substantially equal to a distance of the positioning member 34 and the second housing 20. The coupling member 32 is coupled to the connecting member 31 by the positioning member 34. Thus, the coupling member 32 will not move towards the first housing 10 or the second housing 20 relative to the connecting member 31.

As illustrated in FIG. 42, FIG. 43, FIG. 44 and FIG. 45, in an exemplary embodiment, the first end 341 includes a raised portion 343. The raised portion 343 is raised far away from the second end 342. The second end 342 have a through hole 344. A central axis of through hole 344 is substantially perpendicular to a raising direction of the raised portion 343. The central axis of through hole 344 is substantially parallel to the hinge shaft 329. In addition, the connecting member 31 defines a number of welding holes 315. Each of the welding holes 315 has a geometric center. The geometric centers of the welding holes 315 are arranged along a longitudinal geometric central line of the connecting member 31. The raised portion 343 of the positioning member 34 of the first hinge element 327 received in the welding hole 315 and welded to the connecting member 31. As illustrated in FIG. 42, the first interior side 3271 of the first hinge element 327 have a cutout 3275 facing the connecting member 31. The second end 342 of the positioning member 34 is received in the cutout 3275. The hinge shaft 329 pass through the through hole 344 and the cutout 3275. The second end 342 is coupled to the hinge shaft 329. That is, the positioning member 34 will not be rotated around the hinge shaft 329. Thus, the positioning member 342 can be rotated with respect to the first hinge element 327 by rotating the hinge shaft 329 in the cutout 3275. The longitudinal geometric central line of the connecting member 31 may be substantially parallel to and overlapped with the longitudinal geometric central line of the coupling member 32. The coupling member 32 will not move towards the first housing 10 or the second housing 20 relative to the connecting member 31. The coupling member 32 can provide a support to the connecting member 31 effectively. The connecting module 30 can provided a support to the flexible display panel 40 effectively. In one embodiment, the connecting member 31 may define a number of welding holes 315. Each of the welding holes 315 faces one first hinge element 327. It is noted that, the connecting member 31 may define a number of welding holes 315 facing the second hinge element 328. Correspondingly, the second hinge element 328 can define cutout 3275. The connecting module 34 may include a number of positioning members 34.

Figure 46:
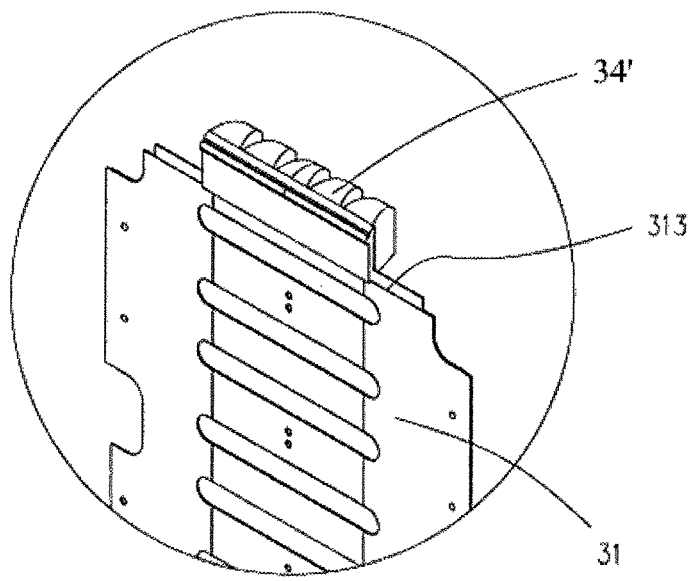
FIG. 46 illustrates a partial schematic view of a connecting member and a positioning member, in accordance with another embodiment of the present disclosure.
Figure 47:
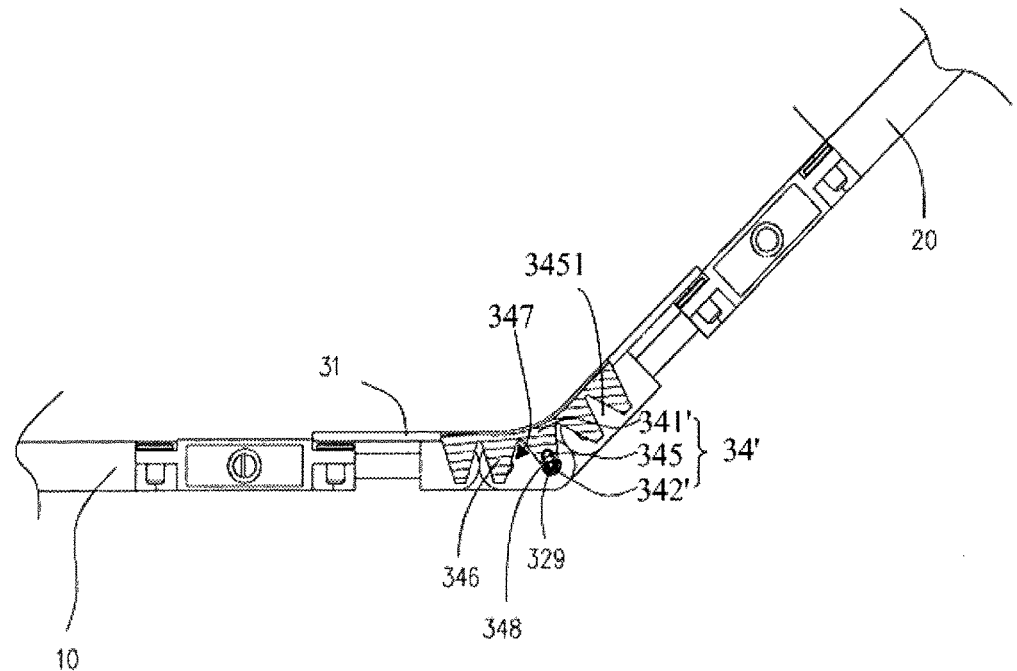
FIG. 47 illustrates a cross-sectional schematic view of a first housing, a second housing, and the connecting member and the positioning member shown in FIG. 46.

As illustrated in FIG. 46 and FIG. 47, in an exemplary embodiment, a positioning member 34' is provided. The positioning member 34' includes a first end 341' and a second end 342' opposite to the first end 341'. The second end 342' of the positioning member 34' may define a positioning groove 345. The positioning groove 345 extends towards a first end 341'. The coupling member 32 is coupled to the positioning member 34. The hinge shaft 329 of the coupling member 32 is slidably disposed in the positioning groove 345. Thus, the hinge shaft 329 can slide from one end of the positioning groove 345 to the other end of the positioning groove 345. The coupling member 32 can slide either close to the connecting member 31 or far away from the connecting member 31. A distance of the coupling member 32 and the connecting member 31 can be changed in a predetermined range.

In one exemplary embodiment, the connecting module 30 may include two positioning members 34'. The two positioning members 34' are respectively disposed at two ends of the hinge shaft 329. The two positioning members 34' can be used as a capping member. The positioning members 34' can also be configured to package the two ends of the coupling member 32. Meanwhile, the positioning members 34' can be configured to prevent the coupling member 32 from moving towards the first housing 10 or the second housing 20 with respect to the connecting member 31. Each of the positioning member 34' can be flexible. Each of the positioning member 34' includes the first end 341' and a second end 342' opposite to the first end 341'. The first end 341' is coupled to the connecting member 31 by means of adhesive or other suitable connections. The positioning member 34' can be bent together with the connecting member 31. A number of notches 3451 are formed at the second end 342' of the positioning member 34', thereby forming a number of wedge-shaped portions 346. The wedge-shaped portions 346 are arranged along a direction perpendicular to the longitudinal direction of the connecting member 31. The positioning member 34' can package the two ends of the connecting module 30. Thus, the connecting module 30 can have a good appearance. Each of the wedge-shaped portions 346 includes two opposite sloped surfaces 347. Thus, when the positioning member 34' is bent together with the connecting member 31, two adjacent wedge-shaped portions 346 can be close to each other and in contact with each other.

One of the wedge-shaped portions 346 defines the positioning groove 345. The positioning groove 345 can be runway-shaped. The one of the wedge-shaped portions 346 is substantially located at the geometric central line of the connecting member 31. The extending direction of the positioning groove 345 is perpendicular to the geometric central line of the connecting member 31. The extending direction of the positioning groove 345 and the geometric central line of the connecting member 31 are coplanar. One end of the hinge shaft 329 is slidably coupled to one of the positioning members 34', the other end of the hinge shaft 329 is slidably coupled to the other one of the positioning members 34'. Thus, the hinge shaft 329 can slide along the extending direction of the positioning groove 345. The positioning groove 345 can prevent the coupling member 32 from moving towards the first housing 10 or the second housing 20 relative to the connecting member 31. When the rotating angel of the first housing 10 with respect to the second housing 20 is more than 180°, a distance of the connecting member 31 and the coupling member 32 will be increased. At this time, the hinge shaft 329 may slide towards the second end 342' of the positioning groove 345 far away the first end 341. Thus, the positioning groove 345 can be configured to guide the hinge shaft 329 and prevent the hinge shaft 329 from sliding out of the positioning member 34'. Moreover, the hinge shaft 329 can be prevent from moving towards the first housing 10 or the second housing 20. Thus, the rotating angel of the first housing 10 with respect to the second housing can be more than 180°. The positioning member 34' can be made of a flexible material such as silicone. In addition, a wear resistant unit 348 such as a steel ring can be disposed in the positioning groove 345. The wear resistant unit 348 can be in contact with an inner surface of the positioning member 34' in the positioning groove 345. The wear resistant unit 348 can be a runway-shaped similar to a configuration of the positioning groove 345. Thus, the positioning member 34' can be protected by the wear resistant unit 348, thereby avoiding a damage. Thus, the service life of the positioning member 34' can be increased, and a security of the positioning member 34' can be improved.

Figure 48:
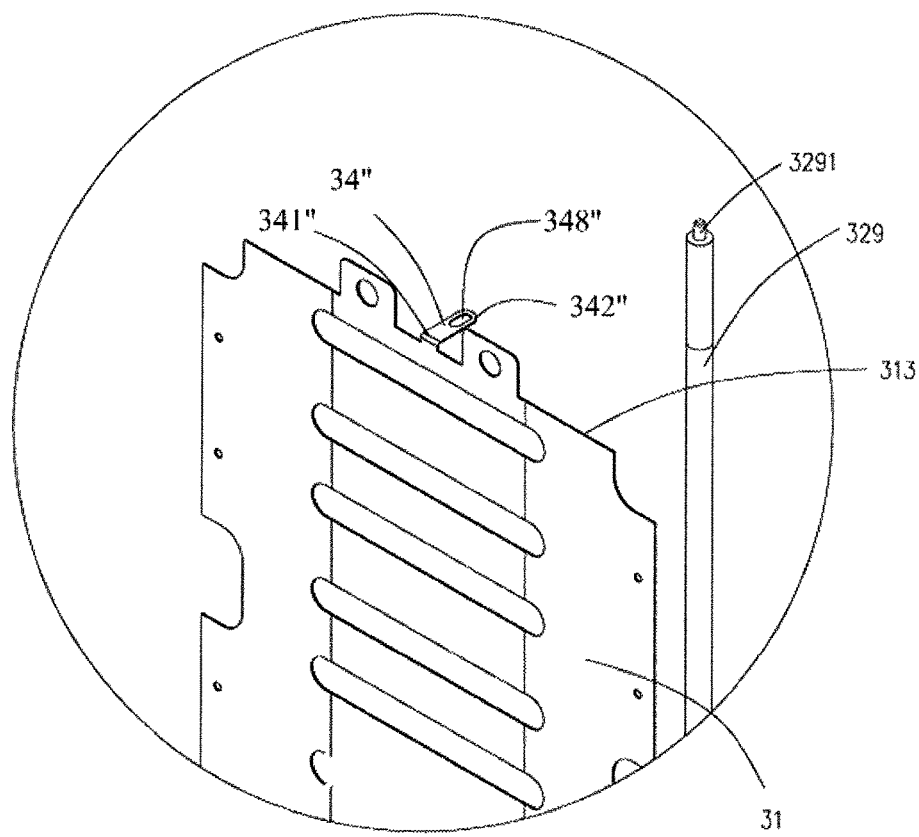
FIG. 48 illustrates a partial schematic view of a connecting member and a positioning member, in accordance with still another embodiment of the present disclosure.

As illustrated in FIG. 48, in an exemplary embodiment, the positioning member 34" can be a connection plate. The positioning member 34" is integrated with the connecting member 31. That is, the positioning member 34" is extended from the end of the connecting member 31. The connection plate is rigid. The positioning member 34" is substantially located at the geometric central line of the connecting member 31. An extending direction of positioning member 34 is perpendicular to the longitudinal direction of the connecting member 31. The extending direction of the positioning member 34" and the geometric central line of the connecting member 31 are coplanar. The first end 341" of the positioning member 34" is coupled to the connecting member 31. A distance of the first end 341" and the first housing 10 is substantially equal to a distance of the first end 341" and the second housing 20. The second end 342" is far away from the connecting member 31. The positioning member 34" is substantially perpendicular to the connecting member 31. For example, the connecting member 31 with the positioning member 34" can be made of a metal plate by a punching process. Thus, two ends of the metal plate can be bent to form the two positioning members 34" coupled to the connecting member 31. The second end 342" of the positioning member 34" may define a positioning groove 348". The positioning groove 348" can be runway-shaped. The hinge shaft 329 includes two sliding rods 3291. The two sliding rods 3291 are respectively located at two ends of the hinge shaft 329. The sliding rods 3291 at one end of the hinge shaft 329 is slidably coupled to the positioning groove 348" of one positioning member 34", the sliding rod 3291 at the other end of the hinge shaft 329 is slidably coupled to the positioning groove 348" of the other positioning members 34". Thus, the hinge shaft 329 can slide along a longitudinal direction of the positioning groove 348". The longitudinal direction of the positioning groove 348" is substantially perpendicular to the longitudinal direction of the connecting member 31. The longitudinal geometric central line of the connecting member 31 and a longitudinal geometric central line of the positioning groove 348" are coplanar. The positioning groove 348" can prevent the coupling member 32 from moving towards the first housing 10 or the second housing 20 relative to the connecting member 31. When the rotating angel of the first housing 10 with respect to the second housing is more than 180°, the distance of the connecting member 31 and the coupling member 32 will be increased. At this time, the hinge shaft 329 may slide towards the second end 342" of the positioning groove 348" far away the first end 341. Thus, the positioning groove 348" can be configured to guide the hinge shaft 329 and to prevent the hinge shaft 329 from sliding out of the positioning member 34".

Figure 49:
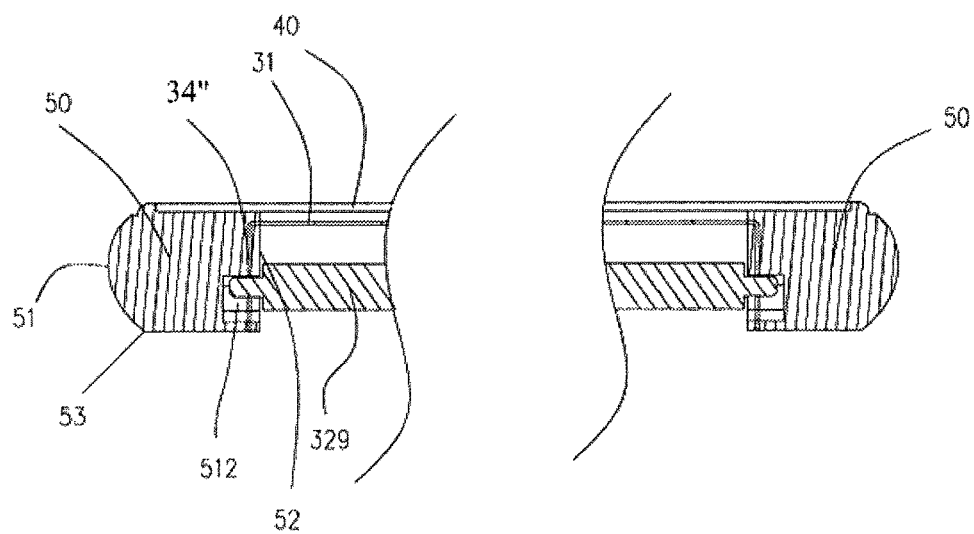
FIG. 49 illustrates a cross-sectional schematic view of an electronic device with the connecting member and the positioning member shown in FIG. 46 and a capping member.
Figure 50:
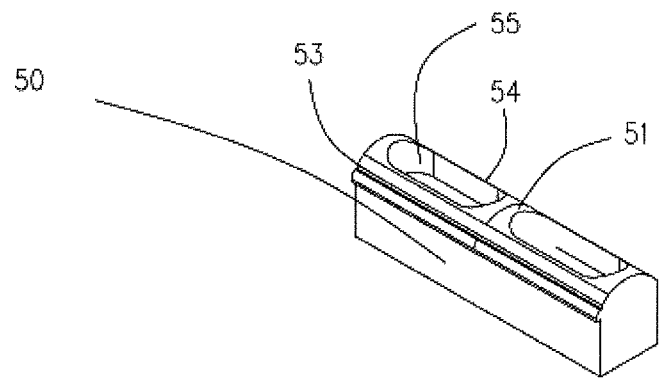
FIG. 50 illustrates a schematic view of the capping member shown in FIG. 49.
Figure 51:
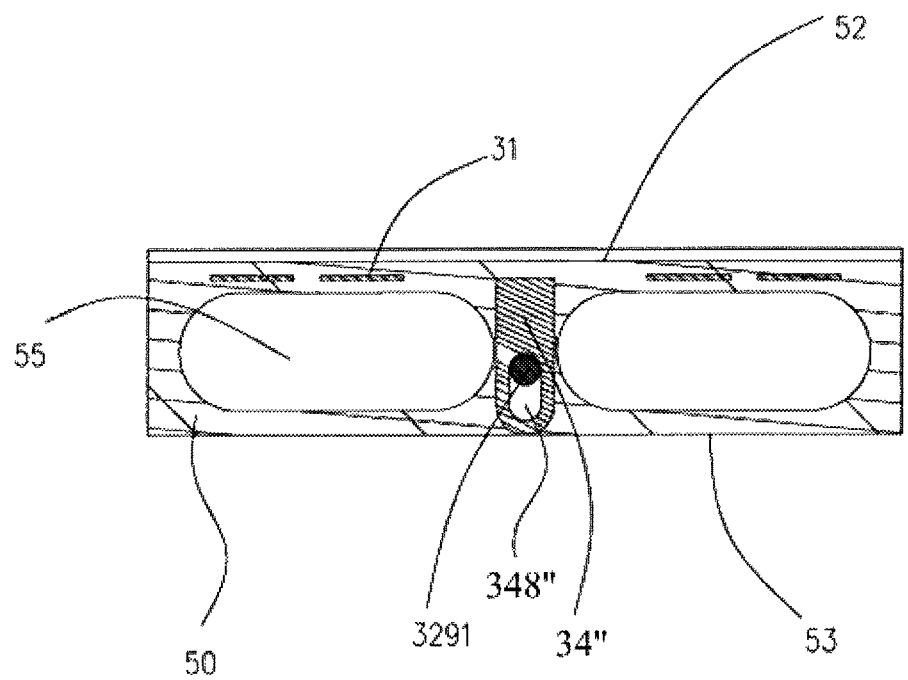
FIG. 51 illustrates a cross-sectional schematic view of the connecting member and the capping member shown in FIG. 50.

As illustrated in FIG. 49, FIG. 50 and FIG. 51, in one embodiment, the housing assembly 100 may further include two capping members 50. The two capping members 50 are respectively disposed at the first connecting side 313 and the second connecting side 313' of the connecting member 31. In other words, the two capping members 50 are respectively disposed at two sides of the flexible display panel 40. Each of two the capping members 50 is coupled to a side of the flexible display panel 40. One end of the capping members 50 is in contact with the first housing 10, the other end is in contact with the second housing 20. Each of the capping members 50 includes an outer surface 51 and an inner mounting surface 52 opposite to the outer surface 51. The outer surface 51 can be a caved surface protruding away from the inner mounting surface 52. The inner mounting surface 52 is configured to be in contact with the positioning member 34". The inner mounting surface 52 defines a sliding groove 512 communicated with the positioning groove 348" of the positioning member 34". The sliding rod 3291 of the first hinge shaft 329 penetrates through the positioning groove 348" into the sliding groove 512. Thus, the sliding rod 3291 can also slide in the sliding groove 512. The capping member 50 may have a first side wall 53 and a second side wall 54 opposite to the first side wall 53. The first side wall 53 is substantially parallel to the second side wall 54. The first side wall 53 is also parallel to the first connecting side 313 and the second connecting side 313' of the connecting member 31 (i.e., the side of the flexible display panel 40). The inner mounting surface 52 and the out surface 51 are located between the first side wall 53 and the second side wall 54. The outer surface 51 defines a number of holes 55. The holes 55 may further passes through the inner mounting surface 52. The holes 55 are located between the first side wall 53 and the second side wall 54. An arrangement direction of the holes 55 is substantially parallel to the first side wall 53. A cross-sectional configuration of each of the holes 55 can be stripe-shaped, and a longitudinal direction of each of the holes 55 is parallel to the first side wall 53. The capping member 50 can be bent together with the side of the flexible display panel 40 to change a configuration of each of the holes 55. That is, the holes 55 can provide a space for the bent first side wall 53 and the bent second side wall 54. Then, a configuration of each of the holes 55 will be changed. The capping member 50 with the holes 55 can have an excellent flexibility. A configuration of each of the holes 55 can be circle, or rectangular, etc.

Figure 52:
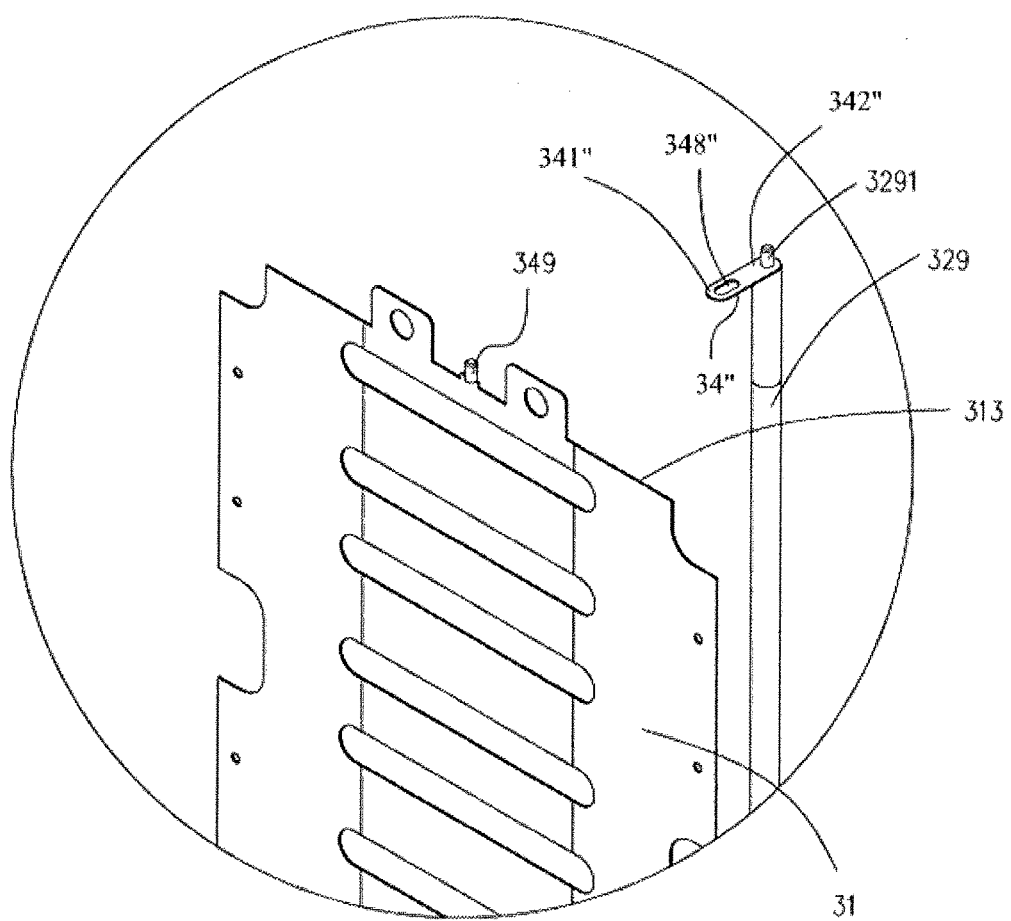
FIG. 52 illustrates a partial schematic view of a connecting member and a positioning member, in accordance with further another embodiment of the present disclosure.

In an exemplary embodiment, as illustrated in FIG. 52, the second end 342" of the positioning member 34" can be fixed to the end of the hinge shaft 329 of the coupling member 32. The first end 341" of the positioning member 34" defines a positioning groove 348". The positioning groove 348" can be runway-shaped. A sliding rod 349 is disposed at the first connecting side 313 of the connecting member 31. It is noted that, another sliding rod 349 can be disposed at the second connecting side 313' of the connecting member 31. An axis of the sliding rod 349 is overlapped with a longitudinal geometric central line of the connecting member 31. The sliding rod 349 is slidably coupled to the positioning groove 348" of the positioning members 34". Thus, the first coupling member 329 can slide along a longitudinal direction of the positioning groove 348". The longitudinal direction of the positioning groove 348" is substantially perpendicular to the longitudinal direction of the connecting member 31. The longitudinal geometric central line of the connecting member 31 and a longitudinal geometric central line of the positioning groove 348" are coplanar. The coupling member 32 cab be prevented from move towards the first housing 10 or the second housing 20 relative to the connecting member 31.

It is noted that, the housing assembly 100 may include two capping members 50. The two capping members 50 are respectively disposed at the first connecting sides 313 and the second connecting side 313' of the connecting member 31. The sides of the connecting module 30 for supporting the flexible display panel 40 can be covered by the capping members 50. Thus, the housing assembly 100 can have a good appearance. In one exemplary embodiment, the capping member can be made of silicone. The capping member 50 can be integrated with the connecting member 31 by a molding process. In other embodiment, the capping member 50 can be coupled to the connecting member 31 by means of screw.

The housing assembly 100 is configured for carrying the display device 200, and protecting the electronic component 300. The first housing 10 is configured for supporting the first portion 41 of the flexible display panel 40. The second housing 20 is configured for supporting the second display portion of the flexible display panel 40. The connection module 30 can be folded or unfolded, and is configured for supporting the third portion 43 of the flexible display panel 40.

Figure 45:
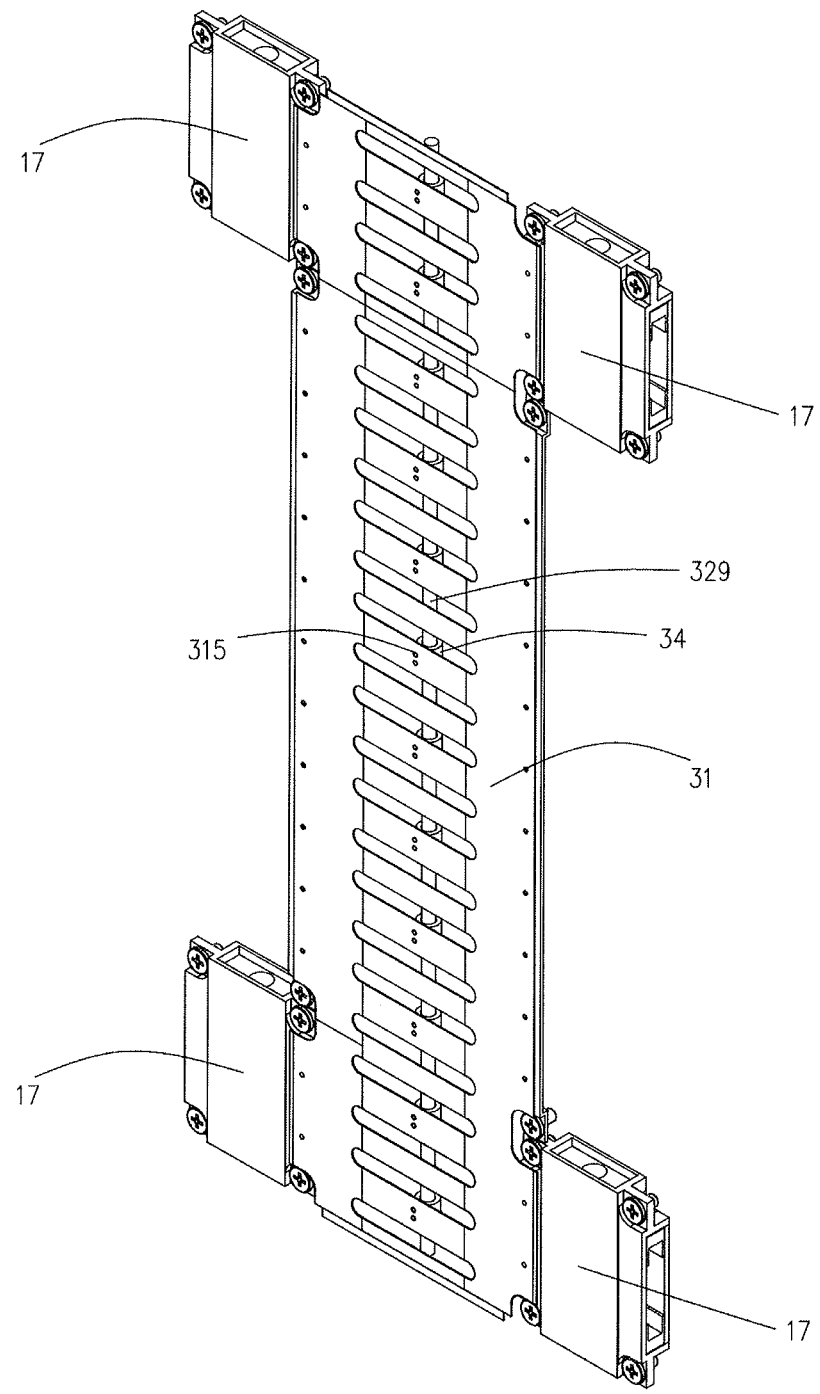
FIG. 45 illustrates a schematic view of a connecting module as shown in FIG. 30 assembled with the first supporter.
Figure 53:
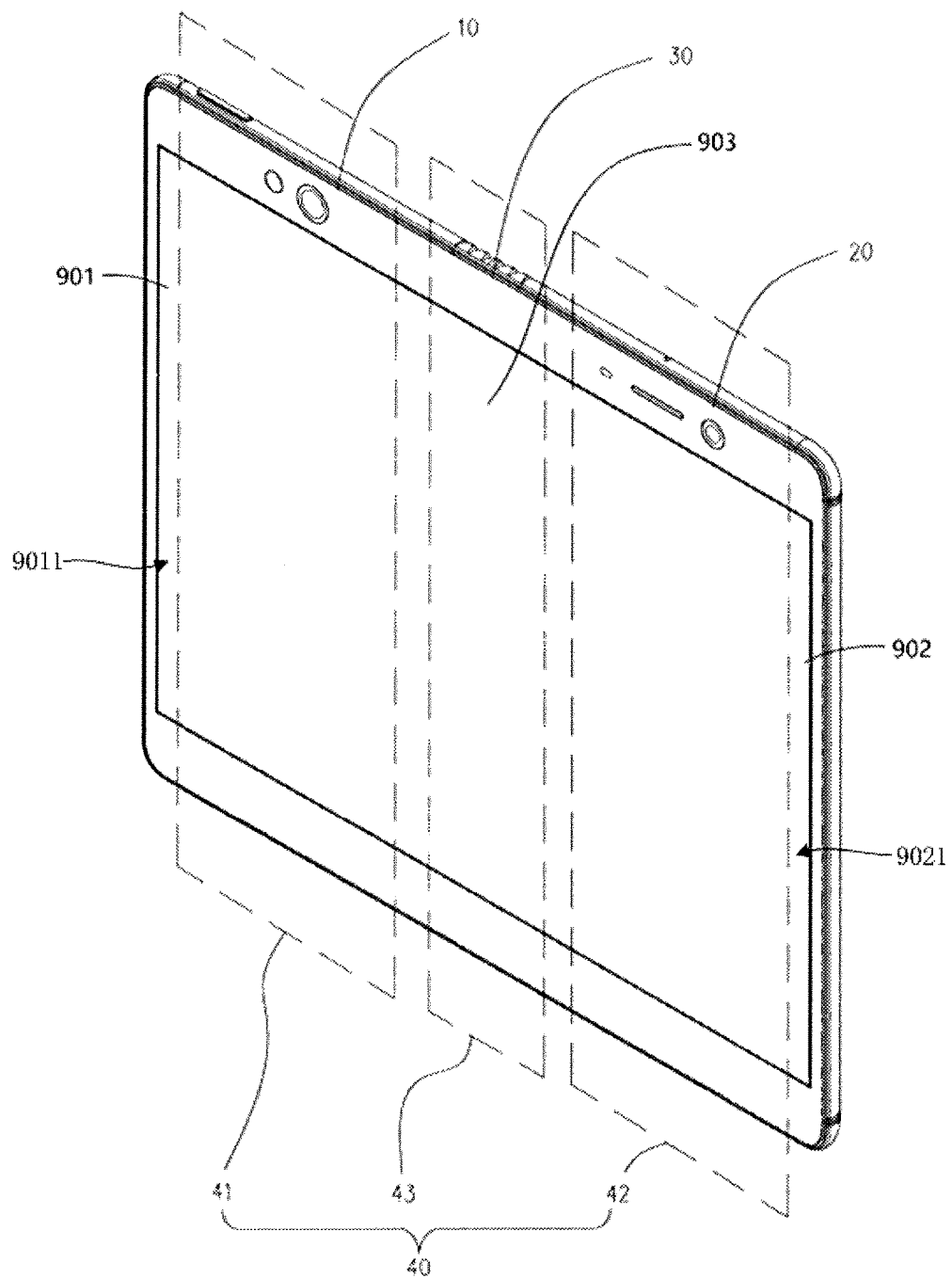
FIG. 53 illustrates a schematic view of the electronic device shown in FIG. 1 in an unfolded configuration.

As illustrated in FIG. 1 and FIG. 53, in the present embodiment, the flexible display panel 40 includes a first portion 41, a second portion 42 and a bendable portion 43 between the first portion 41 and the second portion 42. The first portion 41 is attached to the first supporting surface 111, the second display portion is attached to the second supporting surface 121. The first portion 41 can move with the first housing 10, and the second portion 42 can move with the second housing 20. Thus, the mobile terminal 900 may include a first display portion 901, a second display portion 902 and a bending display portion 903. The first display portion 901 is equipped with the first portion 41, the second display portion 902 is equipped with the second portion 42, and the bending display portion 903 is equipped with the third portion 43. The first display portion 901 includes a first display surface 9011 and a first rear surface 121 (i.e., the first rear surface 121 of the first housing 10, see FIG. 3). The second display portion 902 includes a second display surface 9021 and a second rear surface 121 (i.e., the second rear surface 221 of the first housing 20, see FIG. 3). It is noted that, the first display surface 9011 and the second display surface 9021 are parts of a display surface of the flexible display panel 40. The first display surface 9011 of the first portion 41 can be positioned on the first housing 10, the second display surface 9021 of the second portion 42 can be positioned on the second housing 20. The mobile terminal 900 can be either in a folded configuration, an angular configuration or in an unfolded mold. In the folded configuration, as illustrated in FIG. 45, the second display portion 902 can be rotated relative to the first display portion 901, and then can be stacked onto the first display portion 901. The first rear surface 121 of the first display portion 901 is in attached to the second rear surface 221 of the second display portion 902. Meanwhile, the protruding portion 122 of the first display portion 901 is received in the indentation 222 (see FIG. 26). By rotation of the first housing 10 relative to the second housing 20, the flexible display panel 40 can be transitionable between: (i) a first configuration (i.e., the unfolded configuration) in which the first display surface 9011 is coplanar with the second display surface 9021, and (ii) a second configuration (i.e., the folded configuration or the angular configuration) in which the first display surface 9011 is noncoplanar with the second display surface 9021. For example, in the second configuration, the first display surface 9011 is angled to or parallel to the second display surface 9021.

Figure 54:
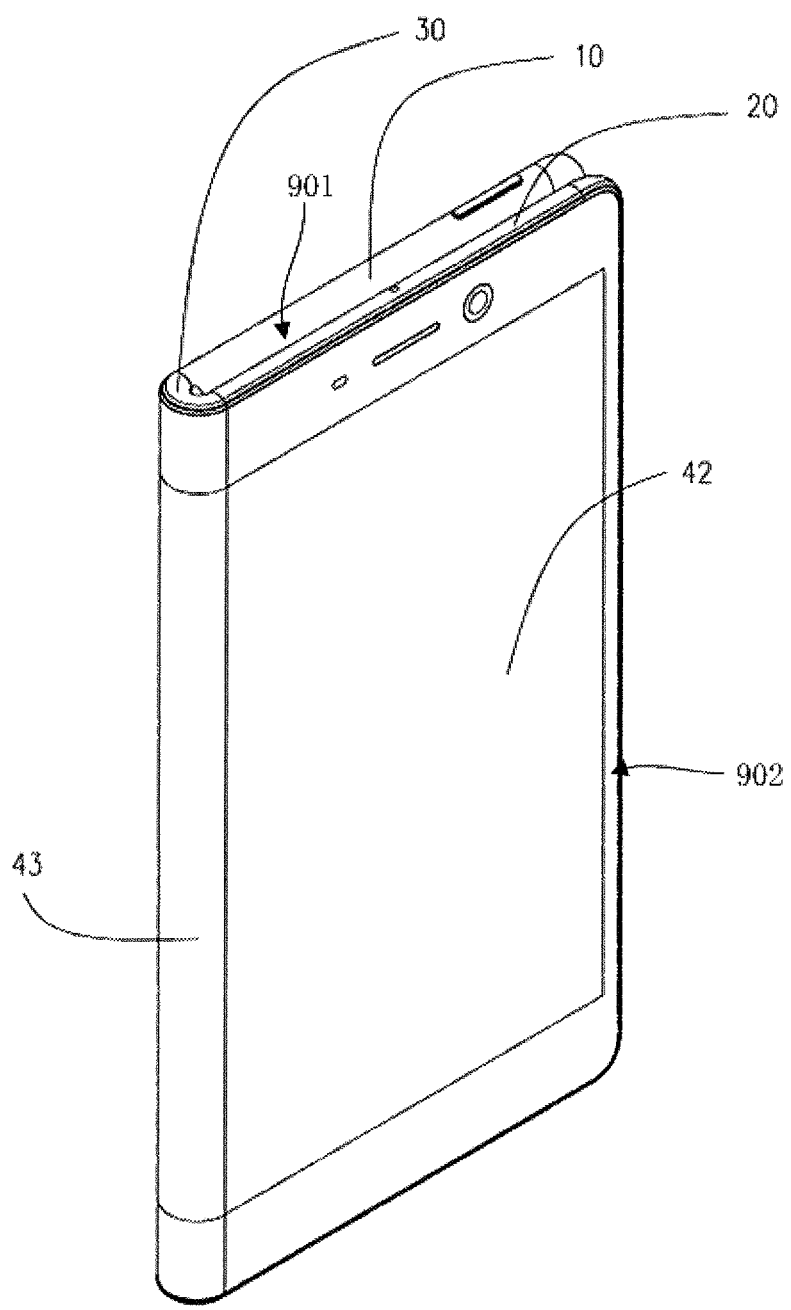
FIG. 54 illustrates a schematic view of the electronic device shown in FIG. 1 in a folded configuration.
Figure 55:
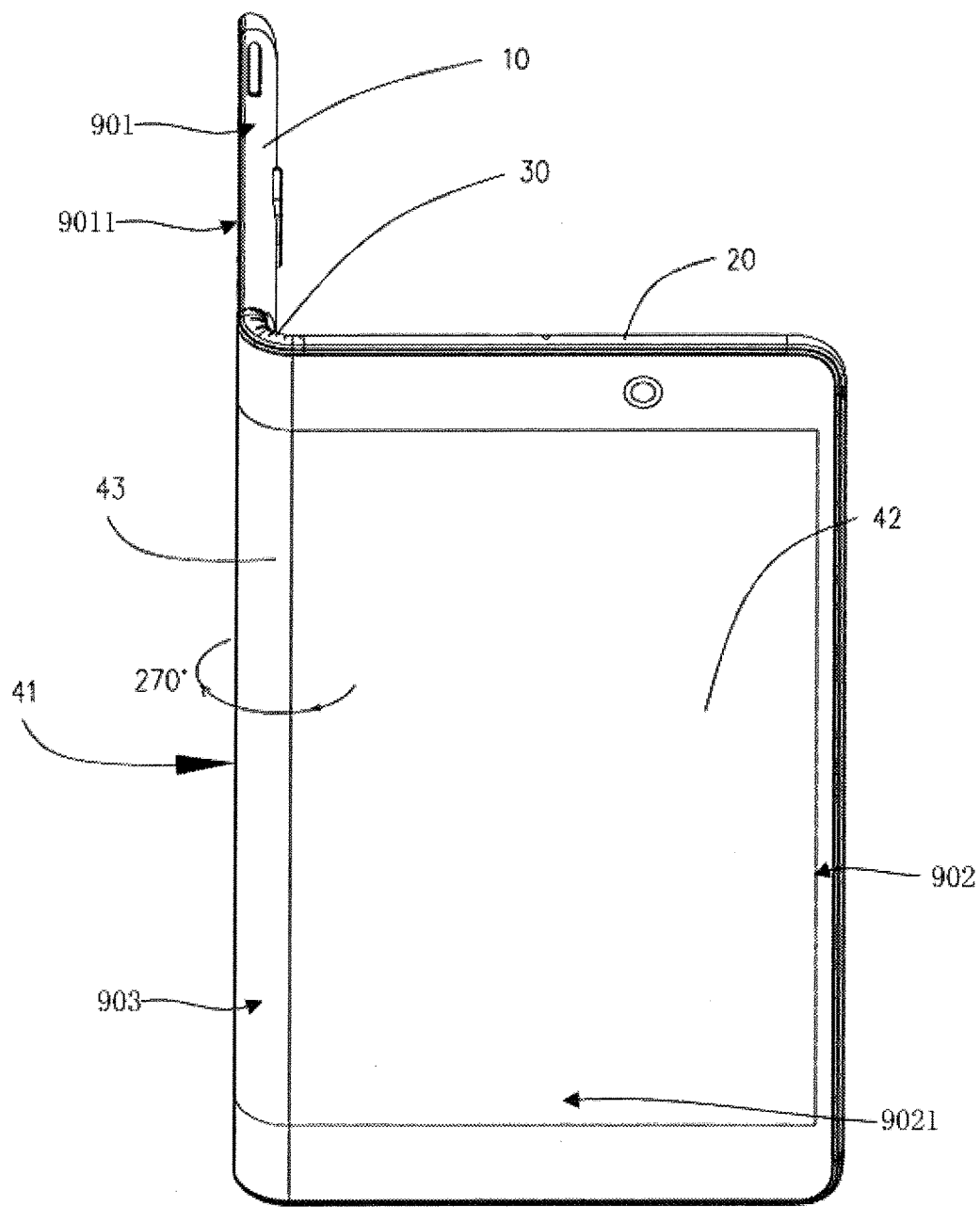
FIG. 55 illustrates a schematic view of the electronic device shown in FIG. 1 in an angular configuration.
Figure 56:
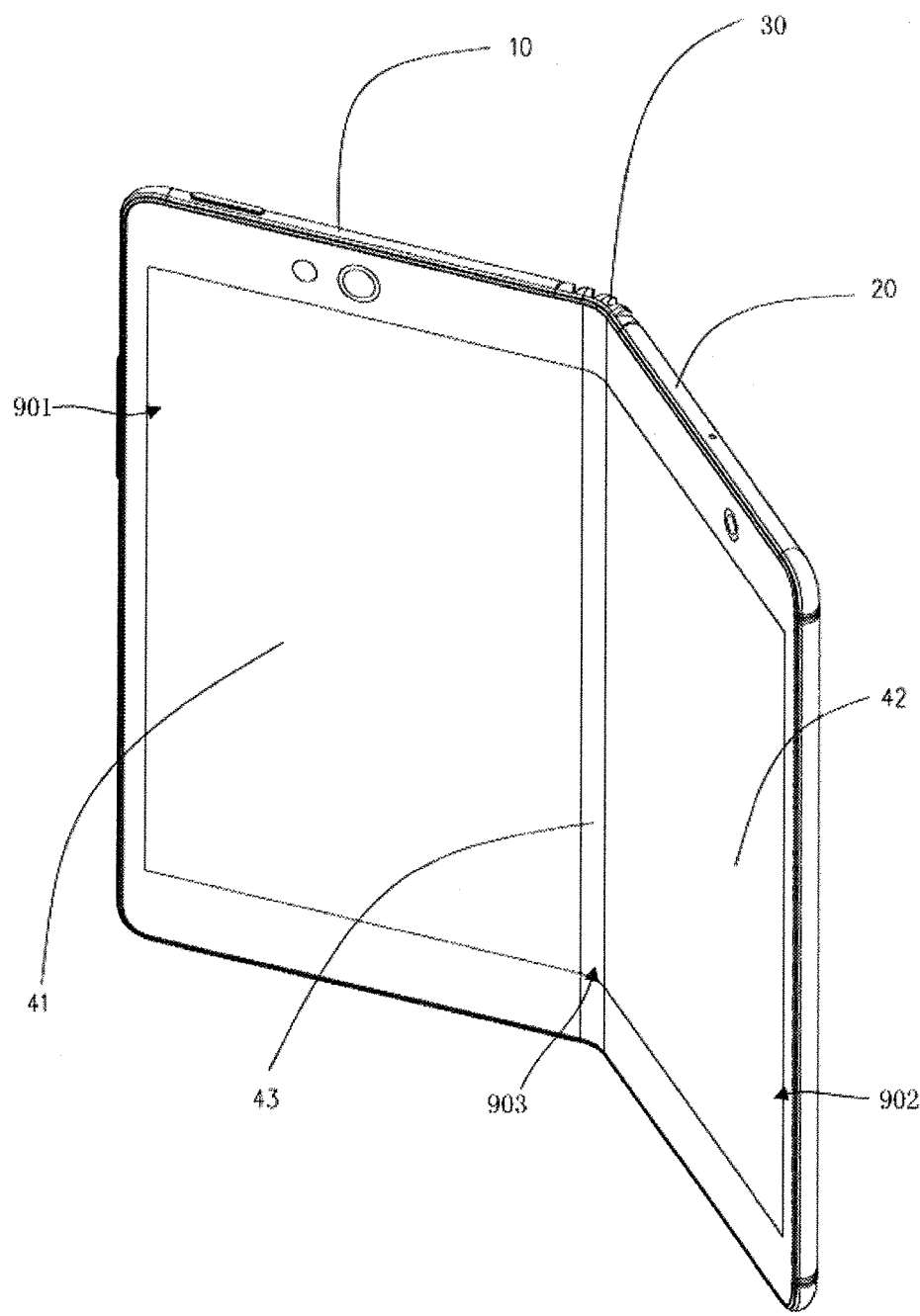
FIG. 56 illustrates a schematic view of the electronic device shown in FIG. 1 in another angular configuration.

As illustrated in FIG. 53, the mobile terminal 900 in the unfolded configuration can be used with a large display area. For example, the first housing 10 and the second housing 20 are arranged in a plane (i.e., the first display portion 901 and the second display portion 902 are arranged in a plane), the mobile terminal 900 can be used as a tablet computer. The mobile terminal 900 can provide a large display area to the user, thereby improving the user's experience. As illustrated in FIG. 54, the mobile terminal 900 in the folded configuration can be used with a small display area. For example, the first housing 10 is stacked on the second housing 20 (i.e., the first display portion 901 is stacked on the second display portion 902). Thus, the mobile terminal 900 can be used as a mobile phone. It is convenient for a user to carry the mobile terminal 900 in the folded configuration. As illustrated in FIG. 55 and FIG. 56, the mobile terminal 900 in the angular configuration can be used with a bent display area. The angle of the first housing 10 and the second housing 20 is formed. The rotating angle of the first housing 10 with respect to the second housing 20 can be more than 180° (the rotating angle illustrated in FIG. 55 is 270°). The rotating angle of the first housing 10 with respect to the second housing 20 can be in a range from 0 to 180° (the rotating angle illustrated in FIG. 56 is 90°). Thus, the mobile terminal 900 can be used as a notebook computer.

Figure 57:
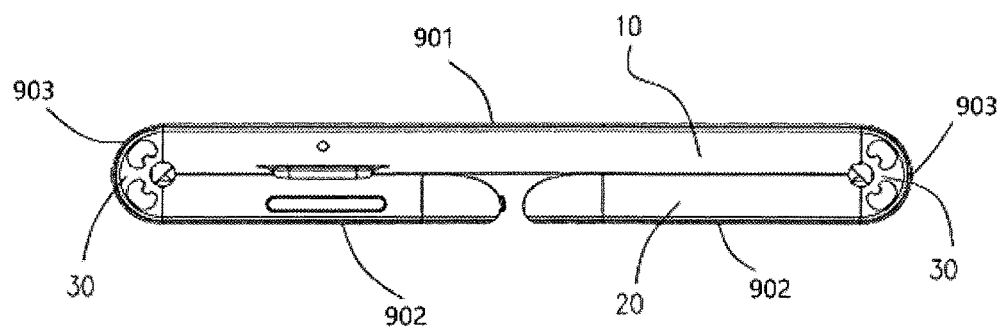
FIG. 57 illustrates a schematic view of an electronic device, in accordance with another embodiment of the present disclosure.

In an exemplary embodiment, as illustrated in FIG. 57, the mobile terminal 900 may include two second display portions 902. The two second display portions 902 are coupled to the two sides of the first display portions 901 respectively. Correspondingly, the housing assembly 100 may include two second housings 20. The two second housings 20 are coupled to two sides of the first housing 10 by a connecting module 30 respectively. The flexible display panel 40 includes two second part 42. The two second part 42 are coupled to two sides of the first part 41. A third part 43 is coupled between the first part 41 and each of the second part 42. The second housing 20 are configured to support the two second parts 42. The connecting module 30 is configured to support the third part 43.

Figure 58:
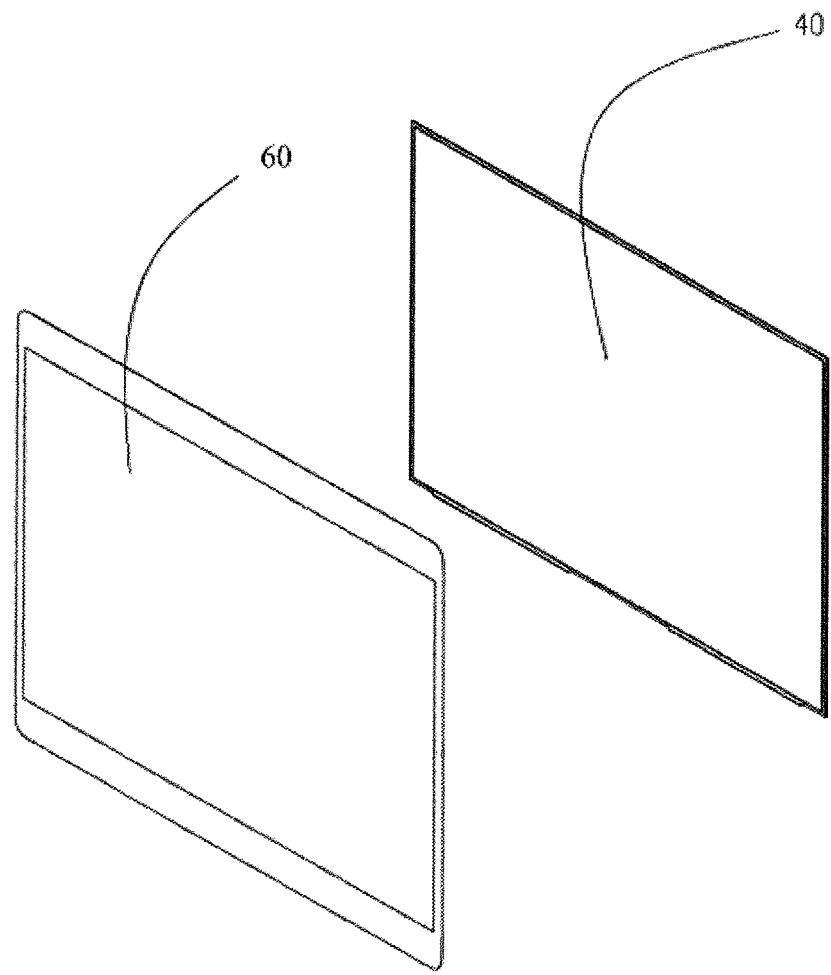
FIG. 58 illustrates an exploded view of a flexible display panel of the electronic device shown in FIG. 1.

As illustrated in FIG. 58, the mobile terminal 900 may further include a flexible transparent cover 60 covering on the flexible display panel 40. The flexible transparent cover 60 is attached on the flexible display panel 40. A periphery of the flexible transparent cover 60 is coupled to the first housing 10, the second housing 20 and the connecting member 31. The flexible transparent cover 60 is configured to protect the flexible display panel 40.

Figure 59:
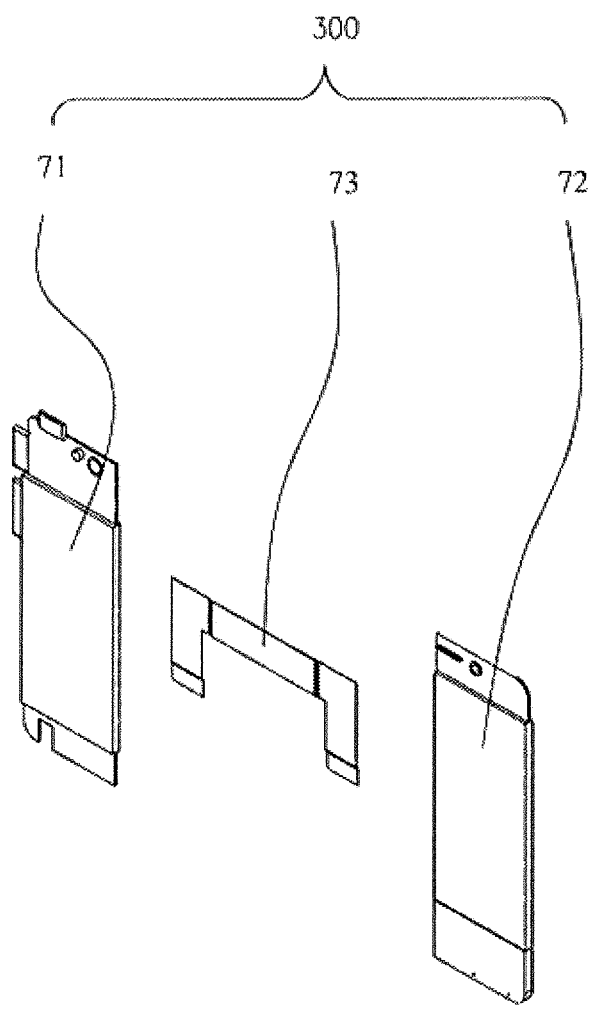
FIG. 59 illustrates an exploded view of an electronic component group of the electronic device shown in FIG. 1.

As illustrated in FIG. 59, in the present embodiment, the electronic component 300 may include a first electronic module 71, a second electronic module 72 and a flexible circuit board 73. The first electronic module 71 is electrically connected to the second electronic module 72 by the flexible circuit board 73. The first electronic module 71 is received in the first accommodating cavity 13, and the second electronic module 72 is received in the second accommodating cavity 23. The first electronic module 71 may include a printed circuit board and a number of functional components disposed on the printed circuit board. For example, the electronic module 71 can include a main board, a central processor, a memory, an antenna, a camera, and a receiver, etc. The second electronic module 72 may include a printed circuit board and a number of functional components disposed on the printed circuit board. The second electronic module 72 can be different from the first electronic module 71. For example, the second electronic module 72 can include a battery, a connector, finger print module, etc.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A housing assembly, comprising:
   a first housing;
   a second housing; and
   a connecting module coupled between the first housing and the second housing, the first housing being rotatable with respect to the second housing by the connecting module, the connecting module comprising:
   a coupling member, comprising:
      a hinge shaft,
      a plurality of first hinge elements arranged along the longitudinal direction of the hinge shaft, the first hinge elements configured to be coupled to the first housing, and
      a plurality of second hinge elements arranged along the longitudinal direction of the hinge shaft, the second hinge elements configured to be coupled to the second housing, wherein the first hinge elements and the second hinge elements are alternatively arranged along the longitudinal direction of the hinge shaft; and
   a damping mechanism configured for providing a damping force to the first housing and the second housing during rotating the first housing with respect to the second housing.

2. The housing assembly as claimed in claim 1, wherein the damping mechanism comprises a damping member,
   the damping member being sleeved on the hinge shaft and located between one of the first hinge elements and one of the second hinge elements adjacent to the one of the first hinge elements and configured for providing the damping force to the first hinge elements and the second hinge elements during rotating the first hinge elements with respect to the second hinge elements.

3. The housing assembly as claimed in claim 2, wherein the damping member comprises:
   a first damping ring sleeved on the hinge shaft and coupled to the one of the first hinge elements; and a second damping ring in contact with the first damping ring, sleeved on the hinge shaft and coupled to the one of the second hinge elements.

4. The housing assembly as claimed in claim 3, wherein the one of the first hinge elements defines a first depression facing the one of the second hinge elements, the first damping ring is positioned in the first depression, the second hinge element defines a second depression facing the one of the first hinge elements, and the second damping ring is positioned in the second depression.

5. The housing assembly as claimed in claim 3, wherein the damping member comprises:
  a first elastic ring sleeved on the hinge shaft and located between the first damping ring and the one of the first hinge elements and configured to provide a force toward the second damping ring to the first damping ring; and
  a second elastic ring sleeved on the hinge shaft and located between the second damping ring and the one of the second hinge elements and configured to provide a force toward the first damping ring to the second damping ring.

6. The housing assembly as claimed in claim 5, wherein the damping member comprises:
  a clasp ring sleeved on the hinge shaft and configured to prevent the first elastic ring from moving along the hinge shaft.

7. The housing assembly as claimed in claim 6, wherein the damping member comprises:
  another clasp ring sleeved on the hinge shaft and configured to prevent the second elastic ring from moving along the hinge shaft.

8. The housing assembly as claimed in claim 2, wherein the coupling member comprises:
  a first connection part, the first connection part slidably coupled to the first housing;
  a third hinge element slidably coupled to the first housing by the first connection part; and
  an auxiliary hinge shaft parallel to the hinge shaft and configured to pivotally couple the third hinge element to the first hinge elements.

9. The housing assembly as claimed in claim 8, wherein the damping mechanism comprises an auxiliary damping member, the auxiliary damping member being sleeved on the auxiliary hinge shaft and located between one of the first hinge elements and the third hinge element adjacent to the one of the first hinge elements and configured for providing a damping force to the one of the first hinge elements and the third hinge element during rotating the one of the first hinge elements with respect to the third hinge element.

10. The housing assembly as claimed in claim 8, wherein the coupling member comprises:
  a second connection part, the second connection part slidably coupled to the second housing;
  a fourth hinge element slidably coupled to the second housing by the second connection; and
  another auxiliary hinge shaft parallel to the hinge shaft and configured to pivotally couple the fourth hinge element to the second hinge elements.

11. The housing assembly as claimed in claim 10, wherein the damping mechanism comprises another auxiliary damping member, the another auxiliary damping member being sleeved on the another auxiliary shaft and located between one of the second hinge elements and the fourth hinge element adjacent to the one of the second hinge elements and configured for providing a damping force to the one of the second hinge elements and the fourth hinge element during rotating the one of the second hinge elements with respect to the fourth hinge element.

12. The housing assembly as claimed in claim 2, wherein the connecting module further comprises a connecting member coupled between the first housing and the second housing, the first hinge elements facing the connecting member and configured to support the connecting member.

13. The housing assembly as claimed in claim 12, wherein the housing assembly further comprises a positioning member, the positioning member being coupled between the connecting member and the coupling member and configured to prevent a movement of the coupling member along a direction perpendicular to a longitudinal direction of the connecting member relative to the connecting member.

14. The housing assembly as claimed in claim 13, wherein the positioning member comprises a first end and a second end opposite to the first end, the first end is fixed to the connecting member, and the second end is coupled to the first hinge elements.

15. The housing assembly as claimed in claim 14, wherein the second end of the positioning member defines a positioning groove extending from the second end to the first end, and the coupling member comprises a sliding rod slidably coupled to the positioning groove and received in the positioning groove.

16. The housing assembly as claimed in claim 14, wherein the first end is integrated with the connecting member.

17. The housing assembly as claimed in claim 15, wherein the positioning member further comprises a wear resistant unit, the wear resistant unit being disposed in the positioning groove and in contact with an inner surface of the positioning member in the positioning groove.

18. The housing assembly as claimed in claim 15, wherein the positioning member is flexible.

19. An electronic device, comprising:
  a first housing;
  a second housing; and
  a connecting module coupled between the first housing and the second housing, the first housing being rotatable with respect to the second housing, the connecting module comprising:
    a coupling member, comprising:
      a hinge shaft,
      a plurality of first hinge elements arranged along the longitudinal direction of the hinge shaft, the first hinge elements configured to be coupled to the first housing, and
      a plurality of second hinge elements arranged along the longitudinal direction of the hinge shaft, the second hinge elements configured to be coupled to the second housing, wherein the first hinge elements and the second hinge elements are alternatively arranged along the longitudinal direction of the hinge shaft; and
    a damping mechanism configured for providing a damping force to the first housing and the second housing during rotating the first housing with respect to the second housing; and
  a flexible display panel positioned on the first housing and the second housing.

20. An electronic device, comprising:
  a first housing;
  a second housing, the second housing being rotatable with respect to the second housing;
  a coupling member, comprising:
    a hinge shaft, a plurality of first hinge elements arranged along the longitudinal direction of the hinge shaft, the first hinge elements configured to be coupled to the first housing, and a plurality of second hinge elements arranged along the longitudinal direction of the hinge shaft, the second hinge elements configured to be coupled to the second housing, wherein the first hinge elements and the second hinge elements are alternatively arranged along the longitudinal direction of the hinge shaft; and a damping mechanism coupled between the first housing and the second housing and configured for providing a damping force to the first housing and the second housing during rotating the first housing with respect to the second housing;

a flexible display panel positioned on the first housing and the second housing; and an electronic component group positioned in the first housing and the second housing and electrically connected to the flexible display panel.

\* \* \* \* \*